(12) United States Patent
Ma et al.

(10) Patent No.: US 12,156,149 B2
(45) Date of Patent: Nov. 26, 2024

(54) BEAM MANAGEMENT IN A WIRELESS COMMUNICATIONS NETWORK

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Huilin Xu, San Diego, CA (US); Jun Ma, San Diego, CA (US); Dan Zhang, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/171,731

(22) Filed: Feb. 9, 2021

(65) Prior Publication Data

US 2021/0258898 A1    Aug. 19, 2021

Related U.S. Application Data

(60) Provisional application No. 62/976,247, filed on Feb. 13, 2020.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0053* (2013.01); *H04W 72/0453* (2013.01); *H04W 72/046* (2013.01)

(58) Field of Classification Search
CPC ........... H04W 56/001; H04W 72/0453; H04W 72/046; H04L 5/0053; H04L 5/0023;
(Continued)

(56) References Cited

U.S. PATENT DOCUMENTS

2013/0217404 A1\*   8/2013   Jung ..................... H04W 52/04
                                                          455/452.1
2014/0321358 A1   10/2014   Tronc et al.
(Continued)

FOREIGN PATENT DOCUMENTS

EP            3605957 B1 \*   3/2022   ........... H04B 7/2678

OTHER PUBLICATIONS

International Search Report and Written Opinion—PCT/US2021/017355—ISA/EPO—dated May 10, 2021.
(Continued)

*Primary Examiner* — Ayanah S George
(74) *Attorney, Agent, or Firm* — Holland & Hart LLP/ QUALCOMM Incorporated

(57) ABSTRACT

Methods, systems, and devices for wireless communications are described. A satellite may determine one or more sets set of resources for conveying reference signals to a user terminal. In one example, the satellite may determine a set of resources that includes multiple resource groups each associated with a respective frequency range. In another example, the satellite may determine multiples sets of resources and each set of resources may include resources within respective frequency range. Upon determining the set(s) of resources, the satellite may transmit an indication of the set(s) of resources to a user terminal.

60 Claims, 29 Drawing Sheets

(51) Int. Cl.
*H04W 72/04* (2023.01)
*H04W 72/044* (2023.01)
*H04W 72/0453* (2023.01)

(58) Field of Classification Search
CPC ... H04L 5/0048; H04L 5/0091; H04B 7/0695; H04B 7/068
See application file for complete search history.

(56) References Cited

U.S. PATENT DOCUMENTS

2019/0239092 A1\* 8/2019 Zhou .................. H04W 16/28
2022/0070856 A1\* 3/2022 Lin .................... H04W 72/21

OTHER PUBLICATIONS

3GPP TS 38.331: "3rd Generation Partnership Project, Technical Specification Group Radio Access Network, NR, Radio Resource Control (RRC) protocol specification (Release 15)", 3rd Generation Partnership Project, Mobile Competence Centre, 650, Route Des Lucioles, F-06921 Sophia-Antipolis Cedex, France, vol. Ran WG2, No. V15.8.0, (Dec. 2019), Jan. 8, 2020, pp. 1-529, Section 6.3.2.

\* cited by examiner

BEAM MANAGEMENT IN A WIRELESS COMMUNICATIONS NETWORK

CROSS REFERENCE

The present Application for Patent claims the benefit of U.S. Provisional Patent Application No. 62/976,247 by MA et al., entitled "BEAM MANAGEMENT IN A WIRELESS COMMUNICATIONS NETWORK," filed Feb. 13, 2020, assigned to the assignee hereof, and expressly incorporated by reference herein.

INTRODUCTION

The following relates generally to wireless communications and more specifically to managing a wireless communications network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication is described. The method may include transmitting a synchronization signal block over a second frequency range using a first transmission beam that is assigned a first frequency range for data transmissions, the first transmission beam included in a set of multiple transmission beams each assigned respective frequency ranges for data transmissions. The method may include transmitting a reference signal, concurrent with transmitting the synchronization signal block, over the second frequency range using the first transmission beam.

An apparatus for wireless communication is described. The apparatus may include a processor and memory coupled to the processor. The processor and memory may be configured to transmit a synchronization signal block over a second frequency range using a first transmission beam that is assigned a first frequency range for data transmissions, the first transmission beam included in a set of multiple transmission beams each assigned respective frequency ranges for data transmissions. The processor and memory may be configured to transmit a reference signal, concurrent with transmitting the synchronization signal block, over the second frequency range using the first transmission beam.

Another apparatus for wireless communication is described. The apparatus may include means for transmitting a synchronization signal block over a second frequency range using a first transmission beam that is assigned a first frequency range for data transmissions, the first transmission beam included in a set of multiple transmission beams each assigned respective frequency ranges for data transmissions. The apparatus may include means for transmitting a reference signal, concurrent with transmitting the synchronization signal block, over the second frequency range using the first transmission beam.

A non-transitory computer-readable medium storing code for wireless communication is described. The code may include instructions executable by a processor to transmit a synchronization signal block over a second frequency range using a first transmission beam that is assigned a first frequency range for data transmissions, the first transmission beam included in a set of multiple transmission beams each assigned respective frequency ranges for data transmissions. The code may include instructions executable by a processor to transmit a reference signal, concurrent with transmitting the synchronization signal block, over the second frequency range using the first transmission beam.

Some examples of the method, apparatuses, and non-transitory computer-readable medium described herein may further include operations, features, means, or instructions for transmitting data to a device over the first frequency range using the first transmission beam.

Some examples of the method, apparatuses, and non-transitory computer-readable medium described herein may further include operations, features, means, or instructions for determining that data transmissions to the device over the first frequency range will be interrupted based on concurrently transmitting the synchronization signal block and the reference signal over the second frequency range using the first transmission beam and transmitting an indication of the interruption to the device prior to concurrently transmitting the synchronization signal block and the reference signal.

In some examples of the method, apparatuses, and non-transitory computer-readable medium described herein, the set of multiple transmission beams includes a second transmission beam assigned a second frequency range for data transmissions and the method, apparatuses, and non-transitory computer-readable medium may include further operations, features, means, or instructions for transmitting a second synchronization signal block over a third frequency range using the second transmission beam and transmitting a second reference signal, concurrent with transmitting the second synchronization signal block, over the third frequency range using the second transmission beam.

A method for wireless communication at a UE is described. The method may include receiving an indication of a reference signal resource set for estimating one or more transmission beams of a set of multiple transmission beams of a wireless node, the set of multiple transmission beams associated with a set of multiple frequency ranges such that at least some transmission beams of the set of multiple transmission beams are associated with different frequency ranges of the set of multiple frequency ranges. The method may include receiving at least one reference signal based on the indication of the reference signal resource set, the reference signal resource set including a set of multiple reference signal resource groups each including one or more reference signal resources, each of the set of multiple reference signal resource groups being associated with a respective frequency range and at least one transmission beam.

An apparatus for wireless communication at a UE is described. The apparatus may include a processor and memory coupled to the processor. The processor and memory may be configured to receive an indication of a reference signal resource set for estimating one or more transmission beams of a set of multiple transmission beams of a wireless node, the set of multiple transmission beams associated with a set of multiple frequency ranges such that at least some transmission beams of the set of multiple transmission beams are associated with different frequency ranges of the set of multiple frequency ranges. The processor and memory may be configured to receive at least one reference signal based on the indication of the reference signal resource set, the reference signal resource set including a set of multiple reference signal resource groups each including one or more reference signal resources, each of the set of multiple reference signal resource groups being associated with a respective frequency range and at least one transmission beam.

Another apparatus for wireless communication at a UE is described. The apparatus may include means for receiving an indication of a reference signal resource set for estimating one or more transmission beams of a set of multiple transmission beams of a wireless node, the set of multiple transmission beams associated with a set of multiple frequency ranges such that at least some transmission beams of the set of multiple transmission beams are associated with different frequency ranges of the set of multiple frequency ranges. The apparatus may include means for receiving at least one reference signal based on the indication of the reference signal resource set, the reference signal resource set including a set of multiple reference signal resource groups each including one or more reference signal resources, each of the set of multiple reference signal resource groups being associated with a respective frequency range and at least one transmission beam.

A non-transitory computer-readable medium storing code for wireless communication at a UE is described. The code may include instructions executable by a processor to receive an indication of a reference signal resource set for estimating one or more transmission beams of a set of multiple transmission beams of a wireless node, the set of multiple transmission beams associated with a set of multiple frequency ranges such that at least some transmission beams of the set of multiple transmission beams are associated with different frequency ranges of the set of multiple frequency ranges. The code may include instructions executable by a processor to receive at least one reference signal based on the indication of the reference signal resource set, the reference signal resource set including a set of multiple reference signal resource groups each including one or more reference signal resources, each of the set of multiple reference signal resource groups being associated with a respective frequency range and at least one transmission beam.

In some examples of the method, apparatuses, and non-transitory computer-readable medium described herein, receiving the at least one reference signal may include operations, features, means, or instructions for receiving a first reference signal over a first frequency range associated with a first transmission beam, the first reference signal occupying a first reference signal resource included in a first reference signal resource group and receiving, concurrently with receiving the first reference signal, a second reference signal over a second frequency range associated with a second transmission beam and occupying a second reference signal resource included in a second reference signal resource group.

In some examples of the method, apparatuses, and non-transitory computer-readable medium described herein, the set of multiple reference signal resource groups may be staggered in the time domain.

In some examples of the method, apparatuses, and non-transitory computer-readable medium described herein, receiving the at least one reference signal may include operations, features, means, or instructions for receiving a first reference signal over a first frequency range associated with a first transmission beam, the first reference signal occupying a first reference signal resource included in a first reference signal resource group and receiving, after the threshold period of time, a second reference signal over a second frequency range associated with a second transmission beam, the second reference signal occupying a second reference signal resource included in a second reference signal resource group.

In some examples of the method, apparatuses, and non-transitory computer-readable medium described herein, at least two reference signal resource groups overlap in the time domain and the other reference signal resource groups may be staggered in the time domain, the at least two reference signal resource groups including a first reference signal resource group and a second reference signal resource group.

In some examples of the method, apparatuses, and non-transitory computer-readable medium described herein, the first reference signal resource group may be associated with a first transmission beam having a first coverage area and the second reference signal resource group may be associated with a second transmission beam having a second coverage area, the first coverage area separated from the second coverage area by a third coverage area of a third transmission beam.

In some examples of the method, apparatuses, and non-transitory computer-readable medium described herein, each of the one or more transmission beams may be assigned a respective frequency range for data transmissions and the method, apparatuses, and non-transitory computer-readable medium may include further operations, features, means, or instructions for associating each reference signal resource within a given frequency range with a transmission beam that may be assigned a different frequency range for data transmissions.

Some examples of the method, apparatuses, and non-transitory computer-readable medium described herein may further include operations, features, means, or instructions for receiving, over a first frequency range, data associated with a first transmission beam that may be assigned the first frequency range for data transmissions and receiving, over the first frequency range, a reference signal associated with a second transmission beam that may be assigned a second frequency range for data transmissions.

Some examples of the method, apparatuses, and non-transitory computer-readable medium described herein may further include operations, features, means, or instructions for receiving, over a first frequency range, data associated with a first transmission beam that may be assigned the first frequency range for data transmissions and receiving an indication of a duration of time that data transmissions over the first frequency range will be interrupted.

Some examples of the method, apparatuses, and non-transitory computer-readable medium described herein may further include operations, features, means, or instructions for determining a spatial relationship between a first coverage area of a first transmission beam and a second coverage area of a second transmission beam, the first coverage area encompassing the UE and receiving the at least one reference signal based at least on the spatial relationship, the at least one reference signal associated with the second transmission beam.

Some examples of the method, apparatuses, and non-transitory computer-readable medium described herein may further include operations, features, means, or instructions for receiving an indication of the spatial relationship from the wireless node, the indication including a vector indicating transmission beams that may have coverage areas adjacent to the first coverage area.

Some examples of the method, apparatuses, and non-transitory computer-readable medium described herein may further include operations, features, means, or instructions for determining that reference signal resources associated with the first and second transmission beams may be separated in the time domain, where the spatial relationship may be based on determining that reference signal resources associated with the first and second transmission beams may be separated in the time domain.

In some examples of the method, apparatuses, and non-transitory computer-readable medium described herein, the indication of the reference signal resource set may be signaled in a system information block or a radio resource control message.

In some examples of the method, apparatuses, and non-transitory computer-readable medium described herein, the reference signal resource set may be associated with a first mode of estimating transmission beams and the method, apparatuses, and non-transitory computer-readable medium may include further operations, features, means, or instructions for receiving an indication of a second reference signal resource set associated with a second mode of estimating transmission beams and receiving an indication of the first mode or the second mode.

In some examples of the method, apparatuses, and non-transitory computer-readable medium described herein, the wireless node includes a satellite operating in a non-terrestrial network.

A method for wireless communication at a UE is described. The method may include receiving an indication of a set of multiple reference signal resource sets for estimating a set of multiple transmission beams of a wireless node, the set of multiple transmission beams associated with one or more frequency ranges. The method may include receiving at least one reference signal based on the indication of the set of multiple reference signal resource sets indicating, for each frequency range, a respective reference signal resource set for estimating a subset of the set of multiple transmission beams associated with a different frequency range, the reference signal resource set including a set of multiple reference signal resources each within the frequency range and each associated with at least one transmission beam of the subset.

An apparatus for wireless communication at a UE is described. The apparatus may include a processor and memory coupled to the processor. The processor and memory may be configured to receive an indication of a set of multiple reference signal resource sets for estimating a set of multiple transmission beams of a wireless node, the set of multiple transmission beams associated with one or more frequency ranges. The processor and memory may be configured to receive at least one reference signal based on the indication of the set of multiple reference signal resource sets indicating, for each frequency range, a respective reference signal resource set for estimating a subset of the set of multiple transmission beams associated with a different frequency range, the reference signal resource set including a set of multiple reference signal resources each within the frequency range and each associated with at least one transmission beam of the subset.

Another apparatus for wireless communication at a UE is described. The apparatus may include means for receiving an indication of a set of multiple reference signal resource sets for estimating a set of multiple transmission beams of a wireless node, the set of multiple transmission beams associated with one or more frequency ranges. The apparatus may include means for receiving at least one reference signal based on the indication of the set of multiple reference signal resource sets indicating, for each frequency range, a respective reference signal resource set for estimating a subset of the set of multiple transmission beams associated with a different frequency range, the reference signal resource set including a set of multiple reference signal resources each within the frequency range and each associated with at least one transmission beam of the subset.

A non-transitory computer-readable medium storing code for wireless communication at a UE is described. The code may include instructions executable by a processor to receive an indication of a set of multiple reference signal resource sets for estimating a set of multiple transmission beams of a wireless node, the set of multiple transmission beams associated with one or more frequency ranges. The code may include instructions executable by a processor to receive at least one reference signal based on the indication of the set of multiple reference signal resource sets indicating, for each frequency range, a respective reference signal resource set for estimating a subset of the set of multiple transmission beams associated with a different frequency range, the reference signal resource set including a set of multiple reference signal resources each within the frequency range and each associated with at least one transmission beam of the subset.

In some examples of the method, apparatuses, and non-transitory computer-readable medium described herein, each reference signal resource in a given reference signal resource set may be associated with a respective transmission beam and respective reference signal.

In some examples of the method, apparatuses, and non-transitory computer-readable medium described herein, each reference signal resource in a given reference signal resource set may be associated with multiple transmission beams and multiple reference signals.

Some examples of the method, apparatuses, and non-transitory computer-readable medium described herein may further include operations, features, means, or instructions for determining that a first transmission beam may be assigned a first frequency range for data transmissions, determining that a second transmission beam may be assigned a second frequency range for data transmission, where the at least one reference signal is associated with the second transmission beam and received over the first frequency range, the reference signal occupying one or more reference signal resources in the reference signal resource set for the first frequency range.

Some examples of the method, apparatuses, and non-transitory computer-readable medium described herein may further include operations, features, means, or instructions for receiving, over a first frequency range, data associated with a first transmission beam that may be assigned the first frequency range for data transmissions and receiving an indication of a duration of time that data transmissions over the first frequency range will be interrupted.

In some examples of the method, apparatuses, and non-transitory computer-readable medium described herein, the set of multiple reference signal resource sets may be associated with a first mode of estimating transmission beams and the method, apparatuses, and non-transitory computer-readable medium may include further operations, features, means, or instructions for receiving an indication of a second reference signal resource set associated with a second mode of estimating transmission beams and receiving an indication of the first mode or the second mode.

A method of wireless communication is described. The method may include determining that a set of transmission beams is associated with a set of frequency ranges such that at least some transmission beams of the set of transmission beams are associated with different frequency ranges of the set of frequency ranges. The method may include determining a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The method may include transmitting an indication of the reference signal resource set to a UE for estimation of one or more of the set of transmission beams.

An apparatus for wireless communication is described. The apparatus may include a processor and memory coupled to the processor. The processor and memory may be configured to determine that a set of transmission beams is associated with a set of frequency ranges such that at least some transmission beams of the set of transmission beams are associated with different frequency ranges of the set of frequency ranges. The processor and memory may be configured to determine a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The processor and memory may be configured to transmit an indication of the reference signal resource set to a UE for estimation of one or more of the set of transmission beams.

Another apparatus for wireless communication is described. The apparatus may include means for determining that a set of transmission beams is associated with a set of frequency ranges such that at least some transmission beams of the set of transmission beams are associated with different frequency ranges of the set of frequency ranges. The apparatus may include means for determining a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The apparatus may include means for transmitting an indication of the reference signal resource set to a UE for estimation of one or more of the set of transmission beams.

A non-transitory computer-readable medium storing code for wireless communication is described. The code may include instructions executable by a processor to determine that a set of transmission beams is associated with a set of frequency ranges such that at least some transmission beams of the set of transmission beams are associated with different frequency ranges of the set of frequency ranges. The code may include instructions executable by a processor to determine a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The code may include instructions executable by a processor to transmit an indication of the reference signal resource set to a UE for estimation of one or more of the set of transmission beams.

Some examples of the method, apparatuses, and non-transitory computer-readable medium described herein may further include operations, features, means, or instructions for transmitting, using a first transmission beam, a first reference signal over a first reference signal resource included in a first reference signal resource group, and transmitting, using a second transmission beam and concurrent with transmitting the first reference signal, a second reference signal over a second reference signal resource included in a second reference signal resource group.

In some examples of the method, apparatuses, and non-transitory computer-readable medium described herein, the set of reference signal resource groups may be staggered in the time domain. Some examples of the method, apparatuses, and non-transitory computer-readable medium described herein may further include operations, features, means, or instructions for transmitting, using a first transmission beam, a first reference signal over a first reference signal resource included in a first reference signal resource group, and transmitting, using a second transmission beam and after the threshold period of time, a second reference signal over a second reference signal resource included in a second reference signal resource group.

In some examples of the method, apparatuses, and non-transitory computer-readable medium described herein, at least two reference signal resource groups overlap in the time domain while other reference signal resource groups may be staggered in the time domain, the at least two reference signal resource groups including a first reference signal resource group and a second reference signal resource group.

In some examples of the method, apparatuses, and non-transitory computer-readable medium described herein, the first reference signal resource group may be associated with a first transmission beam having a first coverage area and the second reference signal resource group may be associated with a second transmission beam having a second coverage area, the first coverage area separated from the second coverage area by a third coverage area of a third transmission beam.

Some examples of the method, apparatuses, and non-transitory computer-readable medium described herein may further include operations, features, means, or instructions for associating each reference signal resource within a given frequency range with a transmission beam that may be assigned a different frequency range for data transmissions.

Some examples of the method, apparatuses, and non-transitory computer-readable medium described herein may further include operations, features, means, or instructions for transmitting, over a first frequency range, data to a second UE using a first transmission beam assigned the first frequency range for data communications, and transmitting a reference signal over a second frequency range using the first transmission beam.

Some examples of the method, apparatuses, and non-transitory computer-readable medium described herein may further include operations, features, means, or instructions for determining that transmission of the reference signal over the second frequency range using the first transmission beam will interrupt data transmissions to the second UE over the first frequency range, and transmitting an indication of a duration of the interruption to the second UE.

Some examples of the method, apparatuses, and non-transitory computer-readable medium described herein may further include operations, features, means, or instructions for determining a spatial relationship between coverage areas of the set of transmission beams, and transmitting an indication of the spatial relationship to the UE. In some examples of the method, apparatuses, and non-transitory computer-readable medium described herein, the indication includes a vector indicating which transmission beams may have adjacent coverage areas.

In some examples of the method, apparatuses, and non-transitory computer-readable medium described herein, each reference signal resource group includes a pair of reference signal resources. Some examples of the method, apparatuses, and non-transitory computer-readable medium described herein may further include operations, features, means, or instructions for coding division multiplexing a first reference signal for transmission over the pair of reference signal resources using a first beam and a second reference signal for transmission over the pair of reference signal resources using a second beam.

Some examples of the method, apparatuses, and non-transitory computer-readable medium described herein may further include operations, features, means, or instructions for frequency division multiplexing a first reference signal for transmission over the pair of reference signal resources using a first beam and a second reference signal for transmission over the pair of reference signal resources using a second beam.

In some examples of the method, apparatuses, and non-transitory computer-readable medium described herein, the indication of the reference signal resource set may be signaled in a system information block or a radio resource control message.

Some examples of the method, apparatuses, and non-transitory computer-readable medium described herein may further include operations, features, means, or instructions for determining a second reference signal resource set that may be associated with a second mode of estimating transmission beams, and transmitting an indication of the second reference signal resource set to the UE.

Some examples of the method, apparatuses, and non-transitory computer-readable medium described herein may further include operations, features, means, or instructions for selecting the first mode or the second mode based on a capability of the UE, and transmitting an indication of the first mode or the second mode to the UE.

A method of wireless communication is described. The method may include determining that each of a set of transmission beams is assigned a respective frequency range for data transmissions. The method may include determining, for each frequency range, a reference signal resource set for estimating a subset of the transmission beams assigned a different frequency range, the reference signal resource set including a set of reference signal resources each within the frequency range and each associated with one or more transmission beams of the subset of transmission beams. The method may include transmitting an indication of the reference signal resource set to a UE for estimation of the subset of transmission beams.

An apparatus for wireless communication is described. The apparatus may include a processor and memory coupled to the processor. The processor and memory may be configured to determine that each of a set of transmission beams is assigned a respective frequency range for data transmissions. The processor and memory may be configured to determine, for each frequency range, a reference signal resource set for estimating a subset of the transmission beams assigned a different frequency range, the reference signal resource set including a set of reference signal resources each within the frequency range and each associated with one or more transmission beams of the subset of transmission beams. The processor and memory may be configured to transmit an indication of the reference signal resource set to a UE for estimation of the subset of transmission beams.

Another apparatus for wireless communication is described. The apparatus may include means for determining that each of a set of transmission beams is assigned a respective frequency range for data transmissions. The apparatus may include means for determining, for each frequency range, a reference signal resource set for estimating a subset of the transmission beams assigned a different frequency range, the reference signal resource set including a set of reference signal resources each within the frequency range and each associated with one or more transmission beams of the subset of transmission beams. The apparatus may include means for transmitting an indication of the reference signal resource set to a UE for estimation of the subset of transmission beams.

A non-transitory computer-readable medium storing code for wireless communication is described. The code may include instructions executable by a processor to determine that each of a set of transmission beams is assigned a respective frequency range for data transmissions. The code may include instructions executable by a processor to determine, for each frequency range, a reference signal resource set for estimating a subset of the transmission beams assigned a different frequency range, the reference signal resource set including a set of reference signal resources each within the frequency range and each associated with one or more transmission beams of the subset of transmission beams. The code may include instructions executable by a processor to transmit an indication of the reference signal resource set to a UE for estimation of the subset of transmission beams.

In some examples of the method, apparatuses, and non-transitory computer-readable medium described herein, each reference signal resource in the reference signal resource set may be associated with a respective transmission beam and respective reference signal.

In some examples of the method, apparatuses, and non-transitory computer-readable medium described herein, each reference signal resource in the reference signal resource set may be associated with multiple transmission beams and multiple reference signals.

Some examples of the method, apparatuses, and non-transitory computer-readable medium described herein may further include operations, features, means, or instructions for determining that a first transmission beam may be assigned a first frequency range for data transmissions, and transmitting, using a second transmission beam assigned a second frequency range for data transmissions, a reference signal over at least one reference signal resource in the reference signal resource set in the first frequency range.

Some examples of the method, apparatuses, and non-transitory computer-readable medium described herein may further include operations, features, means, or instructions for determining that data communications over the second frequency range will be interrupted during transmission of the reference signal over the first frequency range, and transmitting an indication of a duration of the interruption to a device receiving the data communications over the second frequency range.

Some examples of the method, apparatuses, and non-transitory computer-readable medium described herein may further include operations, features, means, or instructions for transmitting, using a third transmission beam, a second reference signal over at least one reference signal resource in the reference signal resource set in the first frequency range.

In some examples of the method, apparatuses, and non-transitory computer-readable medium described herein, the second reference signal may be transmitted over a same group of reference signal resources as the reference signal.

In some examples of the method, apparatuses, and non-transitory computer-readable medium described herein, the second reference signal may be transmitted over a different group of reference signal resources than the reference signal.

Some examples of the method, apparatuses, and non-transitory computer-readable medium described herein may further include operations, features, means, or instructions for transmitting a first reference signal and a second reference signal over a set of reference signal resources in a reference signal resource set for a third frequency range, the first reference signal transmitted using a first transmission beam assigned a first frequency range for data transmissions and the second reference signal transmitted using a second transmission beam assigned a second frequency range for data transmissions.

In some examples of the method, apparatuses, and non-transitory computer-readable medium described herein, the first reference signal and the second reference signal may be code division multiplexed or frequency division multiplexed.

Some examples of the method, apparatuses, and non-transitory computer-readable medium described herein may further include operations, features, means, or instructions for determining a second reference signal resource set that may be associated with a second mode of estimating transmission beams, and transmitting an indication of the second reference signal resource set to the UE.

Some examples of the method, apparatuses, and non-transitory computer-readable medium described herein may further include operations, features, means, or instructions for selecting the first mode or the second mode based on a capability of the UE, and transmitting an indication of the first mode or the second mode to the UE.

A method of wireless communication is described. The method may include determining a set of transmission beams that are each assigned respective frequency ranges for data transmissions, the set of transmission beams including a first transmission beam assigned a first frequency range for data transmissions. The method may include transmitting a synchronization signal block over a second frequency range using the first transmission beam. The method may include transmitting a reference signal, concurrent with transmitting the synchronization signal block, over the second frequency range using the first transmission beam.

An apparatus for wireless communication is described. The apparatus may include a processor and memory coupled to the processor. The processor and memory may be configured to determine a set of transmission beams that are each assigned respective frequency ranges for data transmissions, the set of transmission beams including a first transmission beam assigned a first frequency range for data transmissions. The processor and memory may be configured to transmit a synchronization signal block over a second frequency range using the first transmission beam. The processor and memory may be configured to transmit a reference signal, concurrent with transmitting the synchronization signal block, over the second frequency range using the first transmission beam.

Another apparatus for wireless communication is described. The apparatus may include means for determining a set of transmission beams that are each assigned respective frequency ranges for data transmissions, the set of transmission beams including a first transmission beam assigned a first frequency range for data transmissions. The apparatus may include means for transmitting a synchronization signal block over a second frequency range using the first transmission beam. The apparatus may include means for transmitting a reference signal, concurrent with transmitting the synchronization signal block, over the second frequency range using the first transmission beam.

A non-transitory computer-readable medium storing code for wireless communication is described. The code may include instructions executable by a processor to determine a set of transmission beams that are each assigned respective frequency ranges for data transmissions, the set of transmission beams including a first transmission beam assigned a first frequency range for data transmissions. The code may include instructions executable by a processor to transmit a synchronization signal block over a second frequency range using the first transmission beam. The code may include instructions executable by a processor to transmit a reference signal, concurrent with transmitting the synchronization signal block, over the second frequency range using the first transmission beam.

Some examples of the method, apparatuses, and non-transitory computer-readable medium described herein may further include operations, features, means, or instructions for transmitting data to a device over the first frequency range using the first transmission beam.

Some examples of the method, apparatuses, and non-transitory computer-readable medium described herein may further include operations, features, means, or instructions for determining that data transmissions to the device over the first frequency range will be interrupted based on concurrently transmitting the synchronization signal block and the reference signal over the second frequency range using the first transmission beam, and transmitting an indication of the interruption to the device prior to concurrently transmitting the synchronization signal block and the reference signal.

In some examples of the method, apparatuses, and non-transitory computer-readable medium described herein, the set of beams may include operations, features, means, or instructions for transmitting a second synchronization signal block over a third frequency range using the second transmission beam, and transmitting a second reference signal, concurrent with transmitting the second synchronization signal block, over the third frequency range using the second transmission beam.

A method of wireless communication at a UE is described. The method may include determining that a wireless node in communication with the UE has a set of transmission beams associated with a set of frequency ranges for communication with the UE such that at least some of the transmission beams of the set of transmission beams are associated with different frequency ranges of the set of frequency ranges. The method may include receiving an indication of a reference signal resource set for estimating the one or more transmission beams. The method may include determining, based on the indication, that the reference signal resource set includes a set of reference signal resource groups each including one or more reference signal resources, each of the set of reference signal resource groups being associated with a respective frequency range and at least one transmission beam.

An apparatus for wireless communication at a UE is described. The apparatus may include a processor and memory coupled to the processor. The processor and memory may be configured to determine that a wireless node in communication with the UE has a set of transmission beams associated with a set of frequency ranges for communication with the UE such that at least some of the transmission beams of the set of transmission beams are associated with different frequency ranges of the set of frequency ranges. The processor and memory may be configured to receive an indication of a reference signal resource set for estimating the one or more transmission beams. The processor and memory may be configured to determine, based on the indication, that the reference signal resource set includes a set of reference signal resource groups each including one or more reference signal resources, each of the set of reference signal resource groups being associated with a respective frequency range and at least one transmission beam.

Another apparatus for wireless communication at a UE is described. The apparatus may include means for determining that a wireless node in communication with the UE has a set of transmission beams associated with a set of frequency ranges for communication with the UE such that at least some of the transmission beams of the set of transmission beams are associated with different frequency ranges of the set of frequency ranges. The apparatus may include means for receiving an indication of a reference signal resource set for estimating the one or more transmission beams. The apparatus may include means for determining, based on the indication, that the reference signal resource set includes a set of reference signal resource groups each including one or more reference signal resources, each of the set of reference signal resource groups being associated with a respective frequency range and at least one transmission beam.

A non-transitory computer-readable medium storing code for wireless communication at a UE is described. The code may include instructions executable by a processor to determine that a wireless node in communication with the UE has a set of transmission beams associated with a set of frequency ranges for communication with the UE such that at least some of the transmission beams of the set of transmission beams are associated with different frequency ranges of the set of frequency ranges. The code may include instructions executable by a processor to receive an indication of a reference signal resource set for estimating the one or more transmission beams. The code may include instructions executable by a processor to determine, based on the indication, that the reference signal resource set includes a set of reference signal resource groups each including one or more reference signal resources, each of the set of reference signal resource groups being associated with a respective frequency range and at least one transmission beam.

Some examples of the method, apparatuses, and non-transitory computer-readable medium described herein may further include operations, features, means, or instructions for receiving a first reference signal transmitted using a first transmission beam, the first reference signal occupying a first reference signal resource included in a first reference signal resource group, and receiving, concurrently with receiving the first reference signal, a second reference signal transmitted using a second transmission beam and occupying a second reference signal resource included in a second reference signal resource group.

In some examples of the method, apparatuses, and non-transitory computer-readable medium described herein, the set of reference signal resource groups may be staggered in the time domain.

Some examples of the method, apparatuses, and non-transitory computer-readable medium described herein may further include operations, features, means, or instructions for receiving a first reference signal transmitted using a first transmission beam, the first reference signal occupying a first reference signal resource included in a first reference signal resource group, and receiving, after the threshold period of time, a second reference signal transmitted using a second transmission beam, the second reference signal occupying a second reference signal resource included in a second reference signal resource group.

In some examples of the method, apparatuses, and non-transitory computer-readable medium described herein, at least two reference signal resource groups overlap in the time domain and the other reference signal resource groups may be staggered in the time domain, the at least two reference signal resource groups including a first reference signal resource group and a second reference signal resource group.

In some examples of the method, apparatuses, and non-transitory computer-readable medium described herein, the first reference signal resource group may be associated with a first transmission beam having a first coverage area and the second reference signal resource group may be associated with a second transmission beam having a second coverage area, the first coverage area separated from the second coverage area by a third coverage area of a third transmission beam.

Some examples of the method, apparatuses, and non-transitory computer-readable medium described herein may further include operations, features, means, or instructions for associating each reference signal resource within a given frequency range with a transmission beam that may be assigned a different frequency range for data transmissions.

Some examples of the method, apparatuses, and non-transitory computer-readable medium described herein may further include operations, features, means, or instructions for receiving, over a first frequency range, data transmitted using a first transmission beam that may be assigned the first frequency range for data transmissions, and receiving, over the first frequency range, a reference signal transmitted using a second transmission beam that may be assigned a second frequency range for data transmissions.

Some examples of the method, apparatuses, and non-transitory computer-readable medium described herein may further include operations, features, means, or instructions for receiving, over a first frequency range, data transmitted using a first transmission beam that may be assigned the first frequency range for data transmissions, and receiving an indication of a duration of time that data transmissions over the first frequency range will be interrupted.

Some examples of the method, apparatuses, and non-transitory computer-readable medium described herein may further include operations, features, means, or instructions for determining a spatial relationship between a first coverage area of a first transmission beam and a second coverage area of a second transmission beam, the first coverage area encompassing the UE, and receiving a reference signal transmitted using the second transmission beam based at least on the spatial relationship.

Some examples of the method, apparatuses, and non-transitory computer-readable medium described herein may further include operations, features, means, or instructions for receiving an indication of the spatial relationship from the wireless node, the indication including a vector indicating transmission beams that may have coverage areas adjacent to the first coverage area.

Some examples of the method, apparatuses, and non-transitory computer-readable medium described herein may further include operations, features, means, or instructions for determining that reference signal resources associated with the first and second transmission beams may be separated in the time domain, where the spatial relationship may be based on determining that reference signal resources associated with the first and second transmission beams may be separated in the time domain.

In some examples of the method, apparatuses, and non-transitory computer-readable medium described herein, the indication of the reference signal resource set may be signaled in a system information block or a radio resource control message.

Some examples of the method, apparatuses, and non-transitory computer-readable medium described herein may further include operations, features, means, or instructions for receiving an indication of a second reference signal resource set associated with a second mode of estimating transmission beams, and receiving an indication of the first mode or the second mode.

In some examples of the method, apparatuses, and non-transitory computer-readable medium described herein, the wireless node includes a satellite operating in a non-terrestrial network.

A method of wireless communication at a UE is described. The method may include determining that a wireless node in communication with the UE has one or more transmission beams for communicating with the UE over one or more frequency ranges. The method may include receiving an indication of a set of reference signal resource sets for estimating a set of transmission beams, the set of transmission beams including the one or more transmission beams. The method may include determining, for each frequency range, a respective reference signal resource set for estimating a subset of the set of transmission beams associated with a different frequency range, the reference signal resource set including a set of reference signal resources each within the frequency range and each associated with at least one transmission beam of the subset of transmission beams.

An apparatus for wireless communication at a UE is described. The apparatus may include a processor and memory coupled to the processor. The processor and memory may be configured to determine that a wireless node in communication with the UE has one or more transmission beams for communicating with the UE over one or more frequency ranges. The processor and memory may be configured to receive an indication of a set of reference signal resource sets for estimating a set of transmission beams, the set of transmission beams including the one or more transmission beams. The processor and memory may be configured to determine, for each frequency range, a respective reference signal resource set for estimating a subset of the set of transmission beams associated with a different frequency range, the reference signal resource set including a set of reference signal resources each within the frequency range and each associated with at least one transmission beam of the subset of transmission beams.

Another apparatus for wireless communication at a UE is described. The apparatus may include means for determining that a wireless node in communication with the UE has one or more transmission beams for communicating with the UE over one or more frequency ranges. The apparatus may include means for receiving an indication of a set of reference signal resource sets for estimating a set of transmission beams, the set of transmission beams including the one or more transmission beams. The apparatus may include means for determining, for each frequency range, a respective reference signal resource set for estimating a subset of the set of transmission beams associated with a different frequency range, the reference signal resource set including a set of reference signal resources each within the frequency range and each associated with at least one transmission beam of the subset of transmission beams.

A non-transitory computer-readable medium storing code for wireless communication at a UE is described. The code may include instructions executable by a processor to determine that a wireless node in communication with the UE has one or more transmission beams for communicating with the UE over one or more frequency ranges. The code may include instructions executable by a processor to receive an indication of a set of reference signal resource sets for estimating a set of transmission beams, the set of transmission beams including the one or more transmission beams. The code may include instructions executable by a processor to determine, for each frequency range, a respective reference signal resource set for estimating a subset of the set of transmission beams associated with a different frequency range, the reference signal resource set including a set of reference signal resources each within the frequency range and each associated with at least one transmission beam of the subset of transmission beams.

In some examples of the method, apparatuses, and non-transitory computer-readable medium described herein, each reference signal resource in a given reference signal resource set may be associated with a respective transmission beam and respective reference signal.

In some examples of the method, apparatuses, and non-transitory computer-readable medium described herein, each reference signal resource in a given reference signal resource set may be associated with multiple transmission beams and multiple reference signals.

Some examples of the method, apparatuses, and non-transitory computer-readable medium described herein may further include operations, features, means, or instructions for determining that a first transmission beam may be assigned a first frequency range for data transmissions, determining that a second transmission beam may be assigned a second frequency range for data transmission, and receiving a reference signal transmitted over the first frequency range using the second transmission beam, the reference signal occupying one or more reference signal resources in the reference signal resource set for the first frequency range.

Some examples of the method, apparatuses, and non-transitory computer-readable medium described herein may further include operations, features, means, or instructions for receiving, over a first frequency range, data transmitted using a first transmission beam that may be assigned the first frequency range for data transmissions, and receiving an indication of a duration of time that data transmissions over the first frequency range will be interrupted.

Some examples of the method, apparatuses, and non-transitory computer-readable medium described herein may further include operations, features, means, or instructions for receiving an indication of a second reference signal resource set associated with a second mode of estimating transmission beams, and receiving an indication of the first mode or the second mode.

In some examples of the method, apparatuses, and non-transitory computer-readable medium described herein, the wireless node includes a satellite operating in a non-terrestrial network.

DETAILED DESCRIPTION

Figure 1:
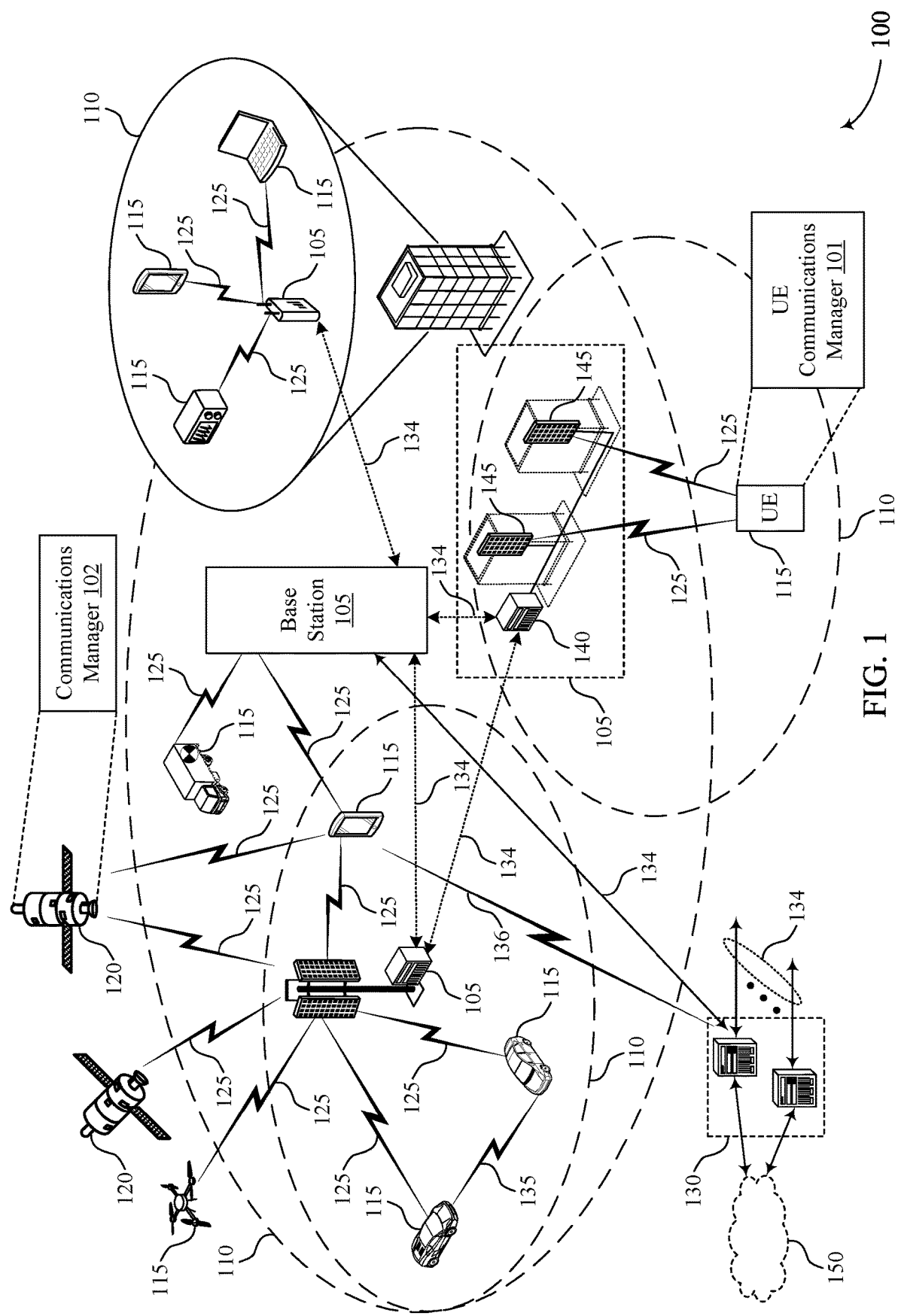
FIG. 1 illustrates an example of a system for wireless communications that supports beam management in a wireless communications network in accordance with one or more aspects of the present disclosure.

Non-terrestrial networks (sometimes referred to as NTNs) may provide wireless communications coverage by using high-altitude vehicles between user terminals and base stations (e.g., next-generation NodeBs or giga-NodeBs (either of which may be referred to as a gNB)) (also referred to as access stations or access gateways)). Base stations may, for example, transmit data to a satellite that relays the data to a user terminal or vice-versa. A high-altitude vehicle itself may be a base station, in some examples. A user terminal may be any device having the capability to transmit signals to a satellite. Examples of a user terminal may include a UE, a relay equipment configured to relay a signal between a satellite and a user terminal, or a combination thereof.

A satellite may use multiple transmission beams to provide coverage to user terminals on the ground. For example, the satellite may use different transmission beams to communicate with user terminals in different locations on the ground. Although the transmission beams may be fixed relative to the satellite, the footprints (e.g., coverage areas) of the beams may move with respect to a user terminal due to the movement of the satellite. So, over time the transmission beam used to communicate with a user terminal may become weak or otherwise undesirable. In such cases, the satellite and user terminal may cooperate so that a transmission beam with better quality can be determined. For example, the synchronization signals (e.g., synchronization signal blocks (SSBs)) transmitted by the satellite to enable initial access may be used by a user terminal to determine the best transmission beam for communicating with the user terminal.

But using synchronization signals as a basis for beam management may be computationally burdensome for a user terminal. For example, measuring a synchronization signal for channel estimation may require many processing resources. Additionally, the user terminal may perform extraneous operations associated with synchronizing to the network even though the user terminal is already synchronized in the time and frequency domains.

According to the techniques described herein, reference signals such as channel state information (CSI) reference signals (CSI-RSs) may be used to reduce the computational burden (e.g., processing load and complexity) of a user terminal engaged in beam management. For example, a satellite serving the user terminal may transmit a CSI-RS using each transmission beam employed by the satellite for data communications. The CSI-RSs may be transmitted over a set of reference signal resources that includes groups of reference signal resources within respective frequency ranges (e.g., bandwidth part (BWP), frequency interval). As used herein, a frequency range may refer to a frequency interval that a single transmission may potentially fully occupy and may be different from the frequency ranges, e.g., abbreviated as FR1 (410 MHz-7.125 GHz) or FR2 (24.25 GHz-52.6 GHz), which may be used to refer to a plurality of potential frequency intervals that may be occupied by multiple transmissions from multiple transmitters.

In a first example, each transmission beam may be assigned a respective bandwidth part (or frequency range) for data transmissions and the satellite may use each transmission beam to transmit a respective CSI-RS over the bandwidth part (or the frequency range) assigned to that transmission beam. To implement this example, the satellite may determine a set of CSI-RS resources that spans multiple bandwidth parts (or frequency ranges). The set of CSI-RS resources may include multiple groups of CSI-RS resources and each group of CSI-RS resources may be associated with a respective bandwidth part (or frequency range). In some implementations, the groups of CSI-RS resources may be aligned in the time domain. In other implementations, the groups of CSI-RS resources may be distributed in the time domain. In yet other implementations, some groups of CSI-RS resources may be aligned in the time domain while others are distributed in the time domain.

In a second example, each transmission beam may be assigned a respective bandwidth part (or frequency range) for data transmissions, but the satellite may use each transmission beam to transmit a respective CSI-RS over the bandwidth part (or the frequency range) currently used to communicate data to the user terminal (as opposed to the bandwidth part (or the frequency range) assigned to that transmission beam for data communications). To implement this example, the satellite may determine multiple sets of CSI-RS resources each associated with a respective bandwidth part (or frequency range).

In a third example, the satellite may transmit CSI-RSs simultaneously with synchronization signals (e.g., SSBs). For instance, when the satellite switches bandwidth parts (e.g., or frequency ranges) to transmit an SSB, the satellite may also transmit a CSI-RS over the same bandwidth part (e.g., or frequency range) as the SSB. The CSI-RS may be transmitted at the same time as the SSB and using the same transmission beam as the SSB. The term "simultaneously" may be used to describe operations that occur at the same point in time or within a same window of time. The term "concurrently" may be used to describe operations that occur at substantially the same time (e.g., slightly offset in time) or at partially overlapping times.

Aspects of the disclosure are initially described in the context of a wireless communications system. Aspects of the disclosure are further described in the context of an additional wireless communications system and one or more reference signal resource configurations that relate to aspects transmission beam management in a wireless communications network. Aspects of the disclosure are further illustrated by and described with reference to apparatus diagrams, system diagrams, and flowcharts that relate to several aspects related to transmission beam management for wireless communications networks.

FIG. 1 illustrates an example of a wireless communications system 100 that supports beam management in a wireless communications network in accordance with one or more aspects of the present disclosure. The wireless communications system 100 may include one or more base stations 105 (e.g., gNodeBs (gNBs), and/or radio heads (RHs)), one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 134 (e.g., via an S1, N2, N3, or other interface). The base stations 105 may communicate with one another over the backhaul links 134 (e.g., via an X2, Xn, or other interface) either directly (e.g., directly between base stations 105), or indirectly (e.g., via core network 130), or both. In some examples, the backhaul links 134 may be or include one or more wireless links. A UE 115 may communicate with the core network 130 through communication link 136.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a bandwidth part) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more bandwidth parts having the same or different numerologies. In some examples, a UE 115 may be configured with multiple bandwidth parts. In some examples, a single bandwidth part for a carrier may be active at a given time and communications for the UE 115 may be restricted to one or more active bandwidth parts.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may also include one or more satellites 120. Satellite 120 may communicate with base stations 105 and UEs 115 (such as user terminals). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105. In this case, the satellite 120 may directly communicate with the Internet without going through a ground base station (e.g., base station 105). In other cases, satellite 120 may be an example of a relay transponder for a ground base station. A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

In some examples, a satellite 120 may be configured as a single cell with N transmission beams and M frequency ranges (e.g., bandwidth parts). Thus, the satellite 120 may use multiple transmission beams and bandwidths parts to serve devices on the ground, such as base stations 105 and UEs 115. For example, the satellite 120 may select one of its transmission beams to communicate with a UE 115 over a bandwidth part. However, movement of the satellite may cause the transmission beam to become attenuated. In such cases, UE 115 and satellite 120 may engage in beam management to select a new transmission beam for communications to UE 115. Such beam management may prevent cell handover by enabling intra-satellite handover (e.g., handover between transmission beams of the same satellite).

In some examples, a base station 105 or satellite 120 may include a communications manager 102, which may manage communications in a non-terrestrial network communications system. For a satellite 120, communications manager 102 may be configured to perform or facilitate the beam management techniques described herein. For example, the communications manager 102 may define a set of resources for conveying reference signals (e.g., CSI-RSs) that a UE 115 uses for channel estimation and beam management. In some cases, the CSI-RSs may be non-zero power (NZP) CSI-RSs. A resource configured to convey CSI-RSs may be referred to herein as a reference signal resource, and a combination of reference signal resources may be referred to as a reference signal resource set. In some examples, (e.g., in a first type of configuration), the communications manager 102 may define a reference signal resource set that spans multiple bandwidth parts in use by the satellite 120. In other examples (e.g., in a second type of configuration), the communications manager 102 may define a reference signal resource set for each bandwidth part in use by the satellite 120.

UEs 115 may include a user terminal communications manager 101, which may manage communications in a non-terrestrial network communications system. For a UE 115, user terminal communications manager 101 may be configured to perform or facilitate the beam management techniques described herein. For example, the user terminal communications manager 101 may determine one or more reference signal resource sets for use in channel estimation and beam management. Upon determining the reference signal resource set(s), the user terminal communications manager 101 may measure one or more reference signal resources to determine channel state information that can be used by a serving satellite 120 to select a new transmission beam.

Although described with reference to a non-terrestrial wireless communications network, the beam management techniques described herein may be implemented by any type of wireless communications network including a terrestrial wireless communications network.

Figure 2:
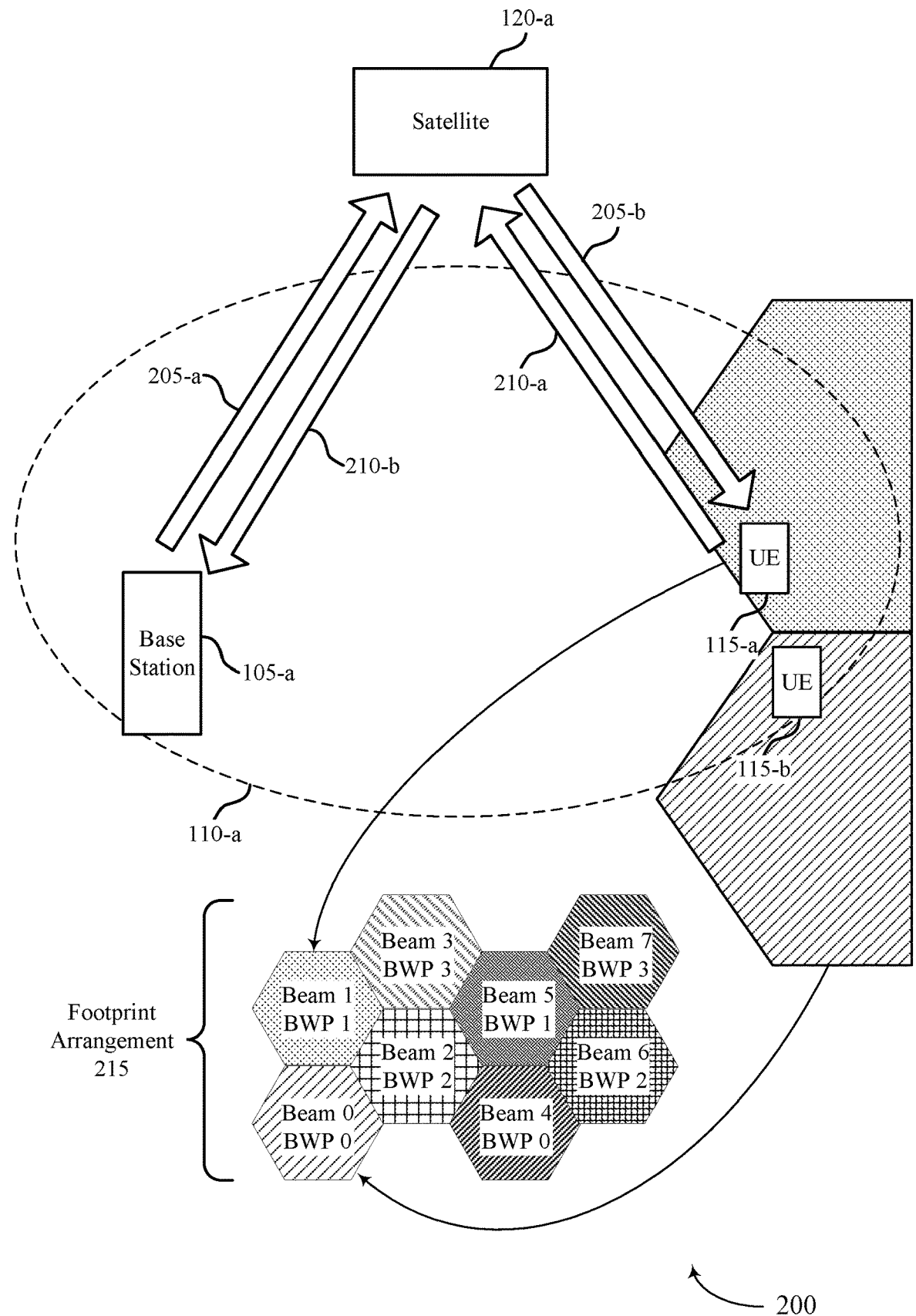
FIG. 2 illustrates an example of a wireless communications system that supports beam management in a wireless communications network in accordance with one or more aspects of the present disclosure.

FIG. 2 illustrates an example of a wireless communications system 200 that supports beam management in a wireless communications network in accordance with one or more aspects of the present disclosure. In some examples, the wireless communications system 200 may implement aspects of the wireless communications system 100. For example, the wireless communications system 200 may include a base station 105 a, a UE 115-*a*, a UE 115-*b*, and a satellite 120-*a*, which may be examples of a base station 105, a UE 115, and a satellite 120 as described with reference to FIG. 1. In some cases, a user terminal, UE, base station, and/or satellite may be referred to as a "device," "wireless communications device," or "wireless node." Although described with reference to a satellite operating in a non-terrestrial network, the beam management techniques described herein may be implemented by a terrestrial base station (e.g., base station 105-*a*) operating in a terrestrial network.

The wireless communications system 200 may provide geographic coverage area 110-*a* by using high-altitude vehicles between the base station 105-*a* and the UEs 115. The base station 105-*a* may therefore serve a geographic coverage area 110-*a* with assistance of or through the satellite 120-*a*. In some examples, the base station 105-*a* may not have its own ground geographic coverage area. For example, the base station 105-*a* may communicate to the satellite 120-*a* without directly communicating to any ground user terminals, such as, for example UE 115-*a*. In some examples, a ground base station (e.g., base station 105-*a*) may be a gateway (e.g., in this case, the satellite 120-*a* can itself function as a base station (i.e., can perform scheduling, radio link control, etc.)).

A non-terrestrial network may be absent of ground base stations that directly communicate with UEs 115 without relaying communications through satellites. In some other examples, a non-terrestrial network may be formed of satellites and be absent of any ground base stations. In some examples, the satellite 120-*a* may relay communications between the base station 105-*a* and the UE 115-*a* and/or the UE 115-*b*. For example, the base station 105-*a* may communicate with the UE 115-*a* and/or UE 115-*b* via the satellite 120-*a* or vice-versa. In some examples, for communications originating at the base station 105-*a* and going to the UE 115-*a* (or UE 115-*b*), the base station 105-*a* may transmit an uplink transmission 205-*a* to the satellite 120-*a*. The satellite 120-*a* may relay the uplink transmission 205-*a* as a downlink transmission 205-*b* to the UE 115-*a* (or UE 115-*b*). In other examples, for communications originating at a UE 115 and going to the base station 105-*a*, the UE 115 may transmit an uplink transmission 210-*a* to the satellite 120-*a*. The satellite 120-*a* may relay the uplink transmission 210-*a* as a downlink transmission 210-*b* to base station 105-*b*.

In some examples, satellite 120-*a* may provide wireless communications coverage over a large geographical area by using multiple transmission beams. For example, satellite 120-*a* may use different transmission beams to serve (e.g., provide connectivity to) different geographical areas. As an illustration, satellite 120-*a* may use eight transmission beams (denoted Beam 0 through Beam 7) to serve eight respective geographical areas (illustrated as differently shaded hexagons). The area served by a particular transmission beam may be referred to as the footprint or coverage area of that transmission beam. In the depicted example, UE 115-*a* may be in the coverage area of transmission beam 1 and thus may receive communications from satellite 120-*a* over transmission beam 1. Similarly, UE 115-*b* may be in the coverage area of transmission beam 0 and thus may receive communications from satellite 120-*a* over transmission 0. Collectively, the footprints may be referred to as a footprint arrangement 215.

In some examples, each transmission beam employed by satellite 120-*a* may be assigned a respective frequency range (e.g., bandwidth part, set of contiguous frequencies) for data communications so that interference between transmission beams (which may be used simultaneously) is reduced. For example, transmission beam 0 may be assigned a first frequency range (e.g., bandwidth part 0) for data communications, transmission beam 1 may be assigned a second frequency range (e.g., bandwidth part 1) for data communications, transmission beam 2 may be assigned a third frequency range (e.g., bandwidth part 2) for data communications, and transmission beam 3 may be assigned a fourth frequency range (e.g., bandwidth part 3) for data communications. A data communication (or transmission) may refer to a communication (or transmission) that conveys user content as opposed to control content (e.g., content for managing the wireless communications system 200).

Although each transmission beam is assigned a respective frequency range (e.g., bandwidth part) for data communications, some transmission beams may share a frequency range (e.g., be assigned the same bandwidth part) so that the spectral efficiency of the wireless communications system 200 is increased. For example, transmission beam 4 may be assigned bandwidth part 0 for data communications, transmission beam 5 may be assigned bandwidth part 1 for data communications, transmission beam 6 may be assigned bandwidth part 2 for data communications, and transmission beam 7 may be assigned bandwidth part 3 for data communications. To avoid interference, bandwidth parts may be shared by transmission beams with non-adjacent footprints (e.g., transmission beam 0 may share bandwidth part 0 with transmission beam 4). For ease of illustration, transmission beams with shared bandwidth parts are shown with similar shading patterns.

Although the footprint arrangement 215 is fixed relative to satellite 120-*a*, the location of the footprint arrangement 215 may move with respect to a UE 115 due to the mobile nature of satellite 120-*a*. Thus, a transmission beam (e.g., transmission beam 1) that initially provides robust service to UE 115-*a* may deteriorate (e.g., weaken) over time as the footprint of the transmission beam moves. Upon detecting the deterioration (e.g., diminished quality) of transmission beam 1, UE 115-*a* and/or satellite 120 may attempt to determine a better (e.g., higher quality, stronger, etc.) transmission beam that can be used for transmissions to UE 115-*a*. In some cases, UE 115-*a* may use synchronization signals (e.g., SSBs) to determine the new transmission beam. But such a technique may be undesirable because processing synchronization signals for beam management may be computationally burdensome and user terminal 115-*a* may perform extraneous operations such as timing and/or frequency synchronization.

According to the techniques described herein, a satellite 120 and UE 115 may increase beam management efficiency by using reference signals. For example, a satellite 120 may use different transmission beams to transmit CSI-RSs to a UE 115. The CSI-RSs may be known signals that, when measured by the UE 115, allow UE 115 to estimate the channel so that channel quality information (e.g., CSI) can be sent back to satellite 120. To provide comprehensive beam management, each transmission beam employed by the satellite 120 may be associated with a respective CSI-RS and the CSI-RS may be unique to that transmission beam (e.g., to allow for differentiation). Different configurations of the resources used to convey the CSI-RSs may be provide distinct improvements as described below. Although described with reference to CSI-RS, the beam management techniques described herein may be implemented using any type of reference signal.

Figure 3:
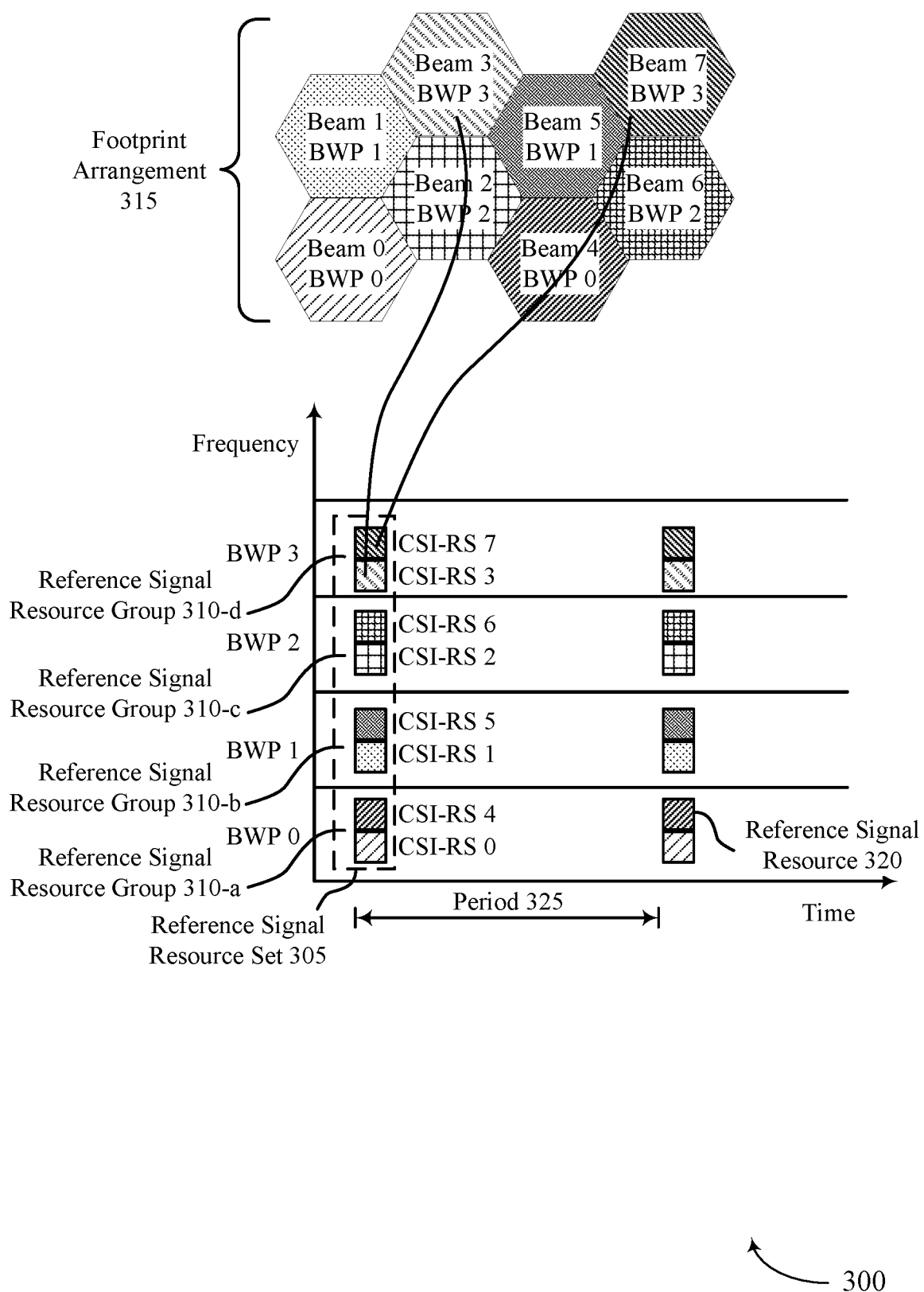
FIG. 3 illustrates an example of a configuration of reference signal resources that supports beam management in a wireless communications network in accordance with one or more aspects of the present disclosure.

FIG. 3 illustrates an example of a configuration 300 of reference signal resources that supports beam management in a wireless communications network in accordance with one or more aspects of the present disclosure. In some examples, the configuration 300 may be used by a wireless communications system 100 or 200. For example, configuration 300 may be defined, determined, and/or used by a satellite and UE, which may be examples of a satellite 120 and UE 115 as described with reference to FIGS. 1 and 2. Configuration 300 may be described with reference to footprint arrangement 315, which may be an example of footprint arrangement 215 described with reference to FIG. 2. Thus, each transmission beam associated with configuration 300 may have a respective frequency range (e.g., bandwidth part) assigned to it for data transmissions as shown by footprint arrangement 315. Signals transmitted using a particular transmission beam may be indicated by the shading pattern corresponding to that transmission beam. Although described with reference to bandwidth parts, configuration 300 can be implemented using frequency ranges other than bandwidth parts.

The configuration 300 may an example of a first type of configuration in which each CSI-RS sent using a transmission beam occupies resources in the bandwidth part assigned to that transmission beam. In particular, configuration 300 illustrates an example of the first type of configuration in which reference signal resource groups 310 are aligned (e.g., at least partially overlap) in the time domain. Thus, the implementation of configuration 300 may be less complex compared to other configurations of the first type (e.g., configuration 400 and configuration 500). Because the bandwidth part used for a CSI-RS transmitted using a transmission beam is the same bandwidth part assigned to the transmission beam for data transmissions, the first type of configuration may be less complex for a base station to implement compared to configurations of a second type as described herein.

The configuration 300 may include a reference signal resource set 305 that spans multiple bandwidth parts (e.g., bandwidth part 0 through bandwidth part 3). For example, the configuration 300 may include one or more reference signal resource groups 310. In the illustrated example, configuration 300 includes reference signal resource group 310-*a*, reference signal resource group 310-*b*, reference signal resource group 310-*c*, and reference signal resource group 310-*d*. However, other possibilities are contemplated.

Each reference signal resource group 310 may include one or more reference signal resources 320 that comprise time and frequency resources (e.g., resource elements (REs)) for carrying CSI-RS within a respective bandwidth part. In the illustrated example, reference signal resource group 310-*a* may include two reference signal resources 320 that convey CSI-RS 0 and CSI-RS 4, reference signal resource group 310-*b* may include two reference signal resources 320 that convey CSI-RS 1 and CSI-RS 5, reference signal resource group 310-*c* may include two reference signal resources 320 that convey CSI-RS 2 and CSI-RS 6, and reference signal resource group 310-*d* may include two reference signal resources 320 that convey CSI-RS 3 and CSI-RS 7. Thus, each reference signal resource group 310 may be associated with a respective bandwidth part.

Each CSI-RS may be associated with a unique transmission beam and different CSI-RSs are differentiated in FIG. 3 by numeral. The transmission beam used to transmit a CSI-RS over each reference signal resource is indicated by the shading pattern of the reference signal resource. For example, transmission beam 0 is used to transmit CSI-RS 0 (indicated by the pattern for CSI-RS 0 matching the pattern for transmission beam 0), transmission beam 1 is used to transmission CSI-RS 1 (indicated by the pattern for CSI-RS 1 matching the pattern for transmission beam 1), transmission beam 2 is used to transmission CSI-RS 2 (indicated by the pattern for CSI-RS 2 matching the pattern for transmission beam 2), and so on and so forth. Thus, the depiction of footprint arrangement 315 may serve as a legend that indicates the transmission beam used for each reference signal resource that conveys a CSI-RS.

As noted, the reference signal resource groups 310 may be partially or entirely aligned in the time domain. Thus, the reference signal resources 320 in each bandwidth part may overlap in the time domain. For example, the reference signal resources used to convey CSI-RS 0 and CSI-RS 4 (included in reference signal resource group 310-*a*) may overlap with the reference signal resources used to convey CSI-RS 3 and CSI-RS 7 (included in reference signal resource group 310-*d*). Additionally, the reference signal resources 320 included in a reference signal resource group 310 may overlap in the time domain. For example, the reference signal resource used to convey CSI-RS 0 may overlap with the reference signal used to convey CSI-RS 4.

In some examples, a satellite may use code division multiplexing (CDM) so that CSI-RSs transmitted over the same reference signal resources can be differentiated by a UE. Alternatively, the satellite may use FDM so that CSI-RSs transmitted over the same time resources can be differentiated. For example, the satellite may use CDM (e.g., CDM-4, CDM-8) or FDM on CSI-RS 0 and CSI-RS 4 so that a UE can differentiate two or more CSI-RSs transmitted over shared time and/or frequency resources.

Although eight CSI-RSs are transmitted in four different bandwidth parts during period 325, a UE may only be able to receive and measure the CSI-RSs in one bandwidth part per period 325. For example, during period 325 the UE may receive and measure CSI-RS 0 and CSI-RS 4 because they are transmitted on reference signal resources within bandwidth part 0. However, the UE may not be able to receive/measure other CSI-RSs during period 325 because the UE cannot operate on different bandwidth parts at the same time. Thus, it may take four periods 325 for a UE to measure all eight CSI-RSs. By staggering the reference signal resource groups 310 in the time domain, as shown in configuration 400, a UE may be able to measure all eight CSI-RSs in a single period 325.

Figure 4:
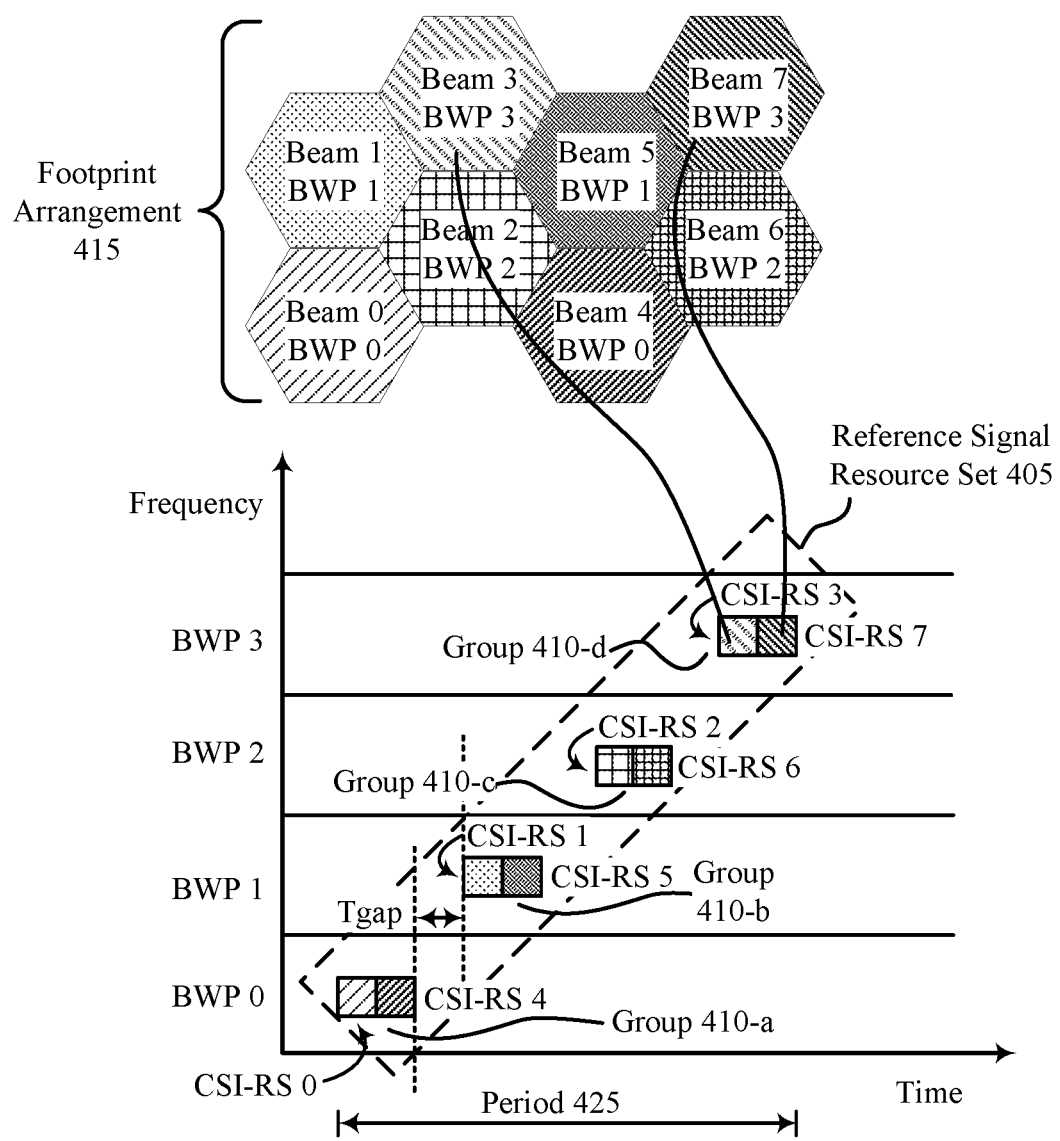
FIG. 4 illustrates an example of a configuration of reference signal resources that supports beam management in a wireless communications network in accordance with one or more aspects of the present disclosure.

FIG. 4 illustrates an example of a configuration 400 of reference signal resources that supports beam management in a wireless communications network in accordance with one or more aspects of the present disclosure. In some examples, the configuration 400 may be used by a wireless communications system 100 or 200. For example, configuration 400 may be defined, determined and/or used by a satellite and UE, which may be examples of satellite 120 and UE 115 as described with reference to FIGS. 1 and 2. Configuration 400 may be described with reference to footprint arrangement 415, which may be an example of footprint arrangements 215 and 315 described with reference to FIGS. 2 and 3. Thus, each transmission beam associated with configuration 400 may have a respective frequency range (e.g., bandwidth part) assigned to it for data transmissions as shown by footprint arrangement 415. Signals transmitted using a particular transmission beam may be indicated by the shading pattern corresponding to that transmission beam. Although described with reference to bandwidth parts, configuration 400 can be implemented using frequency ranges other than bandwidth parts.

The configuration 400 may be an example of a first type of configuration in which each CSI-RS sent using a transmission beam occupies resources in the bandwidth part assigned to that transmission beam. In particular, configuration 400 illustrates an example of the first type of configuration in which reference signal resource groups 410 are staggered in the time domain. Thus, configuration 400 may be more efficient relative to other configurations of the first type (e.g., configuration 300). Because the bandwidth part used for a CSI-RS is the same bandwidth part assigned to the transmission beam for data transmissions, the first type of configuration may be relatively simple for a base station to implement compared to configurations of a second type as described herein.

Configuration 400 may be similar to configuration 300. Thus, configuration 400 may include a reference signal resource set 405 that includes multiple reference signal resource groups 410. However, unlike the reference signal resource groups 310 in configuration 300, the reference signal resource groups 410 in configuration 400 may be staggered in the time domain. For example, there may be a threshold duration of time (e.g., Tgap) between the trailing reference signal resource in a reference signal resource group 410 (e.g., reference signal resource group 410-*b*) and a leading reference signal resource in a subsequent reference signal resource group (e.g., reference signal resource group 410-*a*). The threshold duration of time may be long enough to allow a UE to switch between bandwidth parts (e.g., tune its radio components to a different bandwidth part). Thus, configuration 400 may allow a UE to receive and measure all eight CSI-RSs in a single period 425.

In some examples, a satellite may time division multiplex the reference signals associated with a reference signal resource group 410 so that they can be differentiated by a UE. In such examples, the reference signal resources of a reference signal resource group 410 may occur over the same frequencies at different times. In other examples, the satellite may use CDM or FDM to differentiate the reference signals in a reference signal resource group.

Although configuration 400 allows a UE to receive and measure all eight CSI-RSs in a single period 425, in some cases the duration of period 425 may be reduced by considering the spatial relationships between footprints in footprint arrangement 415. Configuration 500 illustrates a configuration that leverages spatial relationships to increase the efficiency of a beam management procedure.

Figure 5:
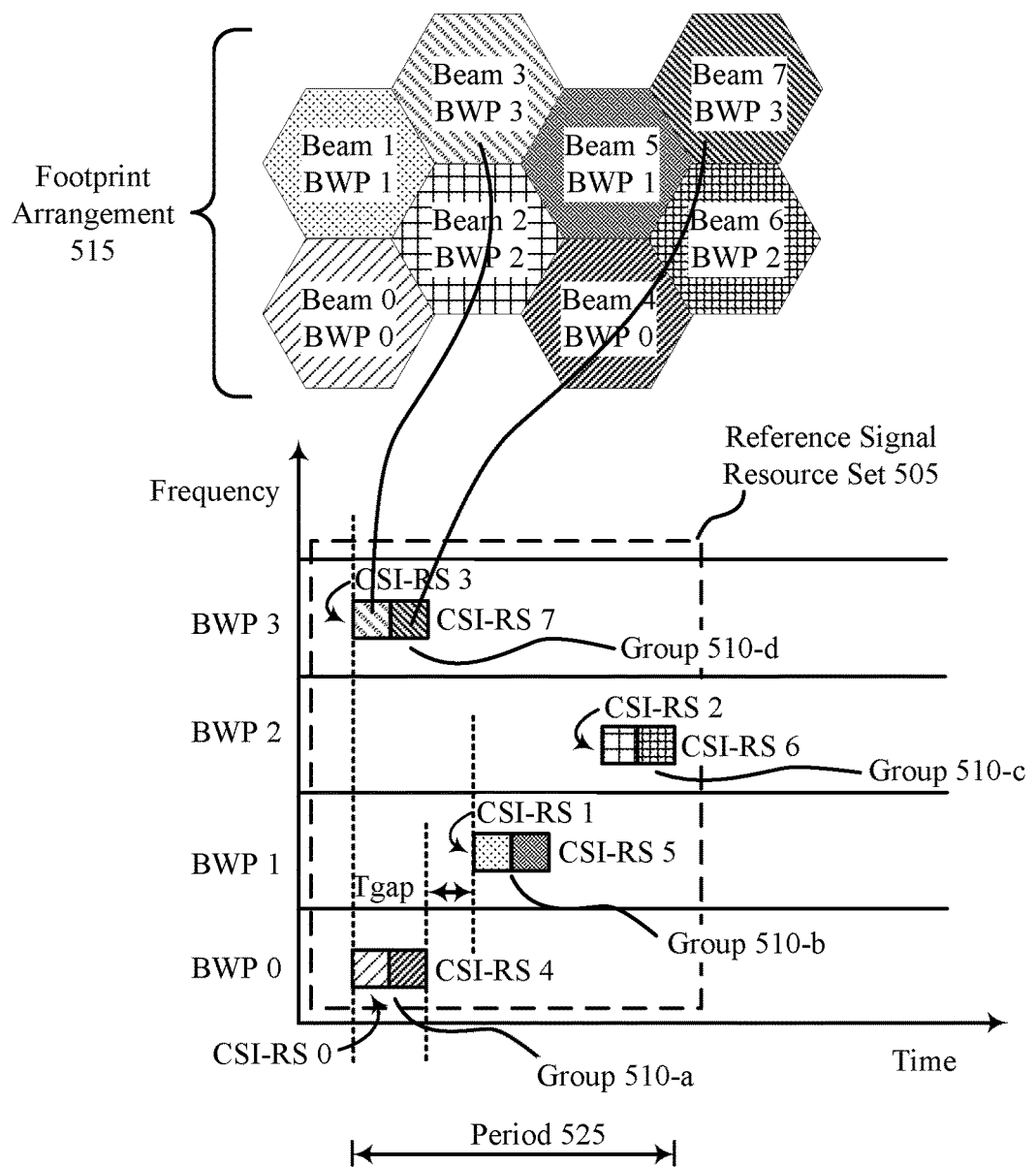
FIG. 5 illustrates an example of a configuration of reference signal resources that supports beam management in a wireless communications network in accordance with one or more aspects of the present disclosure.

FIG. 5 illustrates an example of a configuration 500 of reference signal resources that supports beam management in a wireless communications network in accordance with one or more aspects of the present disclosure. In some examples, the configuration 500 may be used by a wireless communications system 100 or 200. For example, configuration 500 may be defined, determined, and/or used by a satellite and UE, which may be examples of satellite 120 and UE 115 as described with reference to FIGS. 1 and 2. Configuration 500 may be described with reference to footprint arrangement 515, which may be an example of footprint arrangements 215, 315, and 415 described with reference to FIGS. 2 through 4. Thus, each transmission beam associated with configuration 500 may have a respective frequency range (e.g., bandwidth part) assigned to it for data transmissions as shown by footprint arrangement 515. Signals transmitted using a particular transmission beam may be indicated by the shading pattern corresponding to that transmission beam. Although described with reference to bandwidth parts, configuration 500 can be implemented using frequency ranges other than bandwidth parts The configuration 500 may an example of a first type of configuration in which each CSI-RS sent using a transmission beam occupies resources in the bandwidth part assigned to that transmission beam. In particular, configuration 500 illustrates an example of the first type of configuration in which some reference signal resource groups 510 overlap in the time domain and others are staggered. Thus, configuration 500 may be more efficient relative to other configurations of the first type (e.g., configuration 300 and configuration 400). Because the bandwidth part used for a CSI-RS is the same bandwidth part assigned to the transmission beam for data transmissions, the first type of configuration may be relatively simple for a base station to implement compared to configurations of a second type as described herein.

Configuration 500 may be similar to configuration 400. Thus, configuration 500 may include a reference signal resource set 505 that includes multiple reference signal resource groups 510. However, unlike the reference signal resource groups 410 in configuration 400, some of the reference signal resource groups 510 in configuration 500 may overlap in the time domain while others may be staggered in the time domain. For example, reference signal resource group 510-d may overlap in time with reference signal resource group 510-a. Such overlap is permitted because it is unlikely that a UE will need to measure both CSI-RS 0 and CSI-RS 3 due to the spatial relationship between transmission beam 0 and transmission beam 3. That is, a UE in or near the footprint of transmission beam is unlikely to receive transmission beam 3 because the footprint of transmission beam 3 is spatially separated from the footprint of transmission beam 0. Similar reasoning applies to CSI-RS 4 and CSI-RS 7. Because two reference signal resource groups 510 are aligned in the time domain, the duration of period 525 may be reduced relative to the duration of period 425. Thus, configuration 500 may be more efficient compared to configuration 400.

Although reference signal resource group 510-a and reference signal resource group 510-d are aligned in the time domain, other reference signal resource groups 510 may be staggered in the time domain. For example, there may be a threshold duration of time (e.g., Tgap) between reference signal resource group 510-a and reference signal resource group 510-b. Similarly, there may be a threshold duration of time between reference signal resource group 510-b and reference signal resource group 510-d. The threshold time duration may allow a UE to perform frequency tuning (e.g., switch its radio between bandwidth parts).

Figure 6:
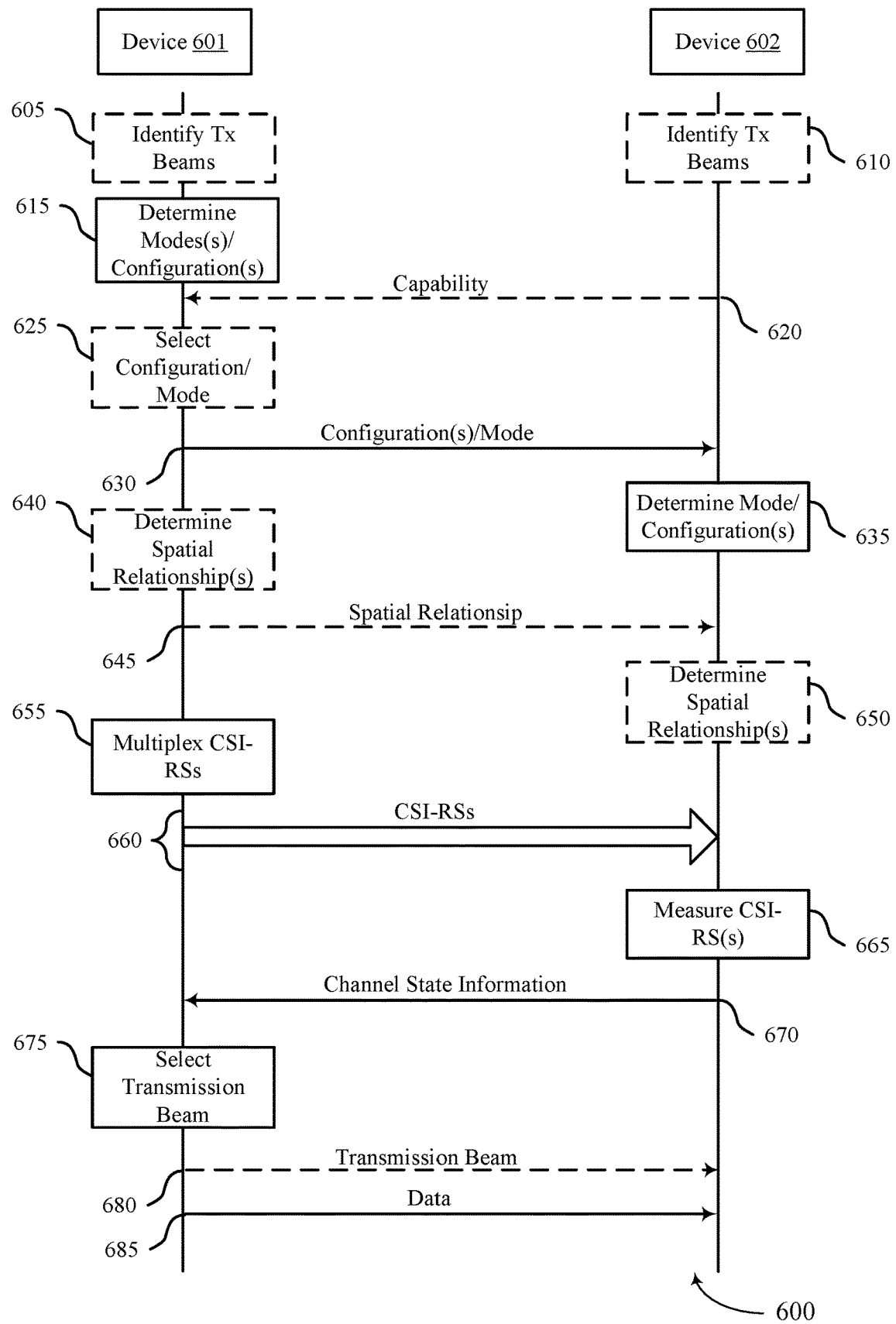
FIG. 6 illustrates an example of a process flow that supports beam management in a wireless communications network in accordance with one or more aspects of the present disclosure.

FIG. 6 illustrates an example of a process flow 600 that supports beam management in a wireless communications network in accordance with one or more aspects of the present disclosure. In some examples, process flow 600 may implement aspects of wireless communications system 100 or 200. For example, process flow 600 may be implemented by a device 601 and device 602, which may be examples of a satellite, base station, or UE as described herein. Process flow 600 may be an example of beam management procedure that uses a configuration of the first type (e.g., configuration 300, 400, or 500).

Alternative examples of the following may be implemented, where some operations are performed in a different order than described or are not performed at all. In some cases, operations may include additional features not mentioned below, or further operations may be added.

At 605, device 601 may identify a quantity of transmission beams used by device 601. Device 601 may also determine the frequency range (e.g., bandwidth part) assigned to each transmission beam for data transmissions. At 610, device 602 may identify a quantity of transmission beams used by device 601. Device 602 may also determine the frequency range (e.g., bandwidth part) assigned to each transmission beam for data transmissions.

At 615, device 601 may determine one or more configurations of reference signal resources to be used for different modes of beam management (e.g., different modes of channel estimation for transmission beams). For example, device 601 may determine a first type of configuration (e.g., configuration 300, 400, or 500) and/or a second type of configuration (e.g., configuration 700-a or 700-b). The first type of configuration may be associated with a first mode of estimating transmission beams and the second type of configuration may be associated with a second mode of estimating transmission beams.

At 620, device 602 may transmit, and device 601 may receive, an indication of one or more capabilities of device 602. In some cases, the capability may be a power capability. For example, device 602 may indicate whether device 602 is a low-power device (e.g., an Internet-of-Things (IoT) device) or a high-power device (e.g., a UE or base station).

In some cases, device 601 and device 602 may support multiple modes of estimating transmission beams (e.g., device 601 and device 602 may support multiple configurations of reference signal resources). Accordingly, at 625, device 601 may select a mode of estimating transmission beams and an associated configuration of reference signal resources (e.g., a reference signal resource set). In some examples, device 601 may select the mode of estimating transmission beams based on one or more capabilities of device 602. For instance, device 601 may select the first mode of estimating transmission beams based on device 602 being a high-powered device because the configuration associated with the first mode (e.g., configuration 300, 400, or 500) requires device 601 to switch between frequency ranges (e.g., bandwidth parts) to receive CSI-RSs, which is a power consumptive process.

At 630, device 601 may transmit an indication of the selected mode and/or configuration to device 602. The indication of the selected mode and/or configuration may be conveyed via physical layer signaling (e.g., as a cell-specific configuration in a system information block (SIB) message or a UE-specific configuration in the physical downlink control channel (PDCCH)) or via radio resource control (RRC) signaling (e.g., in an RRC message). In some cases, device 601 may also transmit an indication of one or more un-selected configurations so that device 602 can store them for future reference. At 635, device 602 may determine the mode and/or configuration selected by device 601 based on the indication received at 630 (e.g., device 602 may determine a reference signal resource set). In some cases, device 602 may also determine one or more additional configurations based on the indication received at 630. In some examples, device 601 may dynamically switch between modes/configurations (e.g., based on UE capability, satellite resources, etc.). In such cases, device 601 may indicate the new mode and/or configuration via SIB, PDCCH, or RRC signaling.

At 640, in some examples, device 601 may determine the spatial relationship between the coverage areas (e.g., footprints) of two or more transmission beams. For example, device 601 may determine which transmission beams have adjacent coverage areas and which transmission beams have spatially-separated coverage areas. Referring to footprint arrangement 215 as an example, device 601 may determine that the coverage area of transmission beam 0 is adjacent to the coverage areas of transmission beam 1 and transmission beam 2. In some examples, device 601 may represent the spatial relationships between coverage areas using one or more vectors. Table 1 illustrates an example of vectors that represent the spatial relationship between coverage areas of transmission beams. In Table 1, a one indicates that the coverage areas of two transmission beams are adjacent whereas a zero indicates that the coverage areas are non-adjacent. Thus, device 601 may determine a spatial relationship-vector for each transmission beam.

TABLE 1

| Tx Beam | 0 | 1 | 2 | 3 | 4 | 5 | 6 | 7 |
|---|---|---|---|---|---|---|---|---|
| 0 | 0 | 1 | 1 | 0 | 0 | 0 | 0 | 0 |
| 1 | 1 | 0 | 1 | 1 | 0 | 0 | 0 | 0 |
| 2 | 1 | 1 | 0 | 1 | 1 | 1 | 0 | 0 |
| 3 | 0 | 1 | 1 | 0 | 0 | 1 | 0 | 0 |
| 4 | 0 | 0 | 1 | 0 | 0 | 1 | 1 | 0 |
| 5 | 0 | 0 | 1 | 1 | 1 | 1 | 1 | 1 |
| 6 | 0 | 0 | 0 | 0 | 1 | 1 | 0 | 1 |
| 7 | 0 | 0 | 0 | 0 | 0 | 1 | 1 | 0 |

At 645, device 601 may transmit an indication of the spatial relationships for the coverage area of one or more transmission beams to device 602. In some examples, 602 may transmit a spatial relationship-vector for each transmission beam.

At 650, device 602 may determine the spatial relationships for one or more transmission beams. Device 602 may determine the spatial relationships for transmissions beams so that it can increase the efficiency of beam management. For example, device 602 may refrain from receiving/measuring CSI-RSs that are associated with transmission beams that have coverage areas too far away from device 602 to be good candidates for device 602. For instance, referring to footprint arrangement 515 and configuration 500, device 602 may opt not to receive/measure CSI-RS 3 because the coverage areas of transmission beam 3 is far away from the coverage area of the transmission beam currently serving device 602 (e.g., transmission beam 0). Thus, device 602 may conserve processing resources and decrease latency by only measuring certain CSI-RSs (as opposed to indiscriminately measuring all CSI-RSs).

In some examples, device 602 may determine the spatial relationships based on an explicit indication from device 601. For example, device 602 may determine the spatial relationships for a transmission beam's coverage area based on a spatial relationship-vector received from device 601. Alternatively, device 602 may determine the spatial relationships based on the temporal overlap of CSI-RSs. If two CSI-RSs overlap in the time domain, device 602 may infer that the transmission beams used for those CSI-RSs do not have adjacent coverage areas. For instance, referring to configuration 500, device 602 may infer that the coverage areas for transmission beams 0 and 3 are non-adjacent because CSI-RS 0 and CSI-RS 3 are aligned in the time domain. If two CSI-RSs are separated in the time domain, device 602 may infer that the transmission beams used for those CSI-RSs have adjacent coverage areas. For instance, referring to configuration 500, device 602 may infer that the coverage areas for transmission beams 2 and 5 are adjacent because CSI-RS 2 and CSI-RS 5 are separated in the time domain.

At 655, device 601 may multiplex two or more CSI-RSs for transmission over shared resources. For example, device 601 may apply code division multiplexing, time division multiplexing, or frequency division multiplexing to multiple CSI-RSs. In some cases, applying code division multiplexing involves the antenna ports of a first transmission beam and the antennas ports of a second transmission beam multiplying respective CSI-RSs with orthogonal sequences before transmitting the CSI-RSs over the same resources.

At 660, device 601 may transmit one or more CSI-RSs over one or more reference signal resources. Device 601 may transmit the CSI-RSs as shown in configuration 300, 400, or 500. At 665, device 602 may receive and measure one or more CSI-RSs based on the configuration and mode determined at 635. At 670, device 602 may transmit to device 601 channel state information for one or more transmission beams. At 675, device 601 may select, based on the channel state information a transmission beam for communicating with device 602. In some examples, the transmission beam is different than the transmission beam used to communicate with device 602 at 630 or 645. At 680, device 601 may transmit to device 602 an indication of the transmission beam selected at 675. At 685, device 601 may transmit data to device 602 using the transmission beam selected at 675. Thus, device 601 and device 602 may perform beam management using configuration 300, 400, or 500.

Figure 7A:
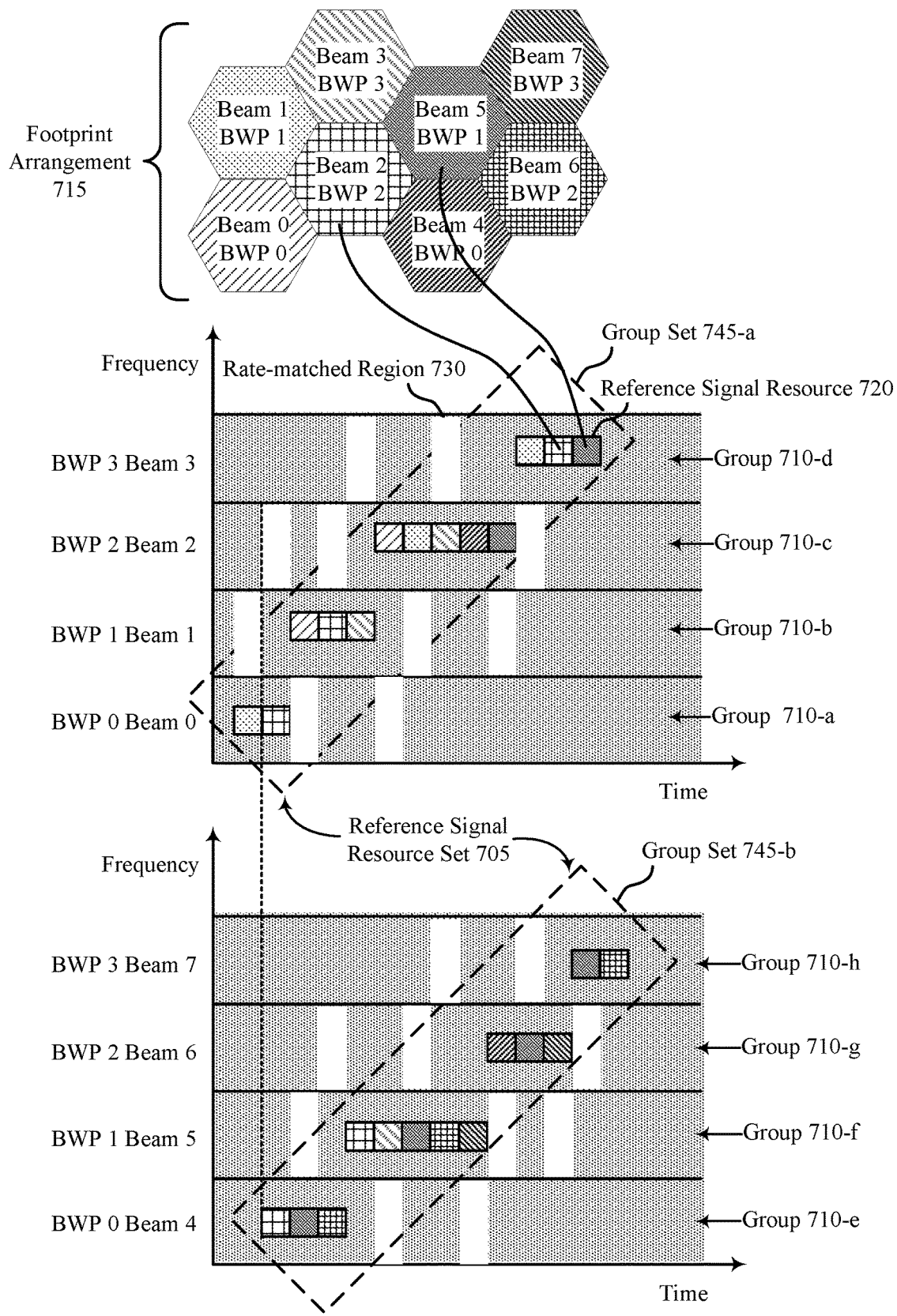
FIGS. 7A and 7B illustrate examples of configurations of reference signal resources that support beam management in a wireless communications network in accordance with one or more aspects of the present disclosure.

FIG. 7A illustrates an example of a configuration 700-a of reference signal resources that supports beam management in a wireless communications network in accordance with one or more aspects of the present disclosure. In some examples, the configuration 700-a may be used by a wireless communications system 100 or 200. For example, configuration 700-a may be defined, determined, and/or used by a satellite and UE, which may be examples of a satellite 120 and UE 115 as described with reference to FIGS. 1 and 2. Configuration 700-a may be described with reference to footprint arrangement 715, which may be an example of footprint arrangement 215 described with reference to FIG. 2. Thus, each transmission beam associated with configuration 700-a may have a respective frequency range (e.g., bandwidth part) assigned to it for data transmissions as shown by footprint arrangement 715. Signals transmitted using a particular transmission beam may be indicated by the shading pattern corresponding to that transmission beam.

Although described with reference to bandwidth parts, configuration 700-*a* can be implemented using frequency ranges other than bandwidth parts.

The configuration 700-*a* may be an example of a second type of configuration in which each CSI-RS occupies resources in a bandwidth part different than the bandwidth part assigned to the transmission beam used for data communication. In particular, configuration 700-*a* illustrates an example of the second type of configuration in which a reference signal resource set 705 spans multiple bandwidth parts. Compared to configurations of the first type, configuration 700-*a* may reduce power consumption at a UE (and decrease beam management latency) because it allows the UE to avoid switching bandwidth parts.

Reference signal resource set 705 may include multiple group sets 745, and each group set 745 may include multiple reference signal resource groups 710 (e.g., reference signal resource group 710-*a* through 710-*h*) each associated with a respective bandwidth part (e.g., bandwidth part 0 through bandwidth part 3). A reference signal resource group 710 may include multiple reference signal resources 720 within the bandwidth part associated with the reference signal resource group 710. Each reference signal resource 720 may carry a CSI-RS. The transmission beam used for a CSI-RS is indicated in FIG. 7 by the shading pattern of the block representing the reference signal resource 720. To provide comprehensive beam management, group set 745-*a* may occur in the same period of time (e.g., frame, subframe, slot, etc.) as group set 745-*b*. To allow for differentiation between CSI-RSs, the satellite implementing configuration 700-*a* may apply a multiplexing technique such as CDM, TDM, or FDM.

As noted, each transmission beam may be assigned a respective bandwidth part for data transmissions. For example, as illustrated by footprint arrangement 715, transmission beam 0 may be assigned bandwidth part 0 for data transmissions. But transmitting a CSI-RS over the bandwidth part assigned to a transmission beam for data transmissions (as is done is configuration 300, 400 and 500) may increase the burden of a receiving device (e.g., UE) because the receiving device has to switch between bandwidth parts to receive the CSI-RS for different transmission beams. To avoid burdening a UE in such a manner, a satellite may implement configuration 700-*a* (e.g., the satellite may switch from the bandwidth part assigned for data communication for a beam to the bandwidth part assigned for data communication for a UE to transmit a CSI-RS).

In configuration 700-*a*, the CSI-RS occupying reference signal resources in a reference signal resource group 710 associated with a particular bandwidth part may be transmitted using a transmission beam that is assigned a different bandwidth part for data transmissions. This way, a UE receiving data communications over a bandwidth part can monitor that bandwidth part for CSI-RS associated with different transmission beams (and thus avoid switching to different bandwidth parts).

As an example, consider reference signal resource group 710-*a*, which is associated with bandwidth part 0. Although bandwidth part 1 and bandwidth part 2 are assigned to transmission beam 1 or transmission beam 2, respectively, for data communications, transmission beam 1 and transmission beam 2 may transmit respective CSI-RSs over reference signal resources included in bandwidth part 0. That is, transmission beam 1 may be used to transmit a CSI-RS over bandwidth part 0 (even though transmission beam 1 is assigned bandwidth part 1 for data communications) and transmission beam 2 may be used to transmit a CSI-RS over bandwidth part 0 (even though transmission beam 2 is assigned bandwidth part 2 for data communications). Transmission beam 1 and transmission beam 2 may be selected for transmitting the CSI-RS over bandwidth part 0 because transmission beam 1 and transmission beam 2 have coverage areas adjacent to the coverage area of transmission beam 0, which is assigned bandwidth part 0 for data communications. Thus, the transmission beams most likely to be candidates for a UE currently served by transmission beam 0 may transmit CSI-RS over the bandwidth part assigned to transmission beam 0 for data communications.

As another example, consider reference signal resource group 710-*f*, which is associated with bandwidth part 1. The transmission beams used to transmit CSI-RS over the reference signal resources in reference signal resource group 710-*f* may include transmission beam 2, transmission beam 3, transmission beam 4, transmission beam 6, and transmission beam 7, because these transmission beams have coverage areas adjacent to the coverage area of transmission beam 5, which is assigned bandwidth part 1 for data communications. Thus, a UE receiving data communications over bandwidth part 1 may receive/measure CSI-RS for candidate transmission beams without tuning its radio to different bandwidth parts.

In some examples, a satellite may be configured to operate a transmission beam on only one bandwidth part at a time. In such cases, the satellite may interrupt data transmissions over a bandwidth part when the transmission beam assigned to that bandwidth part is used to transmit CSI-RS over a different bandwidth part. Such an interruption may be referred to as rate matching and resources that have been rate-matched (e.g., rate-matched regions 730) are depicted as blank rectangles in FIG. 7A. As an example, a rate-matched region occurs on bandwidth part 1 when transmission beam 1 is used to send CSI-RS over bandwidth part 0. Similarly, a rate-matched region occurs on bandwidth part 2 when transmission beam 2 is used to send CSI-RS over bandwidth part 0. And so on and so forth. In some examples, the rate-matched region resulting from transmission of a CSI-RS may be wider (e.g., longer in duration) than the reference signal resource that conveys the CSI-RS due to latency in switching between bandwidth parts.

Figure 7B:
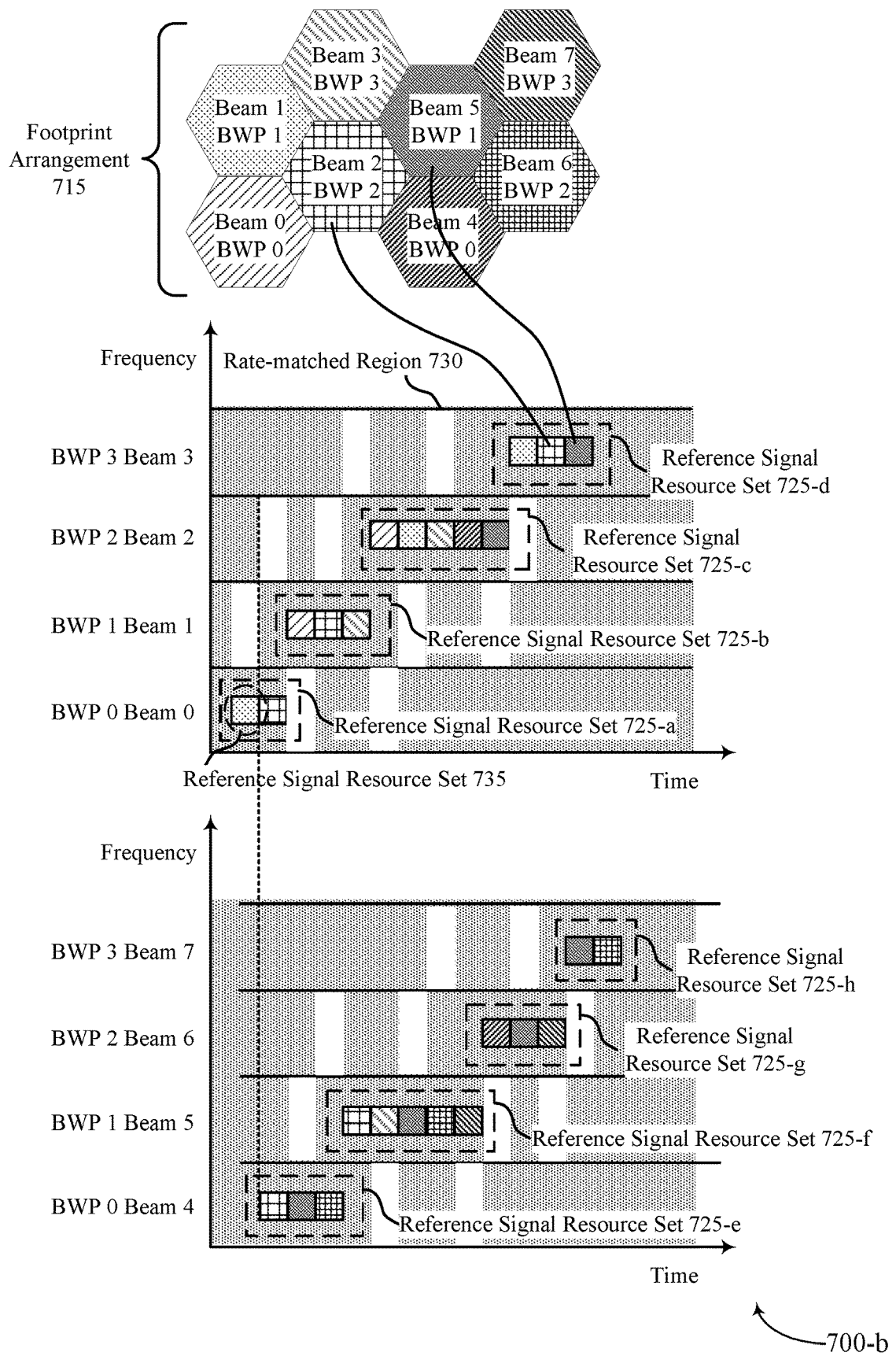

FIG. 7B illustrates an example of a configuration 700-*b* of reference signal resources that supports beam management in a wireless communications network in accordance with one or more aspects of the present disclosure. In some examples, the configuration 700-*b* may be used by a wireless communications system 100 or 200. For example, configuration 700-*b* may be defined, determined, and/or used by a satellite and UE, which may be examples of a satellite 120 and UE 115 as described with reference to FIGS. 1 and 2. Configuration 700-*b* may be described with reference to footprint arrangement 715, which may be an example of footprint arrangement 215 described with reference to FIG. 2. Thus, each transmission beam associated with configuration 700-*b* may have a respective bandwidth part assigned to it for data transmissions as shown by footprint arrangement 715. Signals transmitted using a particular transmission beam may be indicated by the shading pattern corresponding to that transmission beam. Unless described otherwise aspects of configuration 700-*b* may be the same as corresponding aspects of configuration 700-*a*.

The configuration 700-*b* may an example of a second type of configuration in which each CSI-RS occupies resources in a bandwidth part different than the bandwidth part assigned to the transmission beam used for that CSI-RS. In particular, configuration 700-*b* illustrates an example of the second type of configuration in which a reference signal resource set 705 is associated with a single bandwidth part. Compared to configurations of the first type, configuration 700-*a* may reduce power consumption at a UE (and decrease beam management latency) because it allows the UE to avoid switching bandwidth parts.

In one example, configuration 700-*b* may include eight reference signal resource sets (e.g., reference signal resource set 725-*a* through reference signal resource set 725-*h*) each associated with a respective bandwidth part. Thus, a reference signal resource set 725 may include the reference signal resources within a particular bandwidth part. Put another way, a reference signal resource set may include reference signal resources from different transmission beams in a common frequency range or bandwidth part, and each reference signal resource may be used by a different transmission beam. In such examples, CDM may be done independently among antenna ports for each transmission beam.

In a second example, configuration 700-*b* may include reference signal resource sets that are each made up of a single reference signal resource (e.g., reference signal resource set 735). In such an example, a single reference signal resource may be shared by multiple transmission beams and distinct subsets of CDM codes may be allocated to different transmission beams. Further, each subset of CDM codes may be allocated to different antenna ports in the corresponding transmission beam.

Figure 8:
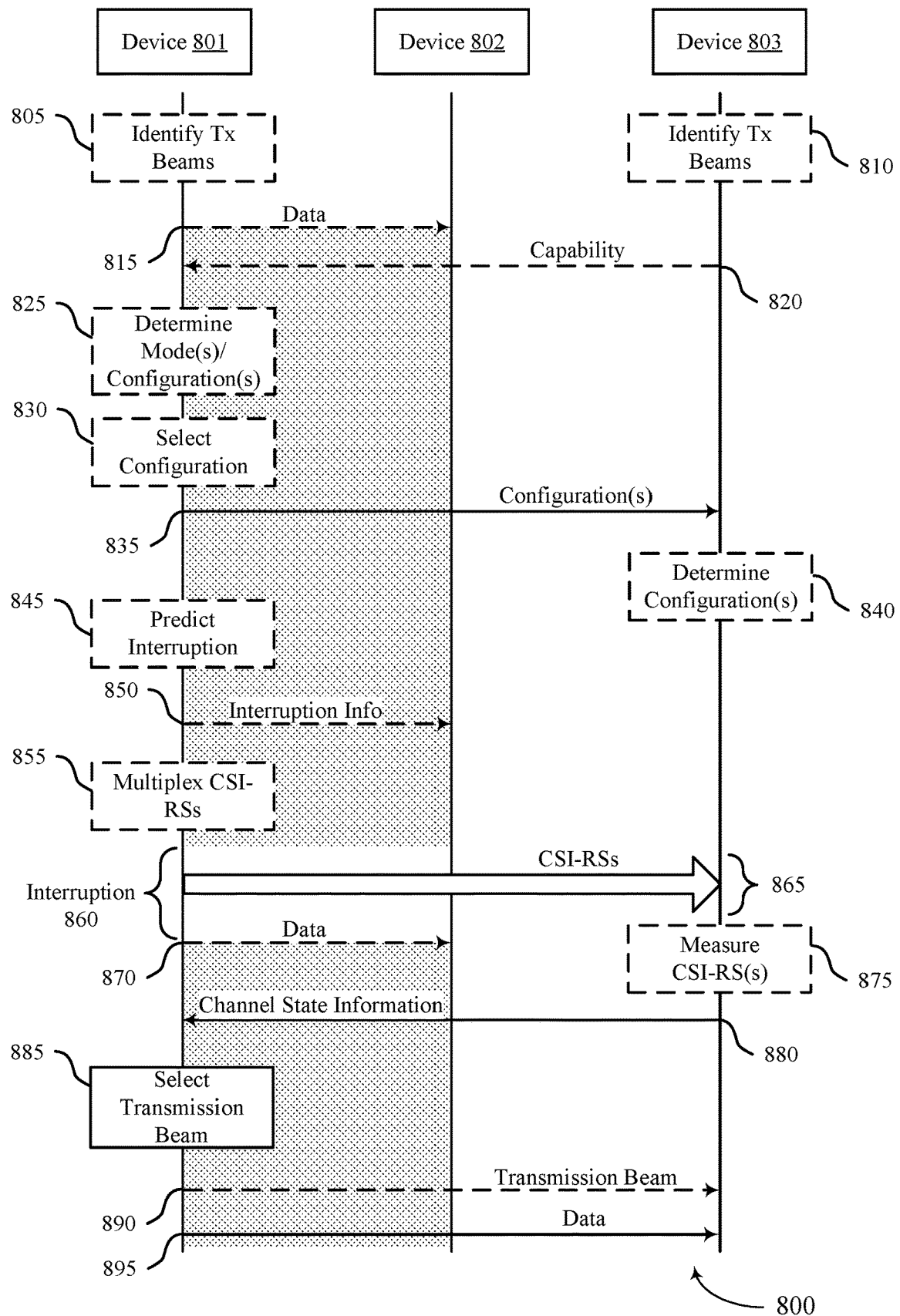
FIG. 8 illustrates an example of a process flow that supports beam management in a wireless communications network in accordance with one or more aspects of the present disclosure.

FIG. 8 illustrates an example of a process flow 800 that supports beam management in a wireless communications network in accordance with one or more aspects of the present disclosure. In some examples, process flow 800 may implement aspects of wireless communications system 100 or 200. For example, process flow 800 may be implemented by a device 801, device 802, and device 803, which may be examples of a satellite, base station, or UE as described herein. Process flow 800 may be an example of beam management procedure that uses a configuration of the second type (e.g., configuration 700-*a* or 700-*b*).

Alternative examples of the following may be implemented, where some operations are performed in a different order than described or are not performed at all. In some cases, operations may include additional features not mentioned below, or further operations may be added.

At 805, device 801 may identify a quantity of transmission beams in use by device 801. Device 801 may also determine the frequency range (e.g., bandwidth part) assigned to each transmission beam for data transmissions. At 810, device 803 may identify a quantity of transmission beams in use by device 801. Device 803 may also determine the frequency range (e.g., bandwidth part) assigned to each transmission beam for data transmissions.

At 815, device 801 may transmit data to device 802. The data may be transmitted over a first frequency range (e.g., a first bandwidth part) using a first transmission beam that is assigned the first frequency range (e.g., first bandwidth part) for data communications. Additional data transmissions to device 802 over the first frequency range (e.g., first bandwidth part) may occur after 815 and may be represented by shaded background. At 820, device 803 may transmit an indication of a device capability (e.g., UE capability) to device 801. At 825, device 801 may determine one or more configurations of reference signal resources to be used for different modes of beam management (e.g., different modes of channel estimation for transmission beams). For example, device 601 may determine a first type of configuration (e.g., configuration 300, 400, or 500) and/or a second type of configuration (e.g., configuration 700-*a* or 700-*b*). The first type of configuration may be associated with a first mode of estimating transmission beams and the second type of configuration may be associated with a second mode of estimating transmission beams.

At 830, device 801 may select a mode of estimating transmission beams and an associated configuration of reference signal resources (e.g., a reference signal resource set). In some examples, device 801 may select the mode of estimating transmission beams based on one or more capabilities of device 803. For instance, device 801 may select the second mode of estimating transmission beams based on device 803 being a low-powered device because the configuration associated with the second mode (e.g., configuration 700-*a* or 700-*b*) does not require device 803 to switch between frequency ranges (e.g., bandwidth parts) to receive CSI-RSs.

At 835, device 801 may transmit an indication of the selected mode and/or configuration to device 803. The indication of the selected mode and/or configuration may be conveyed via physical layer signaling (e.g., as a cell-specific configuration in a SIB message or a UE-specific configuration in the PDCCH) or via RRC signaling (e.g., in an RRC message). In some cases, device 801 may also transmit an indication of one or more un-selected configurations so that device 803 can store them for future reference. At 840, device 803 may determine the mode and/or configuration selected by device 801 based on the indication received at 835 (e.g., device 803 may determine a reference signal resource set). In some cases, device 803 may also determine one or more additional configurations based on the indication received at 835. In some examples, device 801 may dynamically switch between modes/configurations (e.g., based on UE capability, satellite resources, etc.). In such cases, device 601 may indicates the new mode and/or configuration via SIB, PDCCH, or RRC signaling.

At 845, device 801 may predict (e.g., determine) that an interruption in data communications over the first frequency range (e.g., first bandwidth part) will be interrupted when device 801 uses the first transmission beam to transmit CSI-RS over a second frequency range (e.g., second bandwidth part). Thus, device 801 may determine a rate-matched region 730 as described with reference to FIGS. 7A and 7B.

At 850, device 801 may transmit an indication of the upcoming interruption to device 802. In some cases, the indication may include a start time, duration, and/or end time of the interruption 860. Interruption 860 may refer to a cessation of data communications (e.g., a zeroing of downlink throughput) over the first frequency range (e.g., first bandwidth part). In some examples, interruption 860 may start before CSI-RSs are transmitted at 865 and may end after the CSI-RSs are transmitted (e.g., due to latency associated with switching between frequency ranges).

At 855, device 801 may multiplex two or more CSI-RSs for transmission over shared resources. For example, device 801 may apply code division multiplexing, time division multiplexing, or frequency division multiplexing to multiple CSI-RSs. In some cases, applying code division multiplexing includes the antenna ports of a first transmission beam and the antennas ports of a second transmission beam multiplying respective CSI-RSs with orthogonal sequences before transmitting the CSI-RSs over the same resources.

At 865, device 801 may transmit one or more CSI-RSs over one or more reference signal resources. Device 601 may transmit the CSI-RSs as shown in configuration 300, 400, or 500. In some examples, transmitting the CSI-RSs includes transmitting a CSI-RS over a second frequency range (e.g., second bandwidth part) using the first transmission beam. At 870, device 801 may resume data communications over the first frequency range (e.g., first bandwidth part) using the first transmission beam. At 875, device 803 may receive and measure one or more CSI-RSs based on the configuration and mode determined at 840. At 880, device 803 may transmit to device 801 channel state information for one or more transmission beams. The channel state information may be determined based on the measurements made at 875.

At 885, device 801 may select, based on the channel state information, a transmission beam for communicating with device 803. In some examples, the transmission beam is different than the transmission beam used to communicate with device 803 at 835. At 890, device 801 may transmit to device 803 an indication of the transmission beam selected at 885. At 895, device 801 may transmit data to device 803 using the transmission beam selected at 885. Thus, device 801 and device 803 may perform beam management using configuration 700-a or configuration 700-b.

Figure 9:
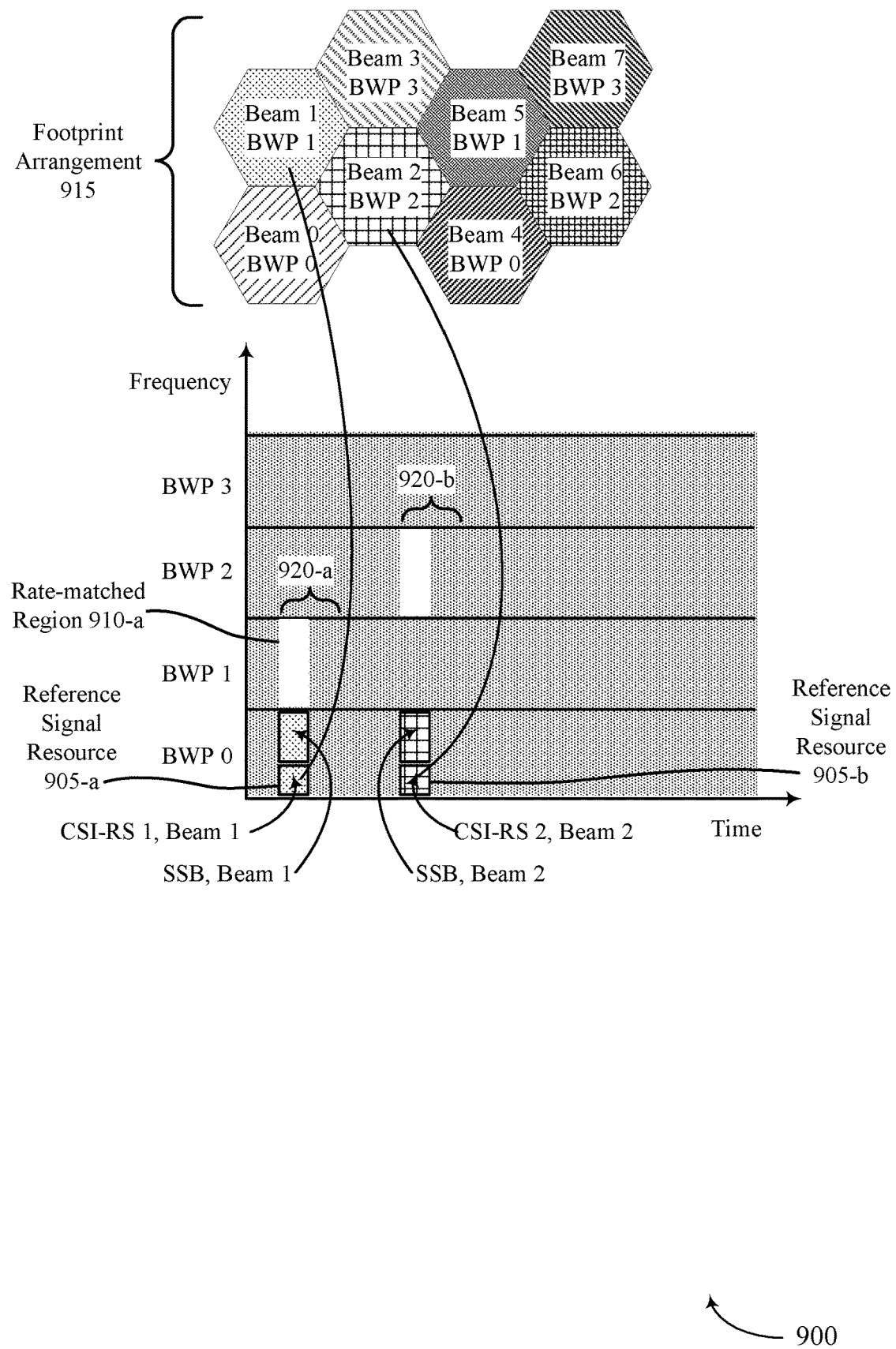
FIG. 9 illustrates an example of a configuration of reference signal resources that supports beam management in a wireless communications network in accordance with one or more aspects of the present disclosure.

FIG. 9 illustrates an example of a configuration 900 of reference signal resources that supports beam management in a wireless communications network in accordance with one or more aspects of the present disclosure. In some examples, the configuration 900 may be used by a wireless communications system 100 or 200. For example, configuration 900 may be defined, determined, and/or used by a satellite and UE, which may be examples of a satellite 120 and UE 115 as described with reference to FIGS. 1 and 2. A satellite using configuration 900 may transmit CSI-RS simultaneously with synchronization signals. In some examples, aspects of configuration 900 may be combined with aspects of configuration 700-a and/or configuration 700-b. Configuration 900 may be described with reference to footprint arrangement 915, which may be an example of footprint arrangement 215 described with reference to FIG. 2. Thus, each transmission beam may have a respective frequency range (e.g., bandwidth part) assigned to it for data transmissions as shown by footprint arrangement 915. Signals transmitted using a particular transmission beam may be indicated by the shading pattern corresponding to that transmission beam. Although described with reference to bandwidth parts, configuration 900 can be implemented using frequency ranges other than bandwidth parts.

A satellite may transmit synchronization signals to support initial access to a wireless network such as a non-terrestrial network (NTN) (e.g., the satellite may transmit SSBs so that devices can synchronize timing and frequency with the satellite). In some examples, a satellite may use each transmission beam in operation at the satellite to transmit a respective synchronization signal. Although each transmission beam is assigned a bandwidth part for data transmissions, the satellite may transmit the synchronization signals over a single known bandwidth part (e.g., bandwidth part 0) to ensure that devices new to the network are able to find the synchronization signals.

For example, although transmission beam 1 is assigned bandwidth part 1 for data transmissions, the satellite may use transmission beam 1 to transmit a synchronization signal over bandwidth part 0. Similarly, the satellite may use transmission beam 2 to transmit a synchronization signal over bandwidth part 0. But such a transmission scheme may result in rate-matched region 910-a and rate-matched region 910-b. If the satellite later transmits CSI-RS 1 and CSI-RS 2 over bandwidth part 0, the rate-matched regions 910 may lengthen (e.g., be longer in duration). For example, rate-matched region 910-a may extend to duration 920-a and rate-matched region 915-b may extend to duration 920-b. Thus, the interruption of data communications on bandwidth part 1 and bandwidth part 2 may be prolonged, which may decrease system performance.

To reduce the durations of the rate-matched regions 910, a satellite may use configuration 900. Configuration 900 may include a quantity of reference signal resources 905 that are aligned in time with resources used to convey synchronization signals. For example, configuration 900 may include reference signal resource 905-a and reference signal resource 905-b. Thus, the satellite may transmit CSI-RS 1 over reference signal resource 905-a using transmission beam 1 at the same time that the satellite transmits an SSB over coincident resources using transmission beam 1. Similarly, the satellite may transmit CSI-RS 2 over reference signal resource 905-b using transmission beam 2 at the same time that the satellite transmits an SSB over coincident resources using transmission beam 2.

Figure 10:
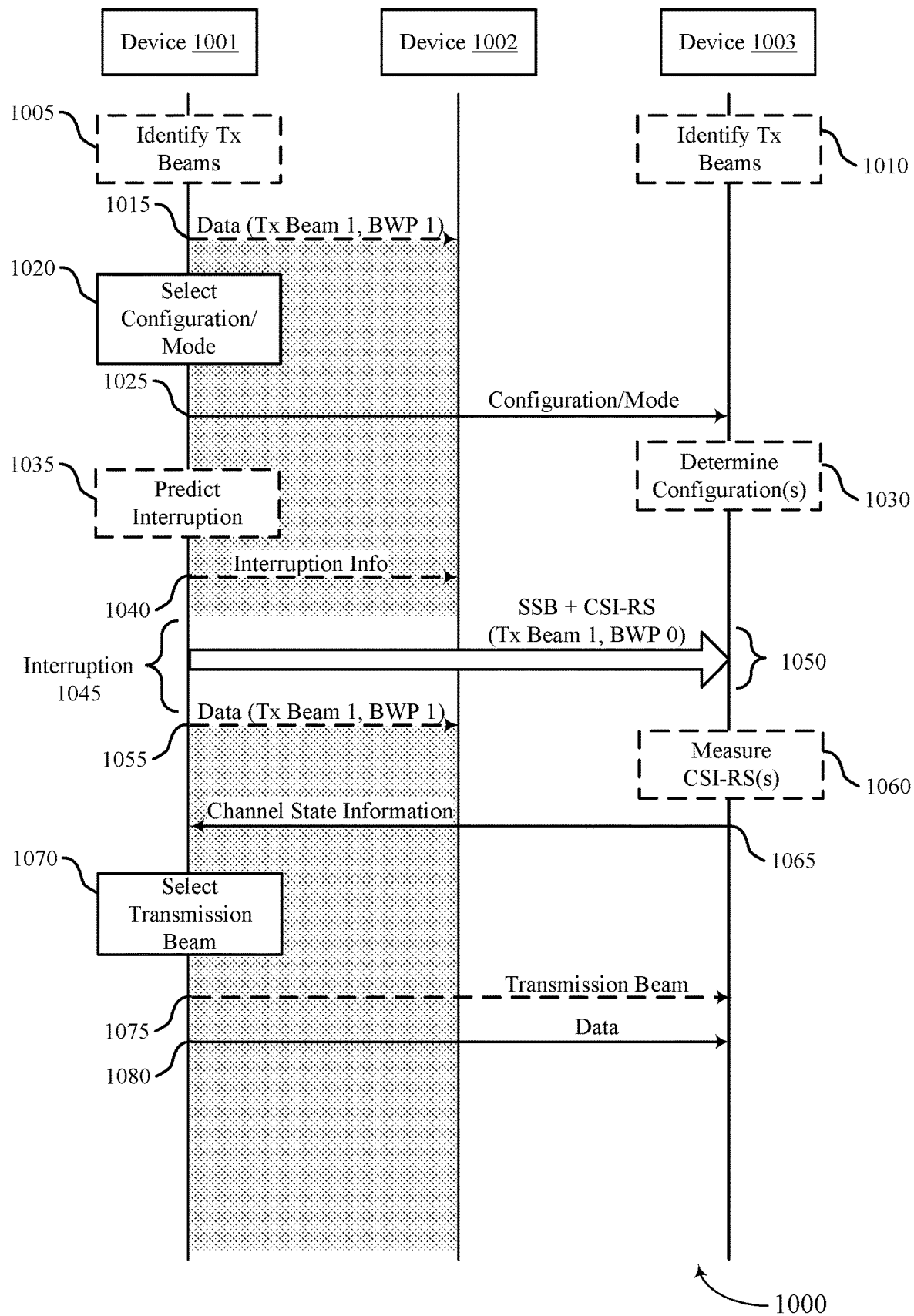
FIG. 10 illustrates an example of a process flow that supports beam management in a wireless communications network in accordance with one or more aspects of the present disclosure.

FIG. 10 illustrates an example of a process flow 1000 that supports beam management in a wireless communications network in accordance with one or more aspects of the present disclosure. In some examples, process flow 1000 may implement aspects of wireless communications system 100 or 200. For example, process flow 1000 may be implemented by a device 1001, device 1002, and device 1003, which may be examples of a satellite, base station, or UE as described herein. Process flow 1000 may be an example of beam management procedure that uses configuration 900.

Alternative examples of the following may be implemented, where some operations are performed in a different order than described or are not performed at all. In some cases, operations may include additional features not mentioned below, or further operations may be added.

At 1005, device 1001 may identify a quantity of transmission beams in operation at device 1001. Device 1001 may also determine the frequency range (e.g., bandwidth part) assigned to each transmission beam for data transmissions. At 1010, device 1003 may identify a quantity of transmission beams in operation at device 1001. Device 1003 may also determine the frequency range (e.g., bandwidth part) assigned to each transmission beam for data transmissions.

At 1015, device 1001 may transmit data to device 1002 over a first frequency range (e.g., bandwidth part 1) using a first transmission beam (e.g., device 1001 may commence data communications with device 1002 using transmission beam 1). Additional data transmissions to device 1002 over the first frequency range (e.g., bandwidth part 1) may occur after 1015 and may be represented by shaded background.

At 1020, device 1001 may select a mode of estimating transmission beams and an associated configuration of reference signal resources. In the given example, device 1001 may select configuration 900 and a mode associated with configuration 900. At 1025, device 1001 may transmit an indication of the selected mode and/or configuration to device 1003. The indication of the selected mode and/or configuration may be conveyed via physical layer signaling (e.g., as a cell-specific configuration in a SIB message or a UE-specific configuration in the PDCCH) or via RRC signaling (e.g., in an RRC message). In some cases, device 1001 may also transmit an indication of one or more un-selected configurations so that device 1003 can store them for future reference. At 1030, device 1003 may determine the mode and/or configuration selected by device 1001 based on the indication received at 1025. In some cases, device 1003 may also determine one or more additional configurations based on the indication received at 1025.

At 1035, device 1001 may determine that an interruption in data communications over the first frequency range (e.g., bandwidth part 1) will be interrupted when device 1001 uses the first transmission beam to transmit CSI-RS over a second frequency range (e.g., bandwidth part 0). Thus, device 1001 may determine a rate-matched region 910 as described with reference to FIG. 9. At 1040, device 1001 may transmit an indication of the upcoming interruption to device 1003. In some cases, the indication may include a start time, duration, and/or end time of the interruption 1045. Interruption 1045 may refer to a cessation of data communications (e.g., a zeroing of downlink throughput) over the first frequency range (e.g., bandwidth part 1). In some examples, interruption 1045 may start before CSI-RSs are transmitted at 1040 and may end after the CSI-RSs are transmitted (e.g., due to latency associated with switching between frequency ranges).

At 1050, device 1001 may transmit a synchronization signal and CSI-RS over a second frequency range (e.g., bandwidth part 0) using the first transmission beam. Put another way, when transmission beam 1 switches frequency ranges to transmit an SSB, transmission beam 1 may concurrently transmit a CSI-RS. Thus, device 1001 may transmit the CSI-RS as shown in configuration 900. At 1055, device 1001 may resume data communications over the first frequency range (e.g., bandwidth part 1) using the first transmission beam. In some examples, the operations between 1035 and 1055 may repeat for different transmission beams.

At 1060, device 1003 may receive and measure one or more CSI-RSs based on the configuration and mode determined at 1030. At 1065, device 1003 may transmit to device 1001 channel state information for one or more transmission beams. The channel state information may be determined based on the measurements made at 1060. At 1070, device 1001 may select, based on the channel state information, a transmission beam for communicating with device 1003. In some examples, the transmission beam is different than the transmission beam used to communicate with device 1003 at 1025. At 1075, device 1001 may transmit to device 1003 an indication of the transmission beam selected at 1070. At 1080, device 1001 may transmit data to device 1003 using the transmission beam selected at 1070. Thus, device 1001 and device 1003 may perform beam management using configuration 900.

Although described separately, operations and aspects of the process flows described herein may be added to, subtracted from, or interchanged with operations and aspects of other process flows described herein.

Figure 11:
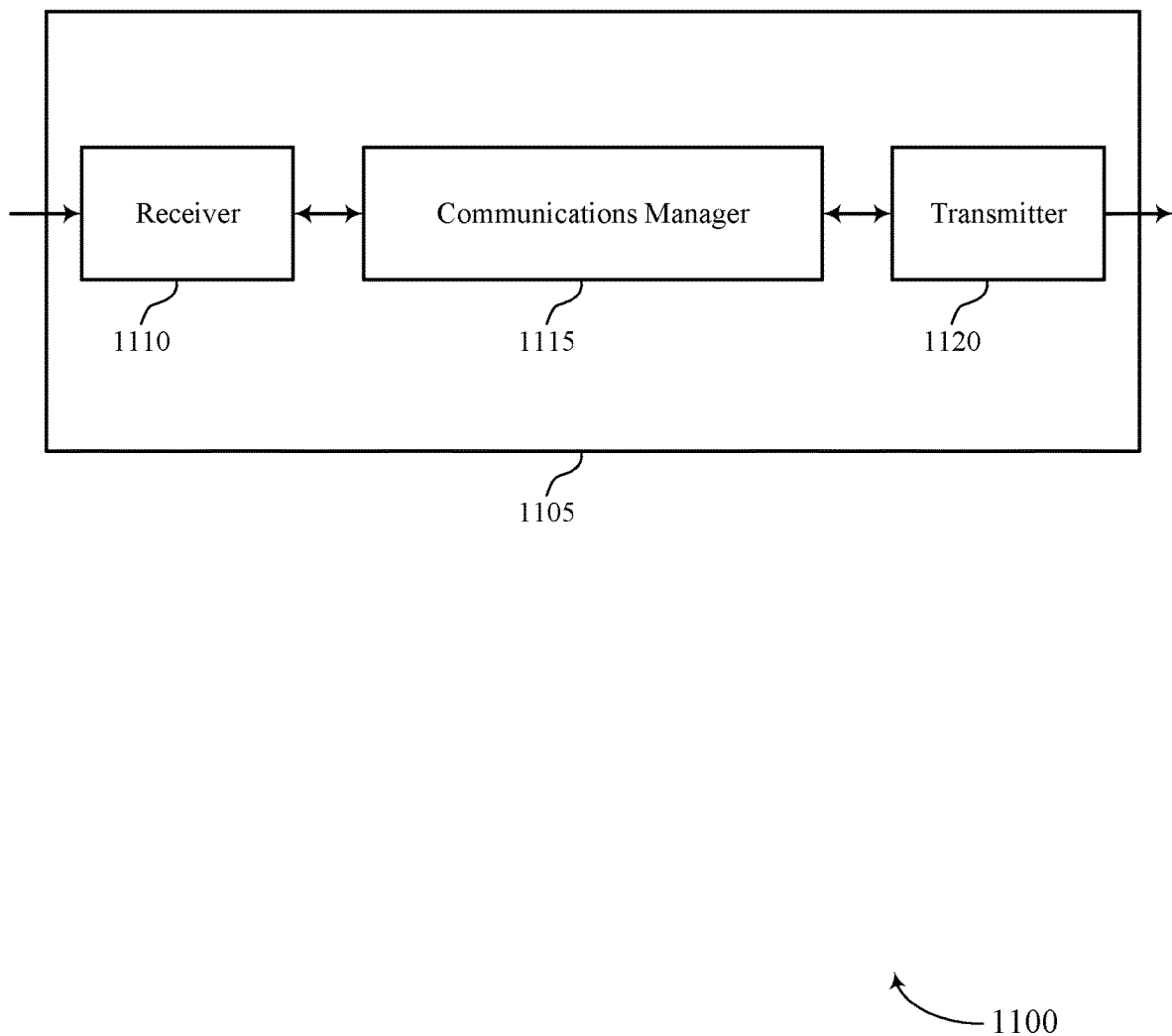
FIGS. 11 and 12 show block diagrams of devices that support beam management in a wireless communications network in accordance with one or more aspects of the present disclosure.

FIG. 11 shows a block diagram 1100 of a device 1105 that supports beam management in a wireless communications network in accordance with one or more aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam management in a wireless communications network, etc.). Information may be passed on to other components of the device 1105. The receiver 1110 may be an example of aspects of the transceiver 1420 described with reference to FIG. 14. The receiver 1110 may utilize a single antenna or a set of antennas.

In a first example (e.g., when a wireless communications system implements configuration 300, 400, 500, or 700-a), the communications manager 1115 may receive an indication of a reference signal resource set for estimating one or more transmission beams of a plurality of transmission beams of a wireless node in communication with the UE, the plurality of transmission beams associated with a plurality of frequency ranges for communication with the UE such that at least some of the transmission beams of the plurality of transmission beams are associated with different frequency ranges of the plurality of frequency ranges, and receive at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam.

In a second example (e.g., when a wireless communications system implements configuration 700-b), the communications manager 1115 may receive an indication of a plurality of reference signal resource sets for estimating a plurality of transmission beams of a wireless node in communication with the UE, the plurality of transmission beams for communicating with the UE over one or more frequency ranges, and receive at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams.

The communications manager 1115 may be an example of aspects of the communications manager 1410 described herein. The communications manager 1115 may be an example of means for performing various aspects of managing beams as described herein. The communications manager 1115, or its sub-components, may be implemented in hardware (e.g., in communications management circuitry). The circuitry may comprise a processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In another implementation, the communications manager 1115, or its sub-components, may be implemented in code (e.g., as communications management software or firmware) executed by a processor, or any combination thereof. If implemented in code executed by a processor, the functions of the communications manager 1115, or its sub-components may be executed by a general-purpose processor, a DSP, an ASIC, an FPGA, or other programmable logic device.

In some examples, the communications manager 1115 may be configured to perform various operations (e.g., receiving, determining, transmitting) using or otherwise in cooperation with the receiver 1110, the transmitter 1120, or both.

The communications manager 1115 may as described herein be implemented to realize one or more potential improvements. For example, communications manager 1115 reduce the processing burden of a UE by using configuration 300, 400, 500, 700-*a*, 700-*b*, or 900 to convey CSI-RS resources for beam management.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
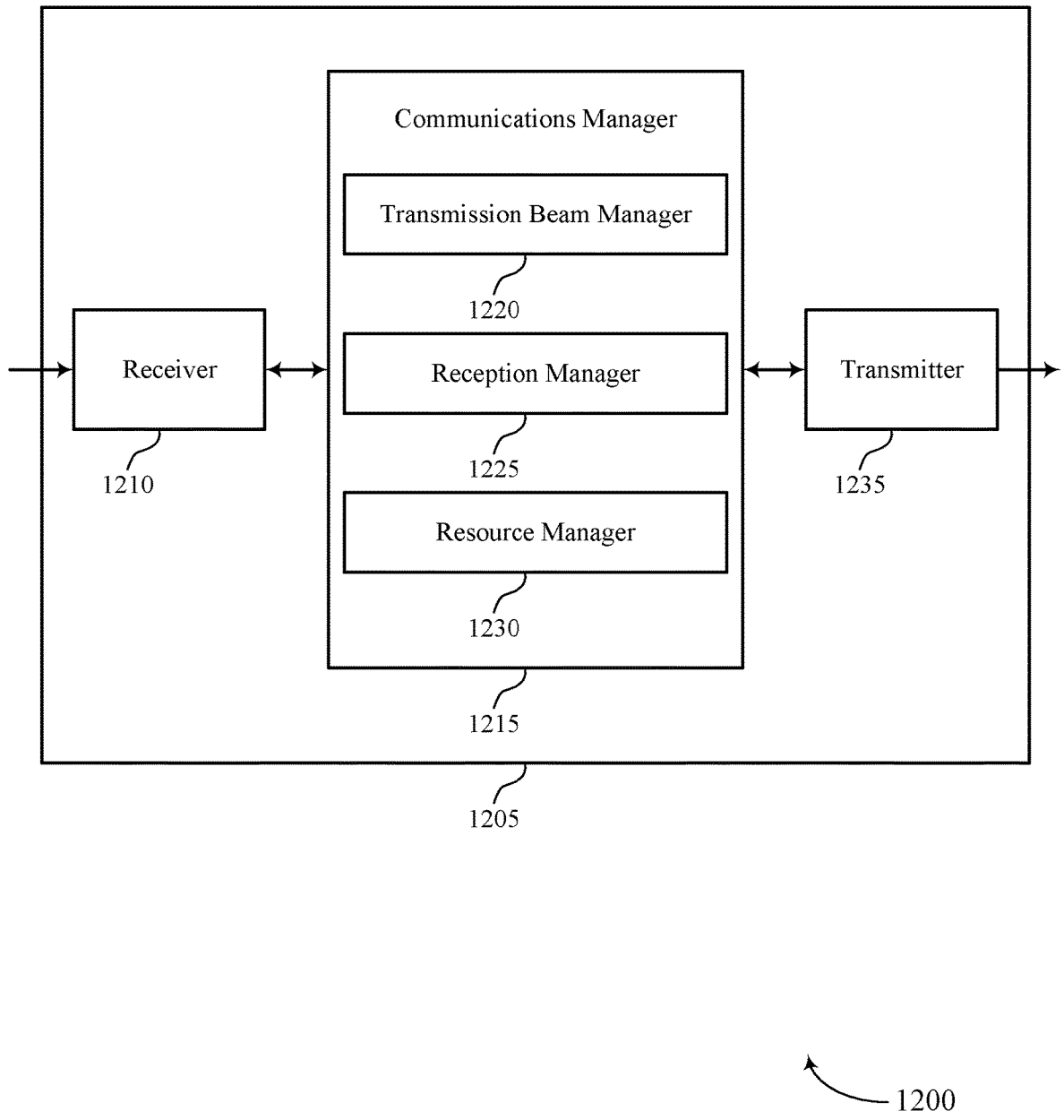

FIG. 12 shows a block diagram 1200 of a device 1205 that supports beam management in a wireless communications network in accordance with one or more aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to beam management in a wireless communications network, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a transmission beam manager 1220, a reception manager 1225, and a resource manager 1230. The communications manager 1215 may be an example of aspects of the communications manager 1410 described herein.

In a first example (e.g., when a wireless communications system implements configuration 300, 400, 500, or 700-*a*), the reception manager 1225 may receive an indication of a reference signal resource set for estimating one or more transmission beams of a plurality of transmission beams of a wireless node in communication with the UE, the plurality of transmission beams associated with a plurality of frequency ranges for communication with the UE such that at least some of the transmission beams of the plurality of transmission beams are associated with different frequency ranges of the plurality of frequency ranges. The reception manager 1225 may receive at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam.

In a second example (e.g., when a wireless communications system implements configuration 700-*b*), the reception manager 1225 may receive an indication of a plurality of reference signal resource sets for estimating a plurality of transmission beams of a wireless node in communication with the UE, the plurality of transmission beams for communicating with the UE over one or more frequency ranges. The resource manager 1230 may receive at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
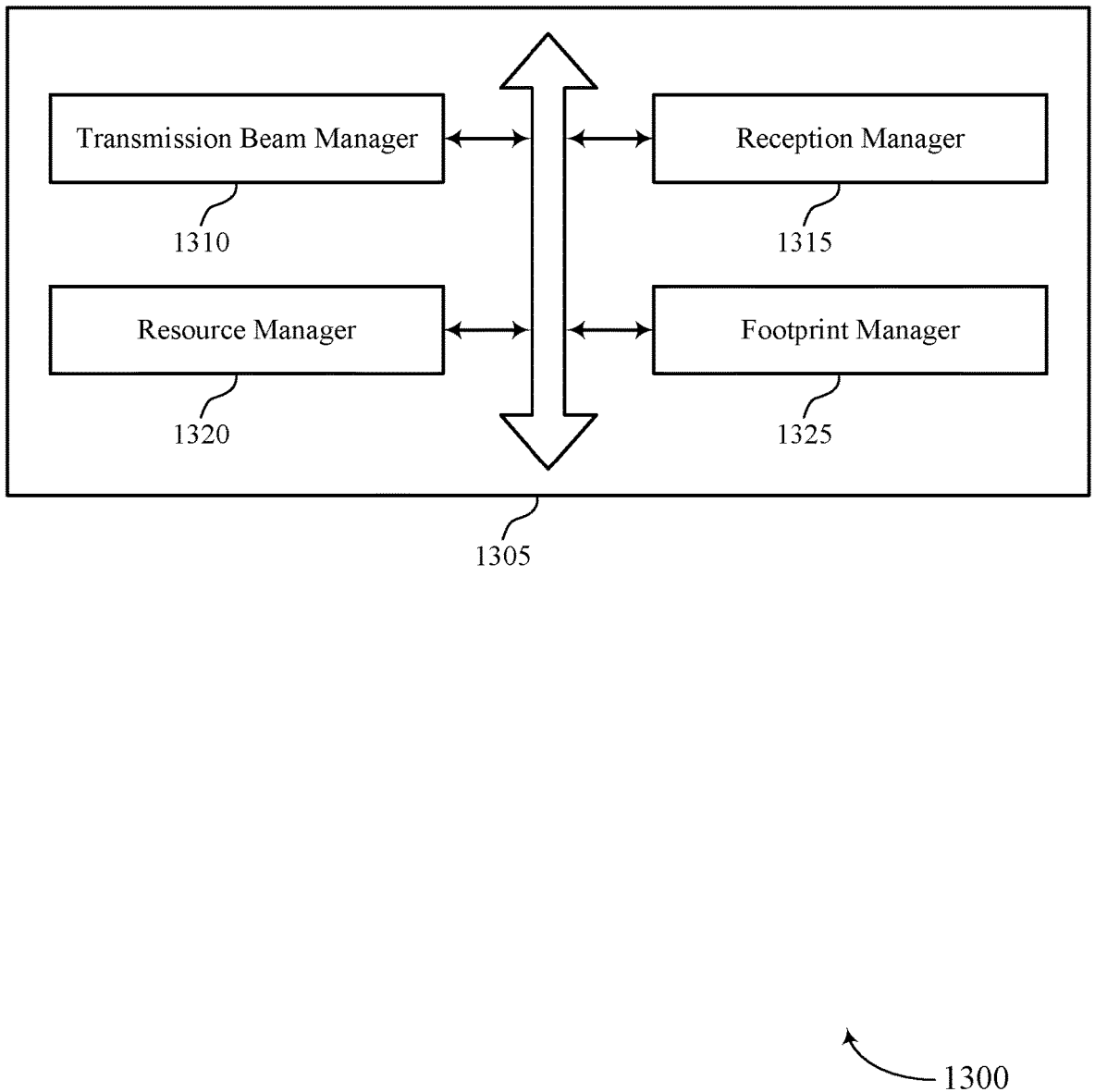
FIG. 13 shows a block diagram of a communications manager that supports beam management in a wireless communications network in accordance with one or more aspects of the present disclosure.

FIG. 13 shows a block diagram 1300 of a communications manager 1305 that supports beam management in a wireless communications network in accordance with one or more aspects of the present disclosure. The communications manager 1305 may be an example of aspects of a communications manager 1115, a communications manager 1215, or a communications manager 1410 described herein. The communications manager 1305 may include a transmission beam manager 1310, a reception manager 1315, a resource manager 1320, and a footprint manager 1325. Each of these modules may communicate, directly or indirectly, with one another (e.g., via one or more buses).

In a first example (e.g., when a wireless communications system implements configuration 300, 400, 500, or 700-*a*), the reception manager 1315 may receive an indication of a reference signal resource set for estimating one or more transmission beams of a plurality of transmission beams of a wireless node in communication with the UE, the plurality of transmission beams associated with a plurality of frequency ranges for communication with the UE such that at least some of the transmission beams of the plurality of transmission beams are associated with different frequency ranges of the plurality of frequency ranges. The resource manager 1320 may receive at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam.

In some examples (e.g., in configuration 300), the plurality of reference signal resource groups overlap in the time domain. In such examples, the reception manager 1315 may receive a first reference signal transmitted using a first transmission beam, the first reference signal occupying a first reference signal resource included in a first reference signal resource group. The reception manager 1315 may also receive, concurrently with receiving the first reference signal, a second reference signal transmitted using a second transmission beam and occupying a second reference signal resource included in a second reference signal resource group.

In some examples (e.g., in configuration 400), the plurality of reference signal resource groups are staggered in the time domain. In such examples, the plurality of reference signal resource groups may be separated in the time domain by a threshold period of time. Further, the reception manager 1315 may receive a first reference signal transmitted using a first transmission beam, the first reference signal occupying a first reference signal resource included in a first reference signal resource group. And the reception manager 1315 may receive, after the threshold period of time, a second reference signal transmitted using a second transmission beam, the second reference signal occupying a second reference signal resource included in a second reference signal resource group.

In some examples (e.g., in configuration 500), at least two reference signal resource groups overlap in the time domain and the other reference signal resource groups are staggered in the time domain, the at least two reference signal resource groups comprising a first reference signal resource group and a second reference signal resource group. In such examples, the first reference signal resource group may be associated with a first transmission beam having a first coverage area and the second reference signal resource group may be associated with a second transmission beam having a second coverage area, and the first coverage area may be separated from the second coverage area by a third coverage area of a third transmission beam.

In some examples (e.g., in configuration 700-*a*), each of the one or more transmission beams is assigned a respective frequency range for data transmissions. In such examples, the resource manager 1320 may associate each reference signal resource within a given frequency range with a transmission beam that is assigned a different frequency range for data transmissions. Additionally, the reception manager 1315 may receive, over a first frequency range, data transmitted using a first transmission beam that is assigned the first frequency range for data transmissions. And the reception manager 1315 may receive, over the first frequency range, a reference signal transmitted using a second transmission beam that is assigned a second frequency range for data transmissions. In other examples, the reception manager 1315 may receive an indication of a duration of time that data transmissions over the first frequency range will be interrupted.

In some examples, the footprint manager 1325 may determine a spatial relationship between a first coverage area of a first transmission beam and a second coverage area of a second transmission beam, the first coverage area encompassing the UE. In such examples, the reception manager 1315 may receive a reference signal transmitted using the second transmission beam based at least on the spatial relationship. In some examples, the footprint manager 1325 may receive an indication of the spatial relationship from the wireless node, the indication comprising a vector indicating transmission beams that have coverage areas adjacent to the first coverage area. In other examples, the footprint manager 1325 may determine that reference signal resources associated with the first and second transmission beams are separated in the time domain, where the spatial relationship is based at least in part on determining that reference signal resources associated with the first and second transmission beams are separated in the time domain.

In some examples, the reference signal resource set is associated with a first mode of estimating transmission beams. In such examples, the reception manager 1315 may receive an indication of a second reference signal resource set associated with a second mode of estimating transmission beams. The reception manager 1315 may also receive an indication of the first mode or the second mode.

In a second example (e.g., when a wireless communications system implements configuration 700-*b*), the reception manager 1315 may receive an indication of a plurality of reference signal resource sets for estimating a plurality of transmission beams of a wireless node in communication with the UE, the plurality of transmission beams for communicating with the UE over one or more frequency ranges. And the resource manager 1320 may receive at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams.

In some examples, each reference signal resource in a given reference signal resource set is associated with a respective transmission beam and respective reference signal. In other examples, each reference signal resource in a given reference signal resource set is associated with multiple transmission beams and multiple reference signals.

In some examples, transmission beam manager 1310 may determine that a first transmission beam is assigned a first frequency range for data transmissions. The transmission beam manager 1310 may also determine that a second transmission beam is assigned a second frequency range for data transmission. In such examples, the reception manager 1315 may receive a reference signal transmitted over the first frequency range using the second transmission beam, the reference signal occupying one or more reference signal resources in the reference signal resource set for the first frequency range.

In some examples, the reception manager 1315 may receive, over a first frequency range, data transmitted using a first transmission beam that is assigned the first frequency range for data transmissions. The reception manager 1315 may also receive an indication of a duration of time that data transmissions over the first frequency range will be interrupted.

In some examples, the plurality of reference signal resource sets is associated with a first mode of estimating transmission beams. In such examples, the reception manager 1315 may receive an indication of a second reference signal resource set associated with a second mode of estimating transmission beams. The reception manager 1315 may also receive an indication of the first mode or the second mode.

Figure 14:
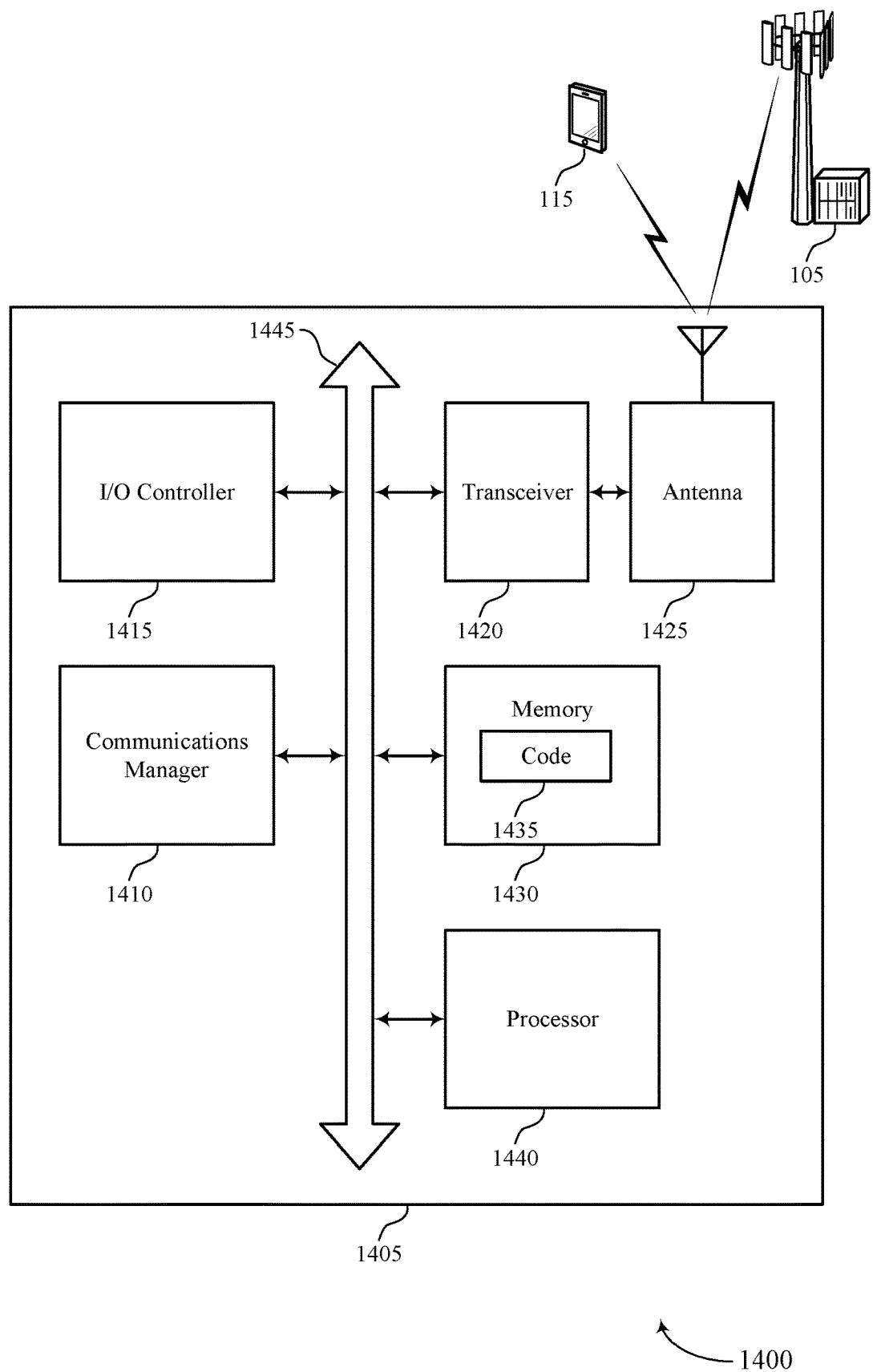
FIG. 14 shows a diagram of a system including a device that supports beam management in a wireless communications network in accordance with one or more aspects of the present disclosure.

FIG. 14 shows a diagram of a system 1400 including a device 1405 that supports beam management in a wireless communications network in accordance with one or more aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

In a first example (e.g., when a wireless communications system implements configuration 300, 400, 500, or 700-a), the communications manager 1410 may receive an indication of a reference signal resource set for estimating one or more transmission beams of a plurality of transmission beams of a wireless node in communication with the UE, the plurality of transmission beams associated with a plurality of frequency ranges for communication with the UE such that at least some of the transmission beams of the plurality of transmission beams are associated with different frequency ranges of the plurality of frequency ranges, and receive at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam.

In a second example (e.g., when a wireless communications system implements configuration 700-b), the communications manager 1410 may receive an indication of a plurality of reference signal resource sets for estimating a plurality of transmission beams of a wireless node in communication with the UE, the plurality of transmission beams for communicating with the UE over one or more frequency ranges, and receive at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting beam management in a wireless communications network).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
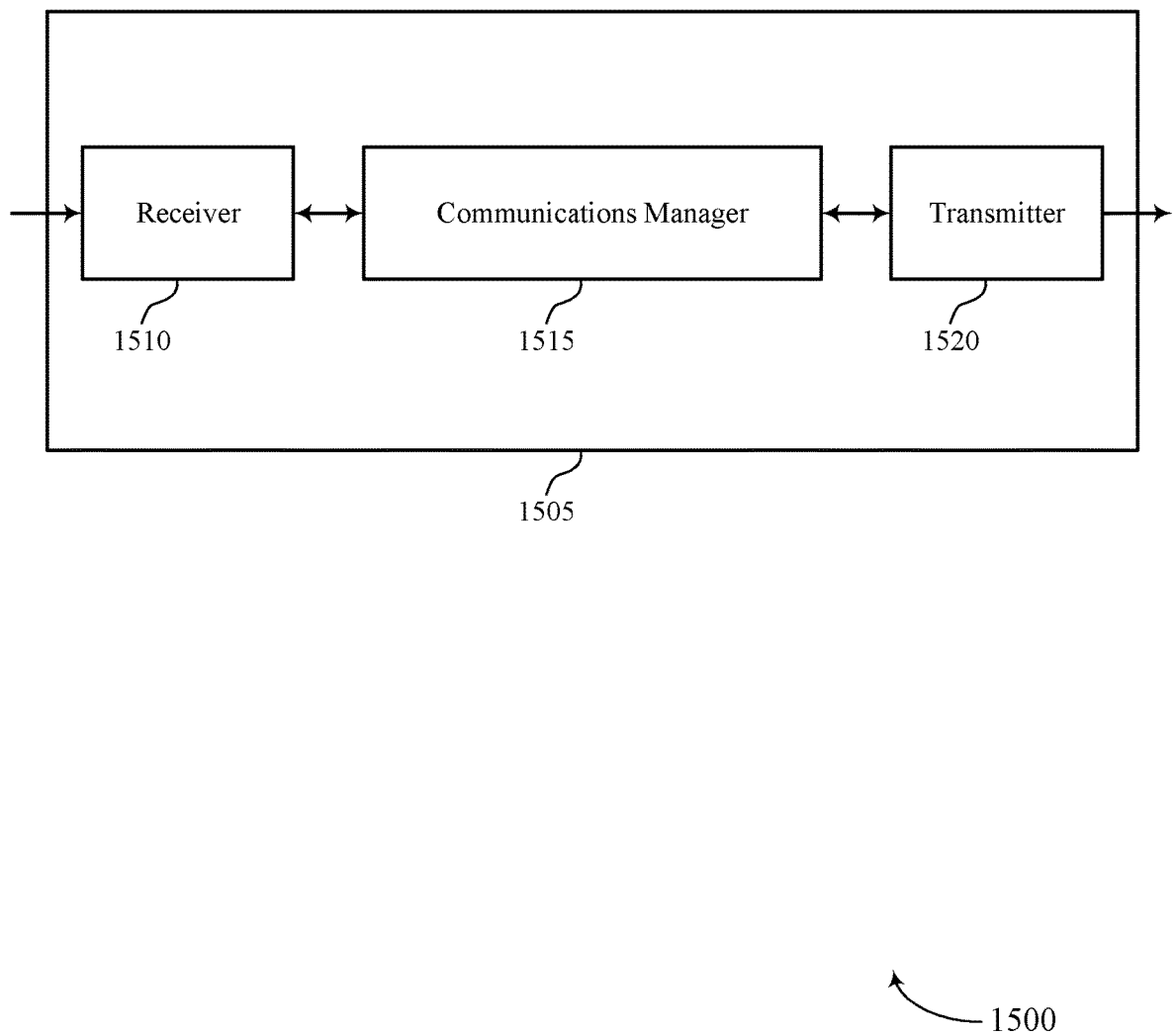
FIGS. 15 and 16 show block diagrams of devices that support beam management in a wireless communications network in accordance with one or more aspects of the present disclosure.

FIG. 15 shows a block diagram 1500 of a device 1505 that supports beam management in a wireless communications network in accordance with one or more aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to beam management in a wireless communications network, etc.). Information may be passed on to other components of the device 1505. The receiver 1510 may be an example of aspects of the transceiver 1820 described with reference to FIG. 18. The receiver 1510 may utilize a single antenna or a set of antennas.

In a first example (e.g., when a wireless communications system implements configuration 300, 400, 500, or 700-a), the communications manager 1515 may determine that a set of transmission beams is associated with a set of frequency ranges such that at least some transmission beams of the set of transmission beams are associated with different frequency ranges of the set of frequency ranges, determine a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams, and transmit an indication of the reference signal resource set to a UE for estimation of one or more of the set of transmission beams.

In a second example (e.g., when a wireless communications system implements configuration 700-b), the communications manager 1115 may determine that each of a plurality of transmission beams is assigned a respective frequency range for data transmissions, determine, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams, and transmit an indication of the reference signal resource set to a UE for estimation of the subset of transmission beams.

In a third example (e.g., when a wireless communications system implements configuration 900), the communications manager 1115 may transmit a synchronization signal block over a second frequency range using a first transmission beam that is assigned a first frequency range for data transmissions, the first transmission beam included in a plurality of transmission beams each assigned respective frequency ranges for data transmissions, and transmit a reference signal, concurrent with transmitting the synchronization signal block, over the second frequency range using the first transmission beam.

The communications manager 1515 may be an example of means for performing various aspects of managing beams as described herein. The communications manager 1515, or its sub-components, may be implemented in hardware (e.g., in communications management circuitry). The circuitry may comprise a processor, a DSP, an ASIC, an FPGA, or other programmable logic device, discrete gate or transistor logic, discrete hardware components, or any combination thereof designed to perform the functions described in the present disclosure.

In another implementation, the communications manager 1515, or its sub-components, may be implemented in code (e.g., as communications management software or firmware) executed by a processor, or any combination thereof. If implemented in code executed by a processor, the functions of the communications manager 1515, or its sub-components may be executed by a general-purpose processor, a DSP, an ASIC, an FPGA, or other programmable logic device.

In some examples, the communications manager 1515 may be configured to perform various operations (e.g., receiving, determining, transmitting) using or otherwise in cooperation with the receiver 1510, the transmitter 1520, or both.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 1515 may as described herein be implemented to realize one or more potential improvements. For example, communications manager 1515 may reduce the processing burden of device 1505 using configuration 300, 400, 500, 700-*a*, 700-*b*, or 900 to receive CSI-RS resources for beam management.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
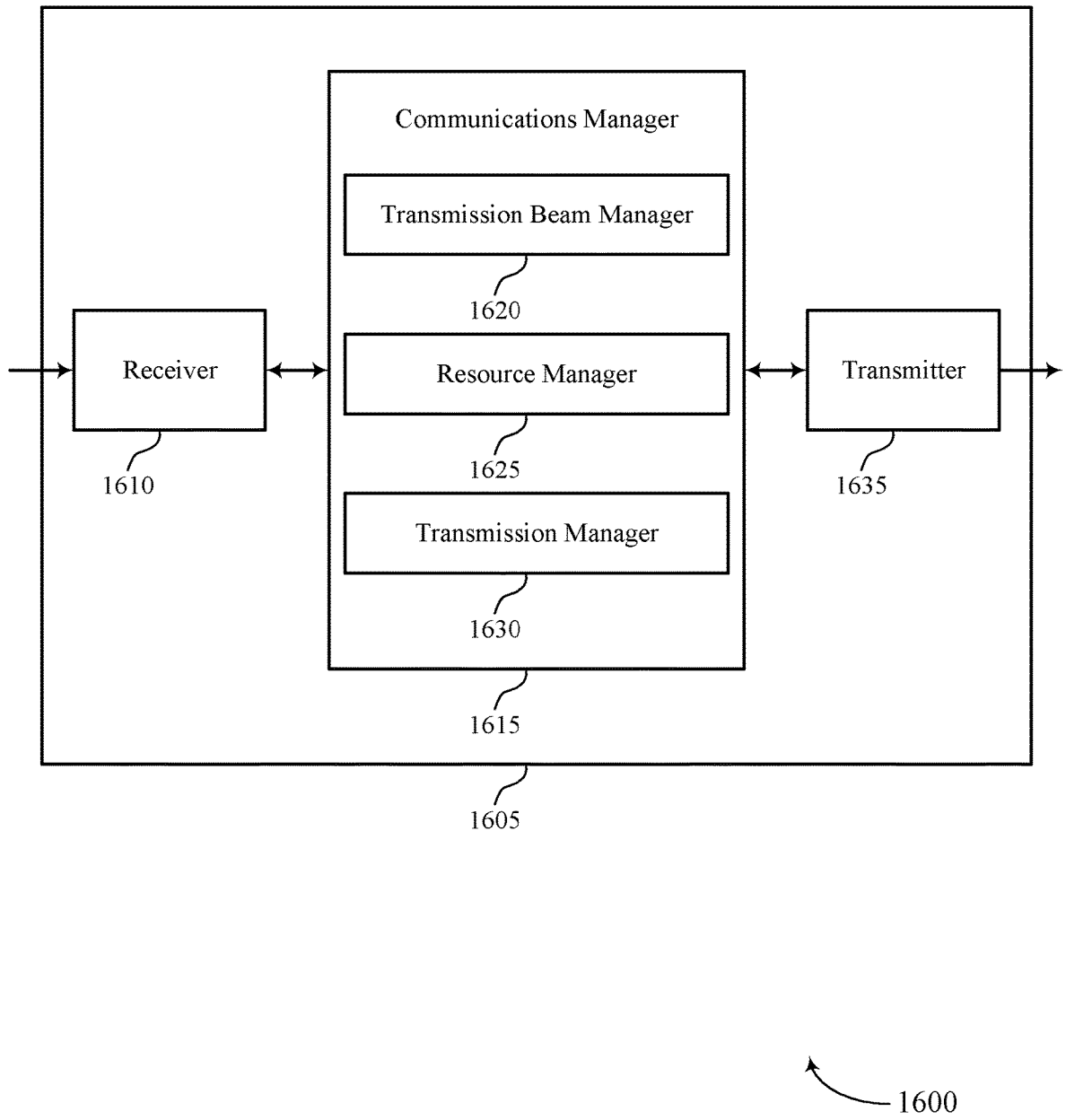

FIG. 16 shows a block diagram 1600 of a device 1605 that supports beam management in a wireless communications network in accordance with one or more aspects of the present disclosure. The device 1605 may be an example of aspects of a device 1505, or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to beam management in a wireless communications network, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a transmission beam manager 1620, a resource manager 1625, and a transmission manager 1630. The communications manager 1615 may be an example of aspects of the communications manager 1810 described herein.

In a first example (e.g., when a wireless communications system implements configuration 300, 400, 500, or 700-*a*), the transmission beam manager 1620 may determine that a set of transmission beams is associated with a set of frequency ranges such that at least some transmission beams of the set of transmission beams are associated with different frequency ranges of the set of frequency ranges. The resource manager 1625 may determine a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The transmission manager 1630 may transmit an indication of the reference signal resource set to a UE for estimation of one or more of the set of transmission beams.

In a second example (e.g., when a wireless communications system implements configuration 700-*b*), the transmission beam manager 1620 may determine that each of a plurality of transmission beams is assigned a respective frequency range for data transmissions. The resource manager 1625 may determine, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams. The transmission manager 1630 may transmit an indication of the reference signal resource set to a UE for estimation of the subset of transmission beams.

In a third example (e.g., when a wireless communications system implements configuration 900), the transmission beam manager 1620 may transmit a synchronization signal block over a second frequency range using a first transmission beam that is assigned a first frequency range for data transmissions, the first transmission beam included in a plurality of transmission beams each assigned respective frequency ranges for data transmissions. And the transmission manager 1630 may a reference signal, concurrent with transmitting the synchronization signal block, over the second frequency range using the first transmission beam.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
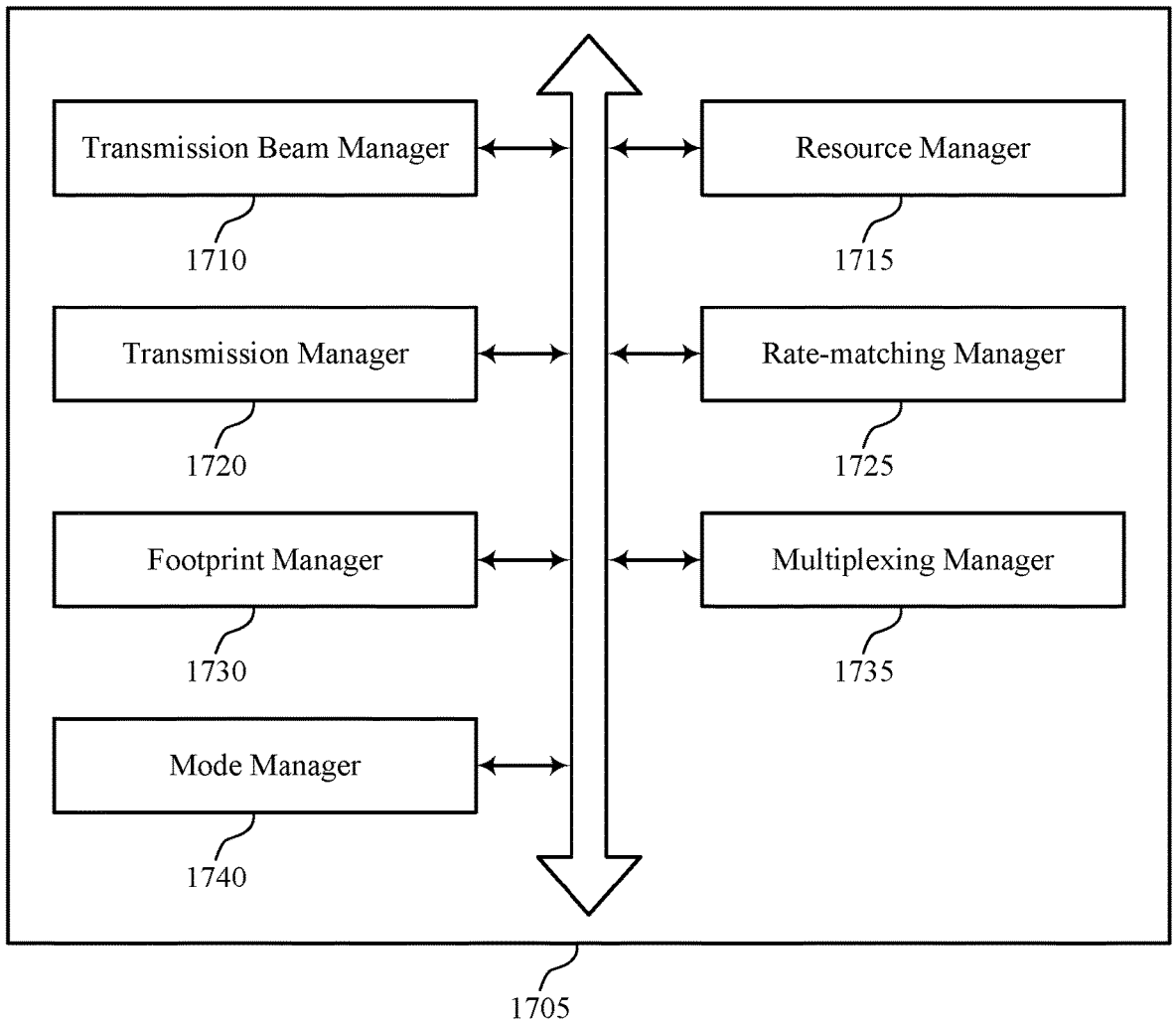
FIG. 17 shows a block diagram of a communications manager that supports beam management in a wireless communications network in accordance with one or more aspects of the present disclosure.

FIG. 17 shows a block diagram 1700 of a communications manager 1705 that supports beam management in a wireless communications network in accordance with one or more aspects of the present disclosure. The communications manager 1705 may be an example of aspects of a communications manager 1515, a communications manager 1615, or a communications manager 1810 described herein. The communications manager 1705 may include a transmission beam manager 1710, a resource manager 1715, a transmission manager 1720, a rate-matching manager 1725, a footprint manager 1730, a multiplexing manager 1735, and a mode manager 1740. Each of these modules may communicate, directly or indirectly, with one another (e.g., via one or more buses).

In a first example (e.g., when a wireless communications system implements configuration 300, 400, 500, or 700-*a*), the transmission beam manager 1710 may determine that a plurality of transmission beams is associated with a plurality of frequency ranges such that at least some transmission beams of the plurality of transmission beams are associated with different frequency ranges of the plurality of frequency ranges. The resource manager 1715 may determine a reference signal resource set for estimating the plurality of transmission beams, the reference signal resource set comprising a plurality of reference signal resource groups each including one or more reference signal resources, each of the plurality of reference signal resource groups being associated with a respective frequency range of the plurality of frequency ranges and one or more of the plurality of transmission beams. The transmission manager 1720 may transmit an indication of the reference signal resource set to a UE for estimation of one or more of the plurality of transmission beams. In some examples, the indication of the reference signal resource set is signaled in a system information block or a radio resource control message.

In some examples (e.g., in configuration 300), the plurality of reference signal resource groups overlap in the time domain. In such examples, the transmission manager 1720 may transmit, using a first transmission beam, a first reference signal over a first reference signal resource included in a first reference signal resource group. The transmission manager 1720 may also transmit, using a second transmission beam and concurrent with transmitting the first reference signal, a second reference signal over a second reference signal resource included in a second reference signal resource group.

In some examples (e.g., in configuration 400), the plurality of reference signal resource groups are staggered in the time domain. In such examples, the plurality of reference signal resource groups may be separated in the time domain by a threshold period of time. Further, the transmission manager 1720 may transmit, using a first transmission beam, a first reference signal over a first reference signal resource included in a first reference signal resource group. The transmission manager 1720 may also transmit, using a second transmission beam and after the threshold period of time, a second reference signal over a second reference signal resource included in a second reference signal resource group.

In some examples (e.g., in configuration 500), at least two reference signal resource groups overlap in the time domain while other reference signal resource groups are staggered in the time domain, the at least two reference signal resource groups comprising a first reference signal resource group and a second reference signal resource group. In such examples, the first reference signal resource group may be associated with a first transmission beam having a first coverage area and the second reference signal resource group may be associated with a second transmission beam having a second coverage area, the first coverage area separated from the second coverage area by a third coverage area of a third transmission beam.

In some examples (e.g., in configuration 700-*a*), each transmission beam is assigned a respective frequency range for data transmissions. In such examples, resource manager 1715 may associate each reference signal resource within a given frequency range with a transmission beam that is assigned a different frequency range for data transmissions. Additionally, the transmission manager 1720 may transmit, over a first frequency range, data to a second UE using a first transmission beam assigned the first frequency range for data communications. The transmission manager 1720 may also transmit, a reference signal over a second frequency range using the first transmission beam. In some examples, the rate-matching manager 1725 may determine that transmission of the reference signal over the second frequency range using the first transmission beam will interrupt data transmissions to the second UE over the first frequency range. In such examples, the transmission manager 1720 may transmit an indication of a duration of the interruption to the second UE.

In some examples, the footprint manager 1730 may determine a spatial relationship between coverage areas of the plurality of transmission beams. In such examples, the transmission manager 1720 may transmit an indication of the spatial relationship to the UE. In some examples, the indication comprises a vector indicating which transmission beams have adjacent coverage areas.

In some examples, each reference signal resource group includes two or more (e.g., a pair) of reference signal resources. In such examples, the multiplexing manager 1735 may code division multiplex a first reference signal for transmission over the pair of reference signal resources using a first beam and a second reference signal for transmission over the pair of reference signal resources using a second beam. Or the multiplexing manager 1735 may frequency division multiplex a first reference signal for transmission over the pair of reference signal resources using a first beam and a second reference signal for transmission over the pair of reference signal resources using a second beam.

In some examples, the reference signal resource set is associated with a first mode of estimating transmission beams. In such examples, the mode manager 1740 may determine a second reference signal resource set that is associated with a second mode of estimating transmission beams. The transmission manager 1720 may transmit an indication of the second reference signal resource set to the UE. In some examples, the mode manager 1740 may select the first mode or the second mode based at least in part on a capability of the UE. In such examples, the transmission manager 1720 may transmit an indication of the first mode or the second mode to the UE.

In a second example (e.g., when a wireless communications system implements configuration 700-b), the transmission beam manager 1710 may determine that each of a plurality of transmission beams is assigned a respective frequency range for data transmissions. The resource manager 1715 may determine, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams. The transmission manager 1720 may transmit an indication of the reference signal resource set to a UE for estimation of the subset of transmission beams.

In some examples, each reference signal resource in the reference signal resource set is associated with a respective transmission beam and respective reference signal. In other examples, each reference signal resource in the reference signal resource set is associated with multiple transmission beams and multiple reference signals.

In some examples, the transmission beam manager 1710 may determine that a first transmission beam is assigned a first frequency range for data transmissions. In such examples, the transmission manager 1720 may transmit, using a second transmission beam assigned a second frequency range for data transmissions, a reference signal over at least one reference signal resource in the reference signal resource set in the first frequency range. In some examples, the rate-matching manager 1725 may determine that data communications over the second frequency range will be interrupted during transmission of the reference signal over the first frequency range. In such examples, the transmission manager 1720 may transmit an indication of a duration of the interruption to a device receiving the data communications over the second frequency range. In some examples, the transmission manager 1720 may transmit, using a third transmission beam, a second reference signal over at least one reference signal resource in the reference signal resource set in the first frequency range. In such examples, the second reference signal may be transmitted over a same group of reference signal resources as the reference signal. Alternatively, the second reference signal may be transmitted over a different group of reference signal resources than the reference signal.

In some examples, the transmission manager 1720 may transmit a first reference signal and a second reference signal over a plurality of reference signal resources in a reference signal resource set for a third frequency range, the first reference signal transmitted using a first transmission beam assigned a first frequency range for data transmissions and the second reference signal transmitted using a second transmission beam assigned a second frequency range for data transmissions. In such examples, the first reference signal and the second reference signal may be code division multiplexed or frequency division multiplexed.

In some examples, the reference signal resource set is associated with a first mode of estimating transmission beams. In such examples, the mode manager 1740 may determine a second reference signal resource set that is associated with a second mode of estimating transmission beams. And the transmission manager 1720 may transmit an indication of the second reference signal resource set to the UE. In some examples, the mode manager 1740 may select the first mode or the second mode based at least in part on a capability of the UE. In such examples, the transmission manager 1720 may transmit an indication of the first mode or the second mode to the UE.

In a third example (e.g., when a wireless communications system implements configuration 900), the transmission beam manager 1710 may transmit a synchronization signal block over a second frequency range using a first transmission beam that is assigned a first frequency range for data transmissions, the first transmission beam included in a plurality of transmission beams each assigned respective frequency ranges for data transmissions. And the transmission manager 1720 may transmit a reference signal, concurrent with transmitting the synchronization signal block, over the second frequency range using the first transmission beam.

In some examples, the transmission manager 1720 may transmit data to a device over the first frequency range using the first transmission beam. In some examples, the rate-matching manager 1725 may determine that data transmissions to the device over the first frequency range will be interrupted based at least in part on concurrently transmitting the synchronization signal block and the reference signal over the second frequency range using the first transmission beam. In such examples, the transmission manager 1720 may transmit an indication of the interruption to the device prior to concurrently transmitting the synchronization signal block and the reference signal.

In some examples, the plurality of beams comprises a second transmission beam assigned a second frequency range for data transmissions. In such examples, the transmission manager 1720 may transmit a second synchronization signal block over a third frequency range using the second transmission beam. The transmission manager 1720 may also transmit a second reference signal, concurrent with transmitting the second synchronization signal block, over the third frequency range using the second transmission beam.

Figure 18:
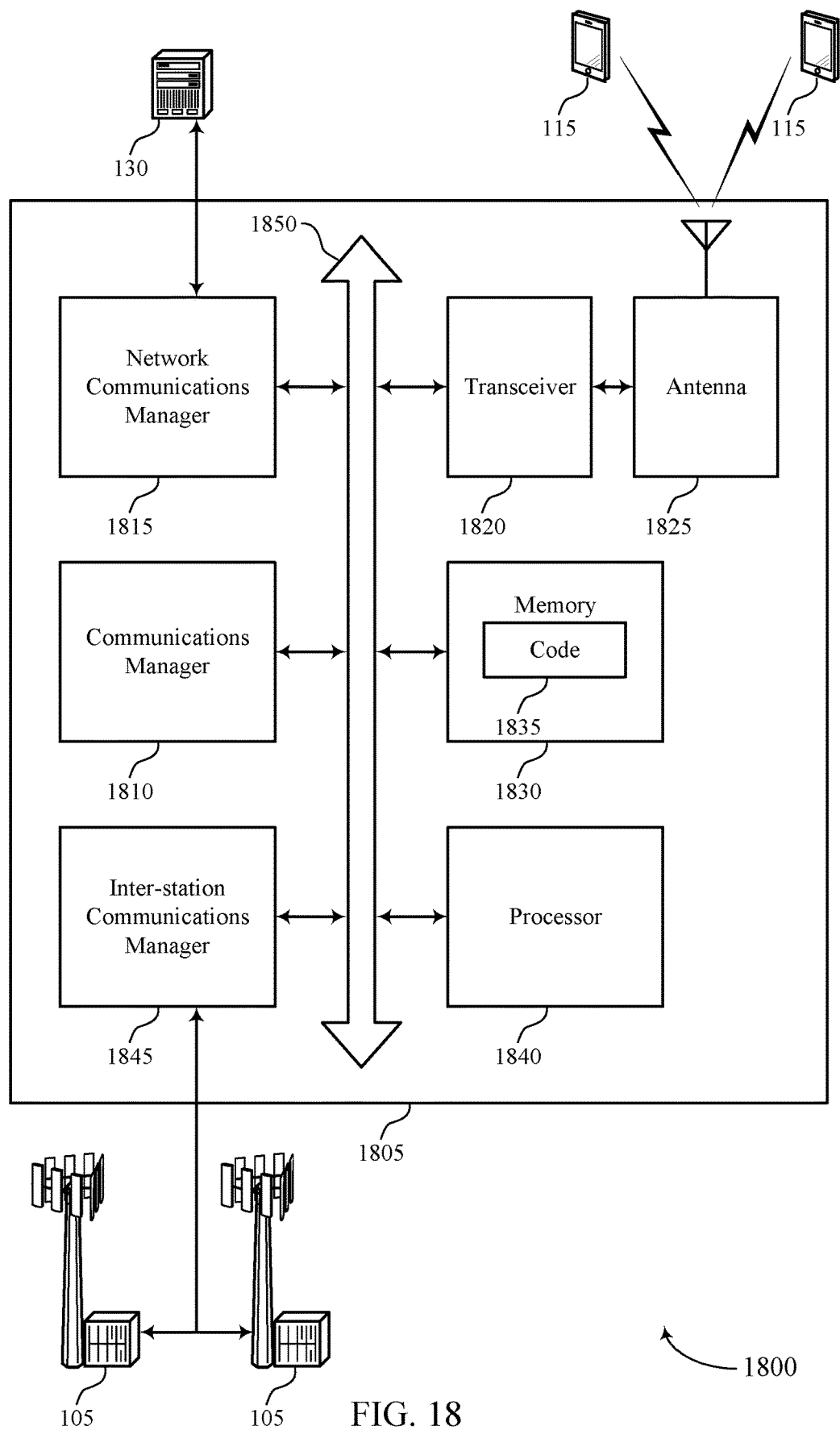
FIG. 18 shows a diagram of a system including a device that supports beam management in a wireless communications network in accordance with one or more aspects of the present disclosure.

FIG. 18 shows a diagram of a system 1800 including a device 1805 that supports beam management in a wireless communications network in accordance with one or more aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

In a first example (e.g., when a wireless communications system implements configuration 300, 400, 500, or 700-a), the communications manager 1810 may determine that a set of transmission beams is associated with a set of frequency ranges such that at least some transmission beams of the set of transmission beams are associated with different frequency ranges of the set of frequency ranges, determine a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams, and transmit an indication of the reference signal resource set to a UE for estimation of one or more of the set of transmission beams.

In a second example (e.g., when a wireless communications system implements configuration 700-b), the communications manager 1810 may determine that each of a plurality of transmission beams is assigned a respective frequency range for data transmissions, determine, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams, and transmit an indication of the reference signal resource set to a UE for estimation of the subset of transmission beams.

In a third example (e.g., when a wireless communications system implements configuration 900), the communications manager 1810 may transmit a synchronization signal block over a second frequency range using a first transmission beam that is assigned a first frequency range for data transmissions, the first transmission beam included in a plurality of transmission beams each assigned respective frequency ranges for data transmissions, and transmit a reference signal, concurrent with transmitting the synchronization signal block, over the second frequency range using the first transmission beam.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting beam management in a wireless communications network).

The inter-station communications manager 1845 may manage communications with other base station 105 and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
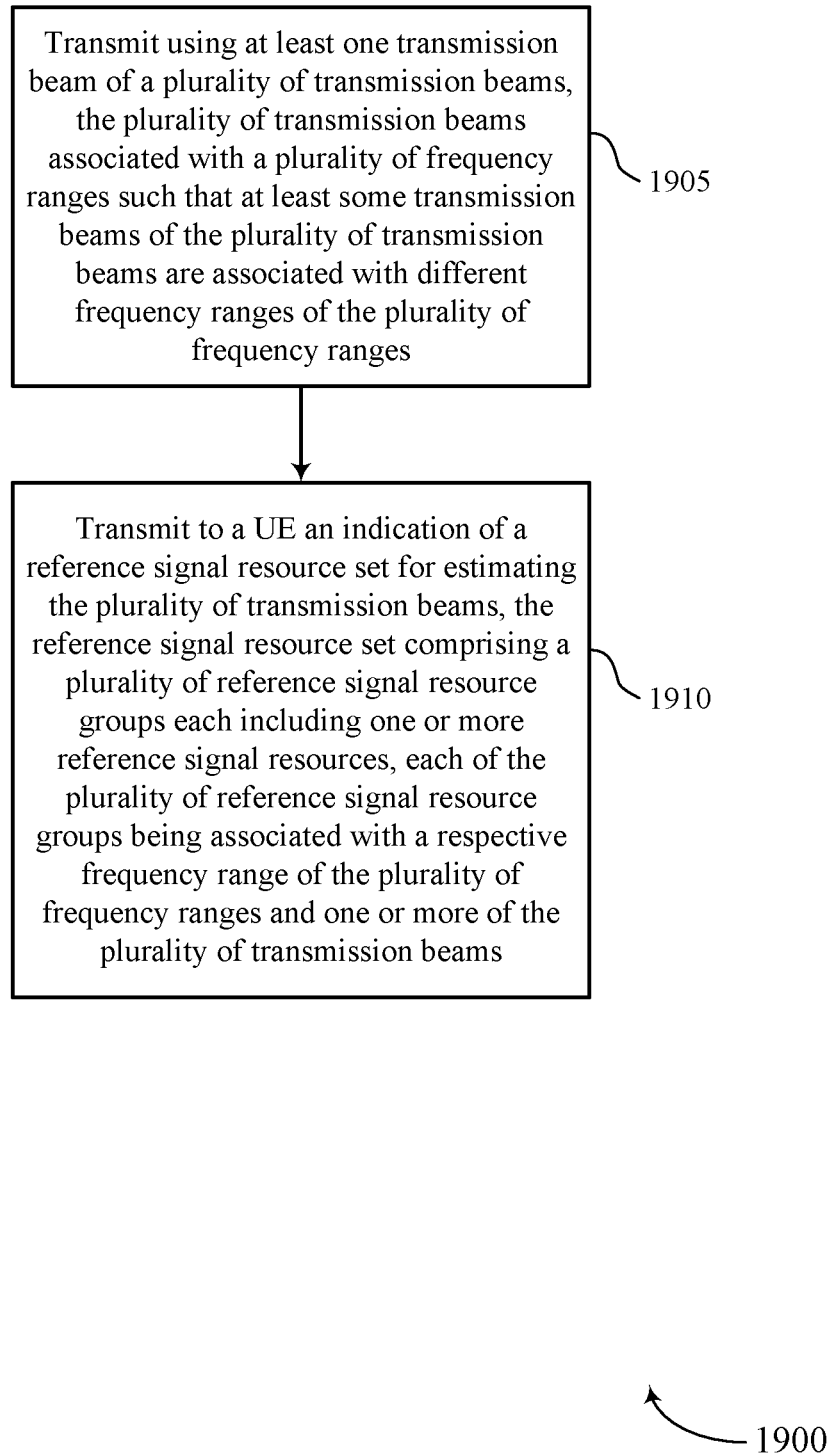
FIGS. 19 through 28 show flowcharts illustrating methods that support beam management in a wireless communications network in accordance with one or more aspects of the present disclosure.

FIG. 19 shows a flowchart illustrating a method 1900 that supports beam management in a wireless communications network in accordance with one or more aspects of the present disclosure. The operations of method 1900 may be implemented by a base station or satellite or components of a base station or satellite as described herein. For example, the operations of method 1900 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 1905, the method may include transmitting using at least one transmission beam of a plurality of transmission beams, the plurality of transmission beams associated with a plurality of frequency ranges such that at least some transmission beams of the plurality of transmission beams are associated with different frequency ranges of the plurality of frequency ranges. The operations of 1905 may be performed according to the methods described herein. In some examples, aspects of the operations of 1905 may be performed by a transmission beam manager as described with reference to FIGS. 15 through 18.

At 1910, the method may include transmitting to a UE an indication of a reference signal resource set for estimating the plurality of transmission beams, the reference signal resource set comprising a plurality of reference signal resource groups each including one or more reference signal resources, each of the plurality of reference signal resource groups being associated with a respective frequency range of the plurality of frequency ranges and one or more of the plurality of transmission beams. The operations of 1910 may be performed according to the methods described herein. In some examples, aspects of the operations of 1910 may be performed by a transmission manager as described with reference to FIGS. 15 through 18.

Figure 20:
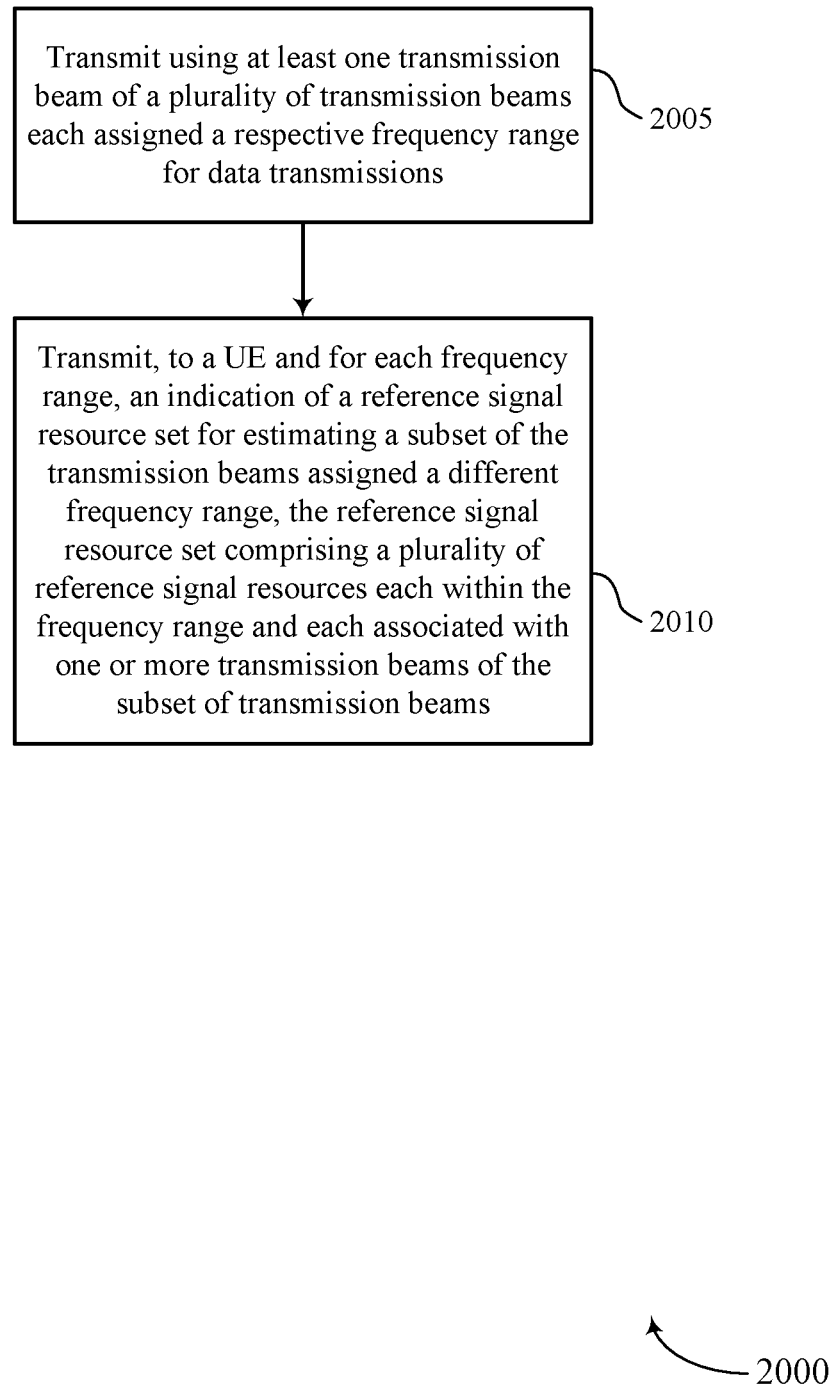

FIG. 20 shows a flowchart illustrating a method 2000 that supports beam management in a wireless communications network in accordance with one or more aspects of the present disclosure. The operations of method 2000 may be implemented by a base station or satellite or components of a base station or satellite as described herein. For example, the operations of method 2000 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 2005, the method may include transmitting using at least one transmission beam of a plurality of transmission beams each assigned a respective frequency range for data transmissions. The operations of 2005 may be performed according to the methods described herein. In some examples, aspects of the operations of 2005 may be performed by a transmission beam manager as described with reference to FIGS. 15 through 18.

At 2010, the method may include transmitting, to a UE and for each frequency range, an indication of a reference signal resource set for estimating a subset of the transmission beams assigned a different frequency range, the reference signal resource set comprising a plurality of reference signal resources each within the frequency range and each associated with one or more transmission beams of the subset of transmission beams. The operations of 2010 may be performed according to the methods described herein. In some examples, aspects of the operations of 2010 may be performed by a transmission manager as described with reference to FIGS. 15 through 18.

Figure 21:
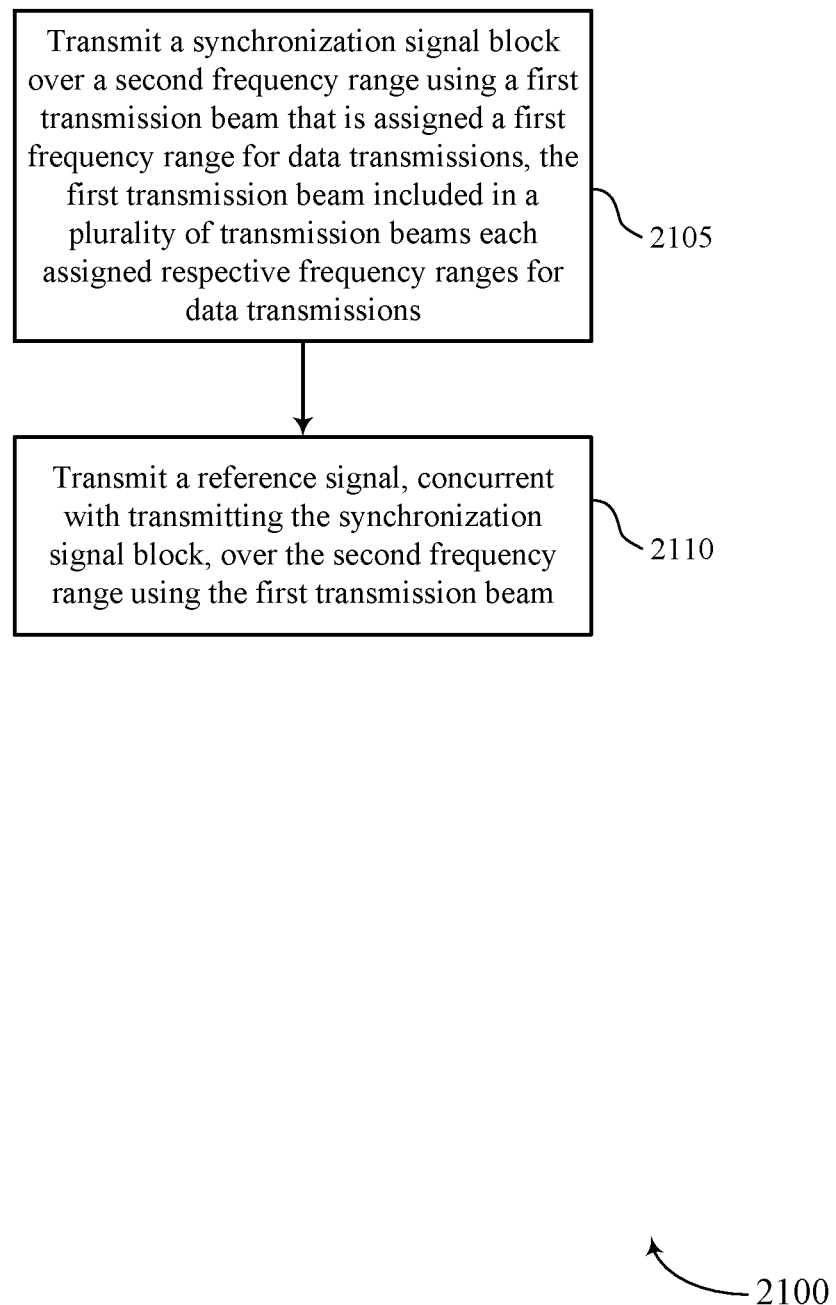

FIG. 21 shows a flowchart illustrating a method 2100 that supports beam management in a wireless communications network in accordance with one or more aspects of the present disclosure. The operations of method 2000 may be implemented by a base station or satellite or components of a base station or satellite as described herein. For example, the operations of method 2100 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 2105, the method may transmitting a synchronization signal block over a second frequency range using a first transmission beam that is assigned a first frequency range for data transmissions, the first transmission beam included in a plurality of transmission beams each assigned respective frequency ranges for data transmissions. The operations of 2105 may be performed according to the methods described herein. In some examples, aspects of the operations of 2105 may be performed by a transmission manager as described with reference to FIGS. 15 through 18.

At 2110, the method may include transmitting a reference signal, concurrent with transmitting the synchronization signal block, over the second frequency range using the first transmission beam. The operations of 2115 may be performed according to the methods described herein. In some examples, aspects of the operations of 2115 may be performed by a transmission manager as described with reference to FIGS. 15 through 18.

Figure 22:
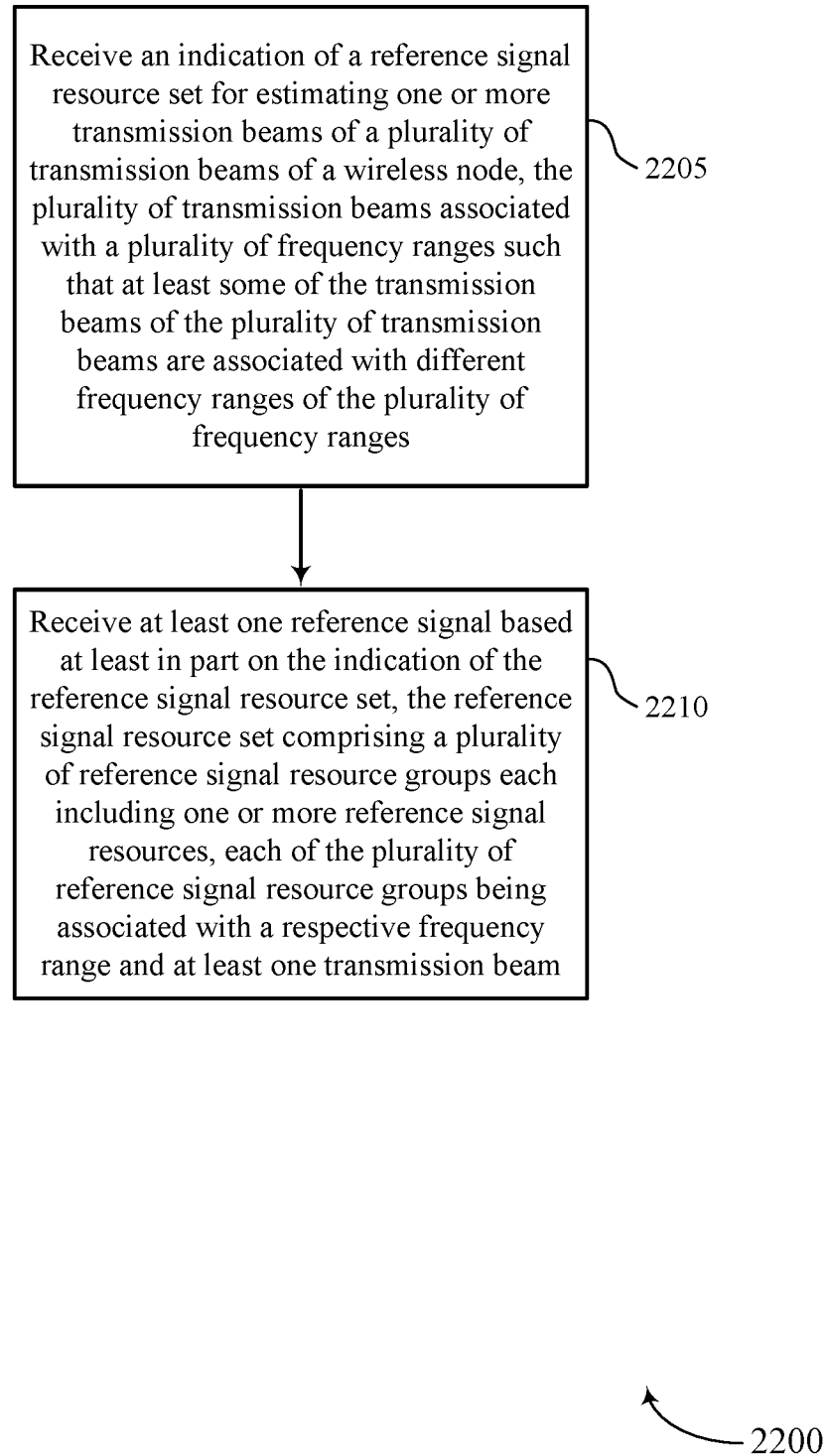

FIG. 22 shows a flowchart illustrating a method 2200 that supports beam management in a wireless communications network in accordance with one or more aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2205, the method may include receiving an indication of a reference signal resource set for estimating one or more transmission beams of a plurality of transmission beams of a wireless node, the plurality of transmission beams associated with a plurality of frequency ranges such that at least some of the transmission beams of the plurality of transmission beams are associated with different frequency ranges of the plurality of frequency ranges. The operations of 2205 may be performed according to the methods described herein. In some examples, aspects of the operations of 2205 may be performed by a reception manager as described with reference to FIGS. 11 through 14.

At 2210, the method may include receiving at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam. The operations of 2210 may be performed according to the methods described herein. In some examples, aspects of the operations of 2210 may be performed by a resource manager as described with reference to FIGS. 11 through 14.

Figure 23:
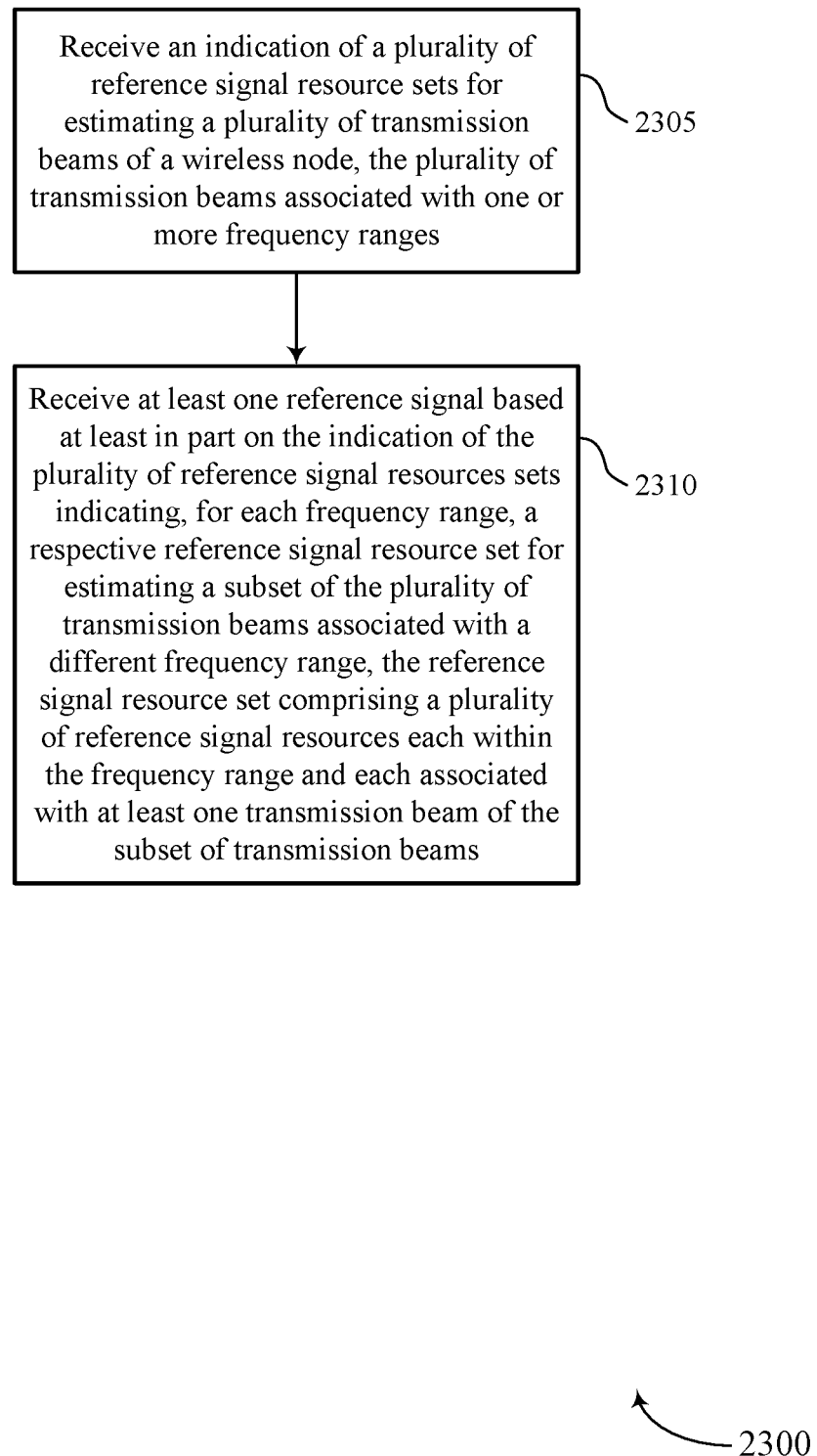

FIG. 23 shows a flowchart illustrating a method 2300 that supports beam management in a wireless communications network in accordance with one or more aspects of the present disclosure. The operations of method 2300 may be implemented by a UE 115 or its components as described herein. For example, the operations of method 2300 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2305, the method may include receiving an indication of a plurality of reference signal resource sets for estimating a plurality of transmission beams of a wireless node, the plurality of transmission beams associated with one or more frequency ranges. The operations of 2305 may be performed according to the methods described herein. In some examples, aspects of the operations of 2305 may be performed by a reception manager as described with reference to FIGS. 11 through 14.

At 2310, the method may include receiving at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams. The operations of 2310 may be performed according to the methods described herein. In some examples, aspects of the operations of 2310 may be performed by a reception manager as described with reference to FIGS. 11 through 14.

Figure 24:
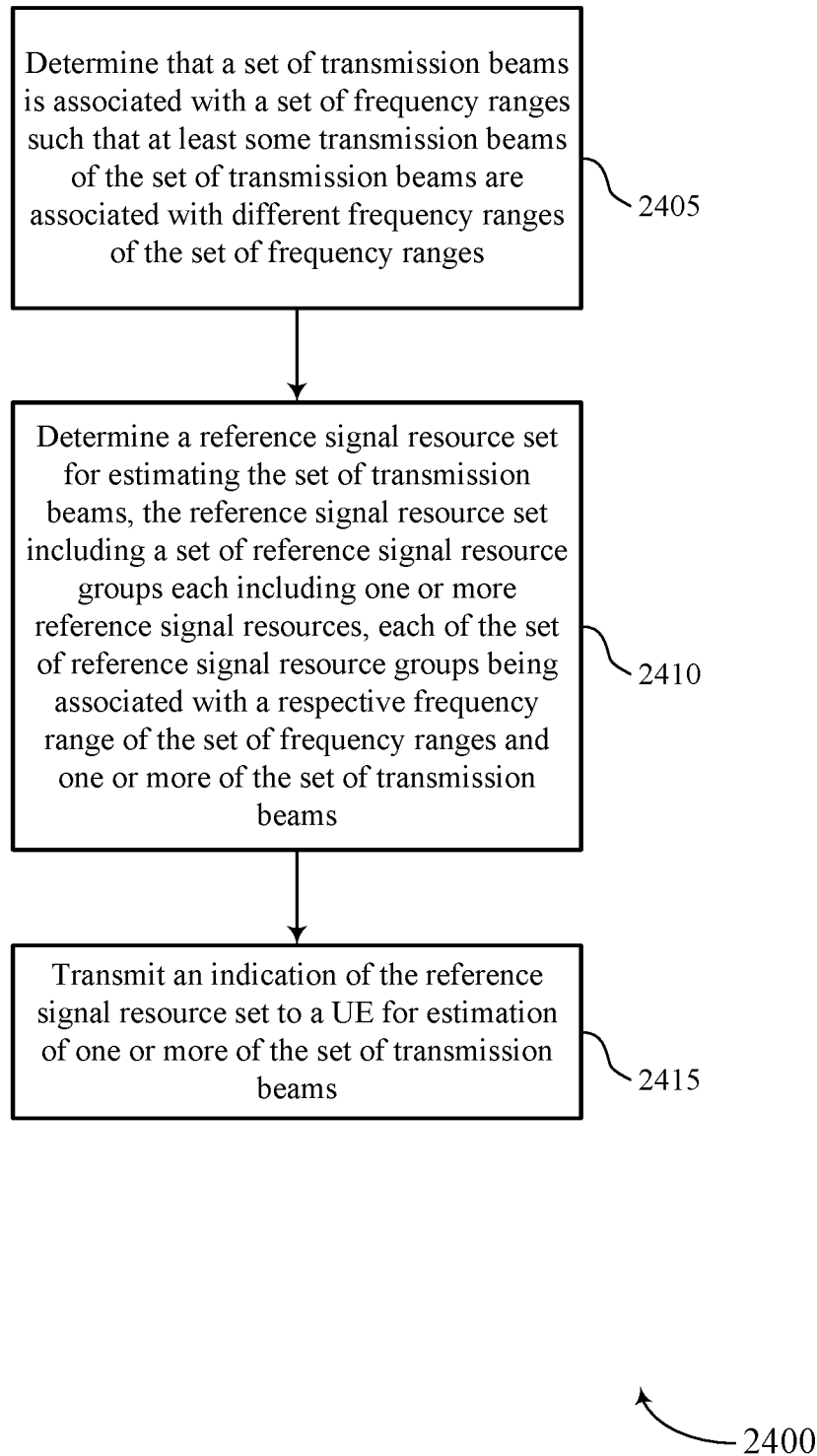

FIG. 24 shows a flowchart illustrating a method 2400 that supports beam management in a wireless communications network in accordance with one or more aspects of the present disclosure. The operations of method 2400 may be implemented by a base station or satellite or components of a base station or satellite as described herein. For example, the operations of method 2400 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 2405, the method may include determining that a set of transmission beams is associated with a set of frequency ranges such that at least some transmission beams of the set of transmission beams are associated with different frequency ranges of the set of frequency ranges. The operations of 2405 may be performed according to the methods described herein. In some examples, aspects of the operations of 2405 may be performed by a transmission beam manager as described with reference to FIGS. 15 through 18.

At 2410, the method may include determining a reference signal resource set for estimating the set of transmission beams, the reference signal resource set including a set of reference signal resource groups each including one or more reference signal resources, each of the set of reference signal resource groups being associated with a respective frequency range of the set of frequency ranges and one or more of the set of transmission beams. The operations of 2410 may be performed according to the methods described herein. In some examples, aspects of the operations of 2410 may be performed by a resource manager as described with reference to FIGS. 15 through 18.

At 2415, the method may include transmitting an indication of the reference signal resource set to a UE for estimation of one or more of the set of transmission beams. The operations of 2415 may be performed according to the methods described herein. In some examples, aspects of the operations of 2415 may be performed by a transmission manager as described with reference to FIGS. 15 through 18.

Figure 25:
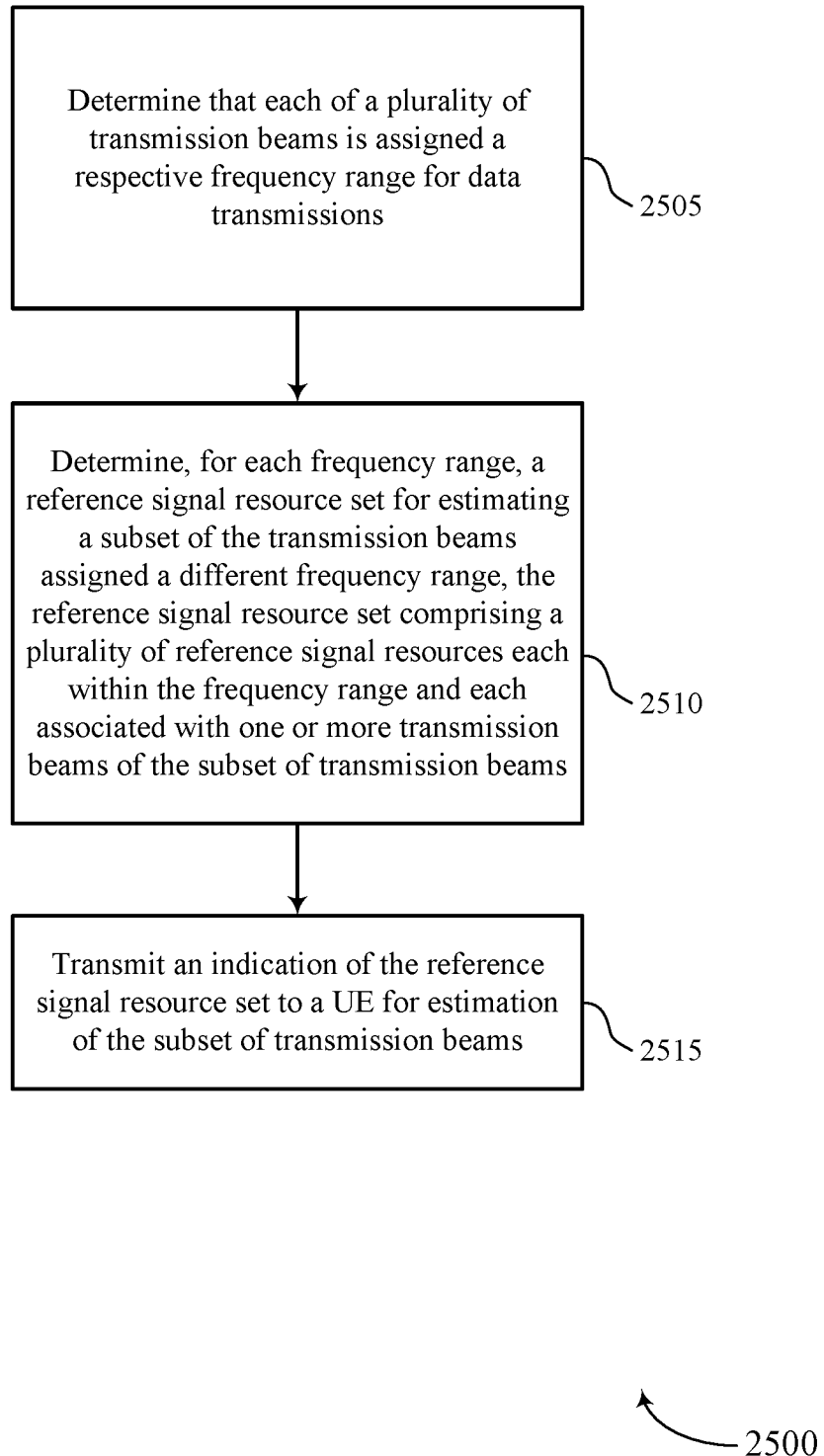

FIG. 25 shows a flowchart illustrating a method 2500 that supports beam management in a wireless communications network in accordance with one or more aspects of the present disclosure. The operations of method 2500 may be implemented by a base station or satellite or components of a base station or satellite as described herein. For example, the operations of method 2500 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 2505, the method may include determining that each of a plurality of transmission beams is assigned a respective frequency range for data transmissions. The operations of 2505 may be performed according to the methods described herein. In some examples, aspects of the operations of 2505 may be performed by a transmission beam manager as described with reference to FIGS. 15 through 18.

At 2510, the method may include determining, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams. The operations of 2510 may be performed according to the methods described herein. In some examples, aspects of the operations of 2510 may be performed by a resource manager as described with reference to FIGS. 15 through 18.

At 2515, the method may include transmitting an indication of the reference signal resource set to a UE for estimation of the subset of transmission beams. The operations of 2515 may be performed according to the methods described herein. In some examples, aspects of the operations of 2515 may be performed by a transmission manager as described with reference to FIGS. 15 through 18.

Figure 26:
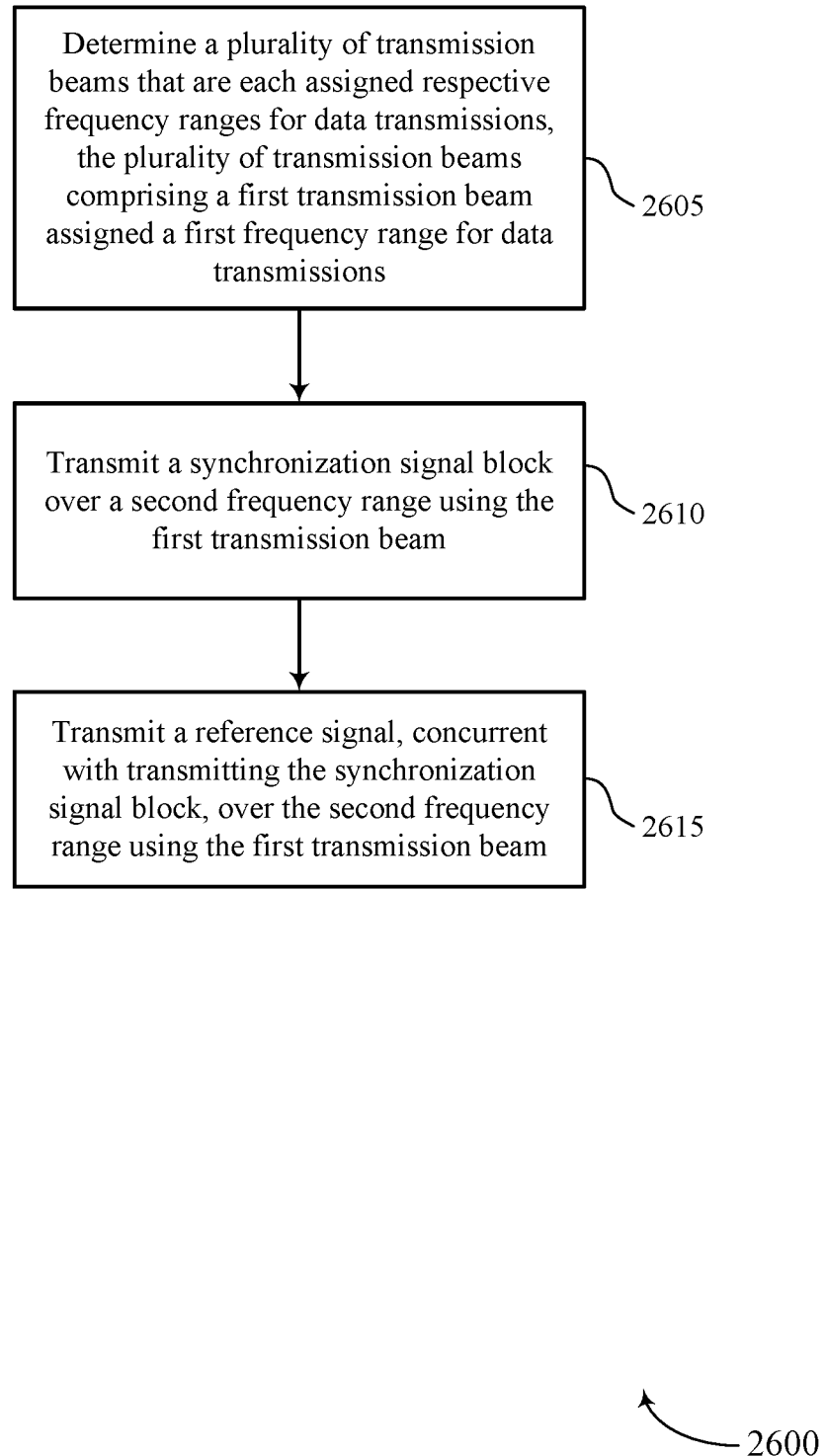

FIG. 26 shows a flowchart illustrating a method 2600 that supports beam management in a wireless communications network in accordance with one or more aspects of the present disclosure. The operations of method 2600 may be implemented by a base station or satellite or components of a base station or satellite as described herein. For example, the operations of method 2600 may be performed by a communications manager as described with reference to FIGS. 15 through 18. In some examples, a base station or satellite may execute a set of instructions to control the functional elements of the base station to perform the functions described below. Additionally or alternatively, a base station or satellite may perform aspects of the functions described below using special-purpose hardware.

At 2605, the method may include determining a plurality of transmission beams that are each assigned respective frequency ranges for data transmissions, the plurality of transmission beams comprising a first transmission beam assigned a first frequency range for data transmissions. The operations of 2605 may be performed according to the methods described herein. In some examples, aspects of the operations of 2605 may be performed by a transmission beam manager as described with reference to FIGS. 15 through 18.

At 2610, the method may include transmitting a synchronization signal block over a second frequency range using the first transmission beam. The operations of 2610 may be performed according to the methods described herein. In some examples, aspects of the operations of 2610 may be performed by a transmission manager as described with reference to FIGS. 15 through 18.

At 2615, the method may include transmitting a reference signal, concurrent with transmitting the synchronization signal block, over the second frequency range using the first transmission beam. The operations of 2615 may be performed according to the methods described herein. In some examples, aspects of the operations of 2615 may be performed by a transmission manager as described with reference to FIGS. 15 through 18.

Figure 27:
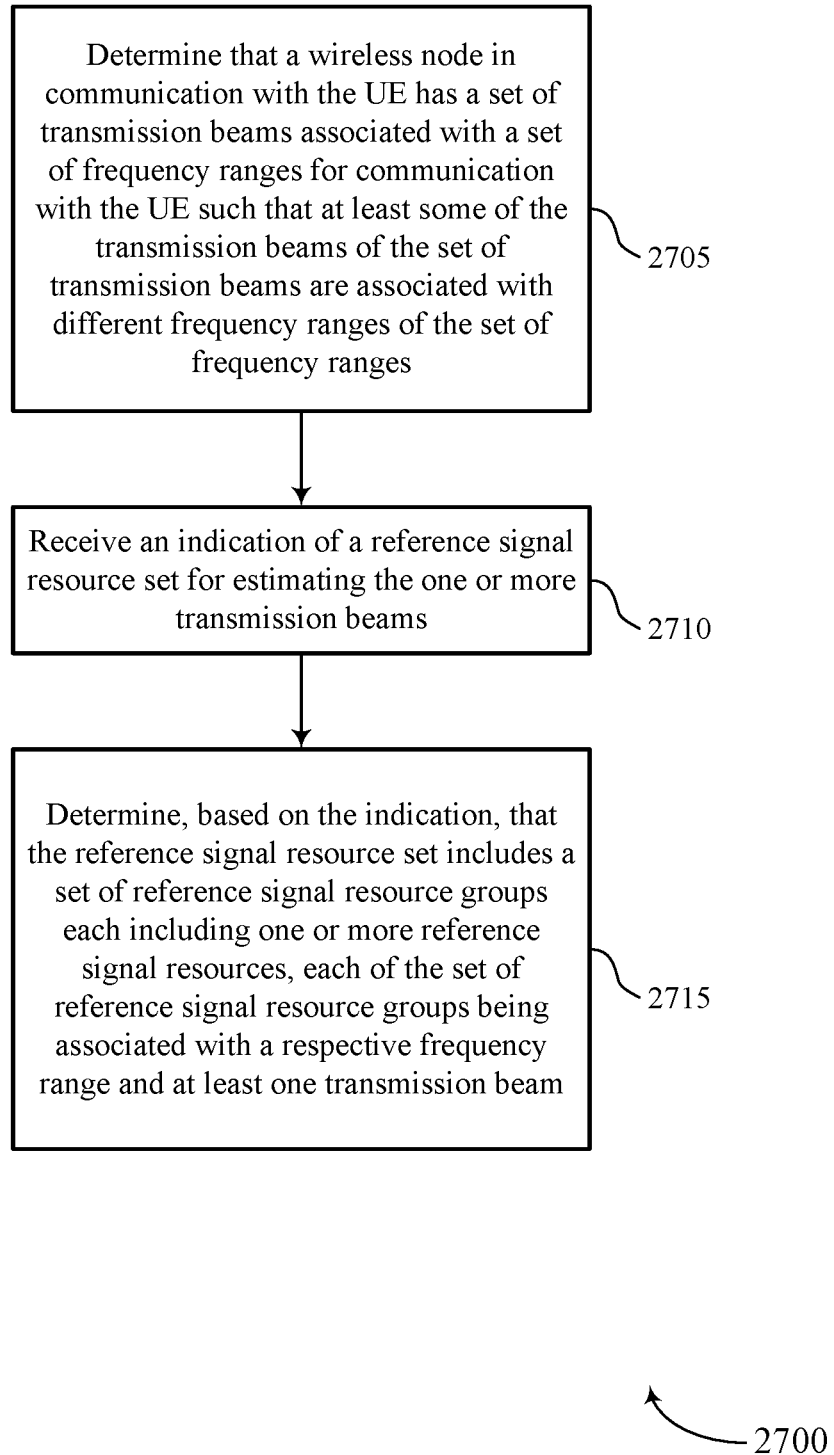

FIG. 27 shows a flowchart illustrating a method 2700 that supports beam management in a wireless communications network in accordance with one or more aspects of the present disclosure. The operations of method 2700 may be implemented by a UE 115 or its components as described herein. For example, the operations of method 2700 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2705, the method may include determining that a wireless node in communication with the UE has a set of transmission beams associated with a set of frequency ranges for communication with the UE such that at least some of the transmission beams of the set of transmission beams are associated with different frequency ranges of the set of frequency ranges. The operations of 2705 may be performed according to the methods described herein. In some examples, aspects of the operations of 2705 may be performed by a transmission beam manager as described with reference to FIGS. 11 through 14.

At 2710, the method may include receiving an indication of a reference signal resource set for estimating the one or more transmission beams. The operations of 2710 may be performed according to the methods described herein. In some examples, aspects of the operations of 2710 may be performed by a reception manager as described with reference to FIGS. 11 through 14.

At 2715, the method may include determining, based on the indication, that the reference signal resource set includes a set of reference signal resource groups each including one or more reference signal resources, each of the set of reference signal resource groups being associated with a respective frequency range and at least one transmission beam. The operations of 2715 may be performed according to the methods described herein. In some examples, aspects of the operations of 2715 may be performed by a resource manager as described with reference to FIGS. 11 through 14.

Figure 28:
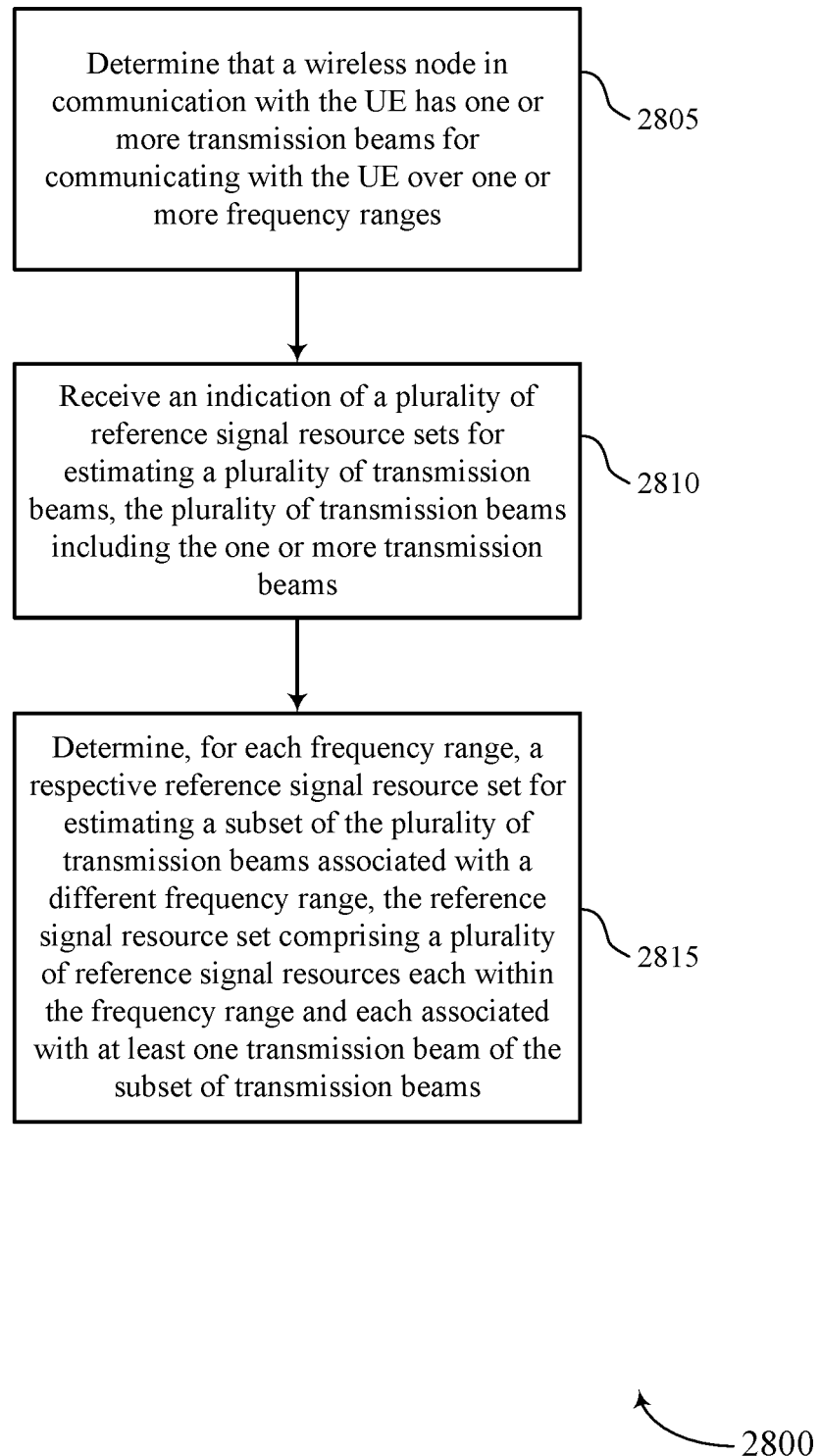

FIG. 28 shows a flowchart illustrating a method 2800 that supports beam management in a wireless communications network in accordance with one or more aspects of the present disclosure. The operations of method 2800 may be implemented by a UE 115 or its components as described herein. For example, the operations of method 2800 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2805, the method may include determining that a wireless node in communication with the UE has one or more transmission beams for communicating with the UE over one or more frequency ranges. The operations of 2805 may be performed according to the methods described herein. In some examples, aspects of the operations of 2805 may be performed by a transmission beam manager as described with reference to FIGS. 11 through 14.

At 2810, the method may include receiving an indication of a plurality of reference signal resource sets for estimating a plurality of transmission beams, the plurality of transmission beams including the one or more transmission beams. The operations of 2810 may be performed according to the methods described herein. In some examples, aspects of the operations of 2810 may be performed by a reception manager as described with reference to FIGS. 11 through 14.

At 2815, the method may include determining, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams. The operations of 2815 may be performed according to the methods described herein. In some examples, aspects of the operations of 2815 may be performed by a resource manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: transmitting a synchronization signal block over a second frequency range using a first transmission beam that is assigned a first frequency range for data transmissions, the first transmission beam included in a plurality of transmission beams each assigned respective frequency ranges for data transmissions; and transmitting a reference signal, concurrent with transmitting the synchronization signal block, over the second frequency range using the first transmission beam.

Aspect 2: The method of aspect 1, further comprising: transmitting data to a device over the first frequency range using the first transmission beam.

Aspect 3: The method of aspect 2, further comprising: determining that data transmissions to the device over the first frequency range will be interrupted based at least in part on concurrently transmitting the synchronization signal block and the reference signal over the second frequency range using the first transmission beam; and transmitting an indication of the interruption to the device prior to concurrently transmitting the synchronization signal block and the reference signal.

Aspect 4: The method of any of aspects 1 through 3, wherein the plurality of transmission beams comprises a second transmission beam assigned a second frequency range for data transmissions, the method further comprising: transmitting a second synchronization signal block over a third frequency range using the second transmission beam; and transmitting a second reference signal, concurrent with transmitting the second synchronization signal block, over the third frequency range using the second transmission beam.

Aspect 5: An apparatus for wireless communication, comprising a processor; memory coupled to the processor; the processor and memory may be configured to cause the apparatus to perform a method of any of aspects 1 through 4.

Aspect 6: An apparatus for wireless communication, comprising at least one means for performing a method of any of aspects 1 through 4.

Aspect 7: A non-transitory computer-readable medium storing code for wireless communication, the code comprising instructions executable by a processor to perform a method of any of aspects 1 through 4.

Aspect 8: A method for wireless communication at a UE, comprising: receiving an indication of a reference signal resource set for estimating one or more transmission beams of a plurality of transmission beams of a wireless node, the plurality of transmission beams associated with a plurality of frequency ranges such that at least some transmission beams of the plurality of transmission beams are associated with different frequency ranges of the plurality of frequency ranges; and receiving at least one reference signal based at least in part on the indication of the reference signal resource set, the reference signal resource set comprising a plurality of reference signal resource groups each including one or more reference signal resources, each of the plurality of reference signal resource groups being associated with a respective frequency range and at least one transmission beam.

Aspect 9: The method of aspect 8, wherein the plurality of reference signal resource groups overlap in the time domain, and wherein receiving the at least one reference signal comprises: receiving a first reference signal over a first frequency range associated with a first transmission beam, the first reference signal occupying a first reference signal resource included in a first reference signal resource group; and receiving, concurrently with receiving the first reference signal, a second reference signal over a second frequency range associated with a second transmission beam and occupying a second reference signal resource included in a second reference signal resource group.

Aspect 10: The method aspect 8, wherein the plurality of reference signal resource groups are staggered in the time domain.

Aspect 11: The method of aspect 10, wherein the plurality of reference signal resource groups are separated in the time domain by a threshold period of time, and wherein receiving the at least one reference signal comprises: receiving a first reference signal over a first frequency range associated with a first transmission beam, the first reference signal occupying a first reference signal resource included in a first reference signal resource group; and receiving, after the threshold period of time, a second reference signal over a second frequency range associated with a second transmission beam, the second reference signal occupying a second reference signal resource included in a second reference signal resource group.

Aspect 12: The method of aspect 8, wherein at least two reference signal resource groups overlap in the time domain and the other reference signal resource groups are staggered in the time domain, the at least two reference signal resource groups comprising a first reference signal resource group and a second reference signal resource group.

Aspect 13: The method of aspect 12, wherein the first reference signal resource group is associated with a first transmission beam having a first coverage area and the second reference signal resource group is associated with a second transmission beam having a second coverage area, the first coverage area separated from the second coverage area by a third coverage area of a third transmission beam.

Aspect 14: The method of aspect 8, wherein each of the one or more transmission beams is assigned a respective frequency range for data transmissions, the method further comprising: associating each reference signal resource within a given frequency range with a transmission beam that is assigned a different frequency range for data transmissions.

Aspect 15: The method of aspect 14, further comprising: receiving, over a first frequency range, data associated with a first transmission beam that is assigned the first frequency range for data transmissions; and receiving, over the first frequency range, a reference signal associated with a second transmission beam that is assigned a second frequency range for data transmissions.

Aspect 16: The method of any of aspects 14 through 15, further comprising: receiving, over a first frequency range, data associated with a first transmission beam that is assigned the first frequency range for data transmissions; and receiving an indication of a duration of time that data transmissions over the first frequency range will be interrupted.

Aspect 17: The method of any of aspects 8 through 16, further comprising: determining a spatial relationship between a first coverage area of a first transmission beam and a second coverage area of a second transmission beam, the first coverage area encompassing the UE; and receiving the at least one reference signal based at least on the spatial relationship, the at least one reference signal associated with the second transmission beam.

Aspect 18: The method of aspect 17, further comprising: receiving an indication of the spatial relationship from the wireless node, the indication comprising a vector indicating transmission beams that have coverage areas adjacent to the first coverage area.

Aspect 19: The method of any of aspects 17 through 18, further comprising: determining that reference signal resources associated with the first and second transmission beams are separated in the time domain, wherein the spatial relationship is based at least in part on determining that reference signal resources associated with the first and second transmission beams are separated in the time domain.

Aspect 20: The method of any of aspects 8 through 19, wherein the indication of the reference signal resource set is signaled in a system information block or a radio resource control message.

Aspect 21: The method of any of aspects 8 through 20, wherein the reference signal resource set is associated with a first mode of estimating transmission beams, the method further comprising: receiving an indication of a second reference signal resource set associated with a second mode of estimating transmission beams; and receiving an indication of the first mode or the second mode.

Aspect 22: The method of any of aspects 8 through 21, wherein the wireless node comprises a satellite operating in a non-terrestrial network.

Aspect 23: An apparatus for wireless communication at a UE, comprising a processor; memory coupled to the processor; the processor and memory may be configured to cause the apparatus to perform a method of any of aspects 8 through 22.

Aspect 24: An apparatus for wireless communication at a UE, comprising at least one means for performing a method of any of aspects 8 through 22.

Aspect 25: A non-transitory computer-readable medium storing code for wireless communication at a UE, the code comprising instructions executable by a processor to perform a method of any of aspects 8 through 22.

Aspect 26: A method for wireless communication at a UE, comprising: receiving an indication of a plurality of reference signal resource sets for estimating a plurality of transmission beams of a wireless node, the plurality of transmission beams associated with over one or more frequency ranges; and receiving at least one reference signal based at least in part on the indication of the plurality of reference signal resource sets indicating, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset.

Aspect 27: The method of aspect 26, wherein each reference signal resource in a given reference signal resource set is associated with a respective transmission beam and respective reference signal.

Aspect 28: The method of aspect 26, wherein each reference signal resource in a given reference signal resource set is associated with multiple transmission beams and multiple reference signals.

Aspect 29: The method of any of aspects 26 through 28, further comprising: determining that a first transmission beam is assigned a first frequency range for data transmissions; and determining that a second transmission beam is assigned a second frequency range for data transmission, wherein the at least one reference signal is associated with the second transmission beam and received over the first frequency range, the reference signal occupying one or more reference signal resources in the reference signal resource set for the first frequency range.

Aspect 30: The method of any of aspects 26 through 29, further comprising: receiving, over a first frequency range, data associated with a first transmission beam that is assigned the first frequency range for data transmissions; and receiving an indication of a duration of time that data transmissions over the first frequency range will be interrupted.

Aspect 31: The method of any of aspects 26 through 30, wherein the plurality of reference signal resource sets is associated with a first mode of estimating transmission beams, the method further comprising: receiving an indication of a second reference signal resource set associated with a second mode of estimating transmission beams; and receiving an indication of the first mode or the second mode.

Aspect 32: An apparatus for wireless communication at a UE, comprising a processor; memory coupled to the processor; the processor and memory may be configured to perform a method of any of aspects 26 through 31.

Aspect 33: An apparatus for wireless communication at a UE, comprising at least one means for performing a method of any of aspects 26 through 31.

Aspect 34: A non-transitory computer-readable medium storing code for wireless communication at a UE, the code comprising instructions executable by a processor to perform a method of any of aspects 26 through 31.

Aspect 35: A method for wireless communication, comprising: determining that a plurality of transmission beams is associated with a plurality of frequency ranges such that at least some transmission beams of the plurality of transmission beams are associated with different frequency ranges of the plurality of frequency ranges; determining a reference signal resource set for estimating the plurality of transmission beams, the reference signal resource set comprising a plurality of reference signal resource groups each including one or more reference signal resources, each of the plurality of reference signal resource groups being associated with a respective frequency range of the plurality of frequency ranges and one or more of the plurality of transmission beams; and transmitting an indication of the reference signal resource set to a UE for estimation of one or more of the plurality of transmission beams.

Aspect 36: The method of aspect 35, wherein the plurality of reference signal resource groups overlap in the time domain, the method further comprising: transmitting, using a first transmission beam, a first reference signal over a first reference signal resource included in a first reference signal resource group; and transmitting, using a second transmission beam and concurrent with transmitting the first reference signal, a second reference signal over a second reference signal resource included in a second reference signal resource group.

Aspect 37: The method of aspect 35, wherein the plurality of reference signal resource groups are staggered in the time domain.

Aspect 38: The method of aspects 35 or 37, wherein the plurality of reference signal resource groups are separated in the time domain by a threshold period of time, the method further comprising: transmitting, using a first transmission beam, a first reference signal over a first reference signal resource included in a first reference signal resource group; and transmitting, using a second transmission beam and after the threshold period of time, a second reference signal over a second reference signal resource included in a second reference signal resource group.

Aspect 39: The method of aspect 35, wherein at least two reference signal resource groups overlap in the time domain while other reference signal resource groups are staggered in the time domain, the at least two reference signal resource groups comprising a first reference signal resource group and a second reference signal resource group.

Aspect 40: The method of aspect 39, wherein the first reference signal resource group is associated with a first transmission beam having a first coverage area and the second reference signal resource group is associated with a second transmission beam having a second coverage area, the first coverage area separated from the second coverage area by a third coverage area of a third transmission beam.

Aspect 41: The method of aspect 35, wherein each transmission beam is assigned a respective frequency range for data transmissions, the method further comprising: associating each reference signal resource within a given frequency range with a transmission beam that is assigned a different frequency range for data transmissions.

Aspect 42: The method of aspect 41, further comprising: transmitting, over a first frequency range, data to a second UE using a first transmission beam assigned the first frequency range for data communications; and transmitting a reference signal over a second frequency range using the first transmission beam.

Aspect 43: The method of aspect 42, further comprising: determining that transmission of the reference signal over the second frequency range using the first transmission beam will interrupt data transmissions to the second UE over the first frequency range; and transmitting an indication of a duration of the interruption to the second UE.

Aspect 44: The method of any of aspects 35, 39, and 40, further comprising: determining a spatial relationship between coverage areas of the plurality of transmission beams; and transmitting an indication of the spatial relationship to the UE.

Aspect 45: The method of aspect 44, wherein the indication comprises a vector indicating which transmission beams have adjacent coverage areas.

Aspect 46: The method of any of aspects 35 to 40, wherein each reference signal resource group includes a pair of reference signal resources.

Aspect 47: The method of aspect 46, further comprising: code division multiplexing a first reference signal for transmission over the pair of reference signal resources using a first beam and a second reference signal for transmission over the pair of reference signal resources using a second beam.

Aspect 48: The method of aspect 46, further comprising: frequency division multiplexing a first reference signal for transmission over the pair of reference signal resources using a first beam and a second reference signal for transmission over the pair of reference signal resources using a second beam.

Aspect 49: The method of any of aspects 35 to 48, wherein the indication of the reference signal resource set is signaled in a system information block or a radio resource control message.

Aspect 50: The method of any of aspects 35 to 49, wherein the reference signal resource set is associated with a first mode of estimating transmission beams, the method further comprising: determining a second reference signal resource set that is associated with a second mode of estimating transmission beams; and transmitting an indication of the second reference signal resource set to the UE.

Aspect 51: The method of aspect 50, further comprising: selecting the first mode or the second mode based at least in part on a capability of the UE; and transmitting an indication of the first mode or the second mode to the UE.

Aspect 52: An apparatus for wireless communication, comprising a processor; memory coupled to the processor; the processor and memory may be configured to cause the apparatus to perform a method of any of aspects 35 through 50.

Aspect 53: An apparatus for wireless communication, comprising at least one means for performing a method of any of aspects 35 through 50.

Aspect 54: A non-transitory computer-readable medium storing code for wireless communication, the code comprising instructions executable by a processor to perform a method of any of aspects 35 through 50.

Aspect 55: A method for wireless communication, comprising: determining that each of a plurality of transmission beams is assigned a respective frequency range for data transmissions; determining, for each frequency range, a reference signal resource set for estimating a subset of the transmission beams assigned a different frequency range, the reference signal resource set comprising a plurality of reference signal resources each within the frequency range and each associated with one or more transmission beams of the subset of transmission beams; and transmitting an indication of the reference signal resource set to a UE for estimation of the subset of transmission beams.

Aspect 56: The method of aspect 55, wherein each reference signal resource in the reference signal resource set is associated with a respective transmission beam and respective reference signal.

Aspect 57: The method of aspect 55, wherein each reference signal resource in the reference signal resource set is associated with multiple transmission beams and multiple reference signals.

Aspect 58: The method of any of aspects 55 to 57, further comprising: determining that a first transmission beam is assigned a first frequency range for data transmissions; and transmitting, using a second transmission beam assigned a second frequency range for data transmissions, a reference signal over at least one reference signal resource in the reference signal resource set in the first frequency range.

Aspect 59: The method of aspect 58, further comprising: determining that data communications over the second frequency range will be interrupted during transmission of the reference signal over the first frequency range; and transmitting an indication of a duration of the interruption to a device receiving the data communications over the second frequency range.

Aspect 60: The method of aspect 58, further comprising: transmitting, using a third transmission beam, a second reference signal over at least one reference signal resource in the reference signal resource set in the first frequency range.

Aspect 61: The method of aspect 60, wherein the second reference signal is transmitted over a same group of reference signal resources as the reference signal.

Aspect 62: The method of aspect 60, wherein the second reference signal is transmitted over a different group of reference signal resources than the reference signal.

Aspect 63: The method of any of aspects 55 to 57, further comprising: transmitting a first reference signal and a second reference signal over a plurality of reference signal resources in a reference signal resource set for a third frequency range, the first reference signal transmitted using a first transmission beam assigned a first frequency range for data transmissions and the second reference signal transmitted using a second transmission beam assigned a second frequency range for data transmissions.

Aspect 64: The method of aspect 63, wherein the first reference signal and the second reference signal are code division multiplexed or frequency division multiplexed.

Aspect 65: The method of any of aspects 57 to 64, wherein the reference signal resource set is associated with a first mode of estimating transmission beams, the method further comprising: determining a second reference signal resource set that is associated with a second mode of estimating transmission beams; and transmitting an indication of the second reference signal resource set to the UE.

Aspect 66: The method of aspect 65, further comprising: selecting the first mode or the second mode based at least in part on a capability of the UE; and transmitting an indication of the first mode or the second mode to the UE.

Aspect 67: An apparatus for wireless communication, comprising a processor; memory coupled to the processor; the processor and memory may be configured to cause the apparatus to perform a method of any of aspects 55 through 66.

Aspect 68: An apparatus for wireless communication, comprising at least one means for performing a method of any of aspects 55 through 66.

Aspect 69: A non-transitory computer-readable medium storing code for wireless communication, the code comprising instructions executable by a processor to perform a method of any of aspects 55 through 66.

Aspect 70: A method for wireless communication, comprising: determining a plurality of transmission beams that are each assigned respective frequency ranges for data transmissions, the plurality of transmission beams comprising a first transmission beam assigned a first frequency range for data transmissions; transmitting a synchronization signal block over a second frequency range using the first transmission beam; and transmitting a reference signal, concurrent with transmitting the synchronization signal block, over the second frequency range using the first transmission beam.

Aspect 71: The method of aspect 70, further comprising: transmitting data to a device over the first frequency range using the first transmission beam.

Aspect 72: The method of aspect 70 or 71, further comprising: determining that data transmissions to the device over the first frequency range will be interrupted based at least in part on concurrently transmitting the synchronization signal block and the reference signal over the second frequency range using the first transmission beam; and transmitting an indication of the interruption to the device prior to concurrently transmitting the synchronization signal block and the reference signal.

Aspect 73: The method of any of aspects 70 to 72, wherein the plurality of beams comprises a second transmission beam assigned a second frequency range for data transmissions, the method further comprising: transmitting a second synchronization signal block over a third frequency range using the second transmission beam; and transmitting a second reference signal, concurrent with transmitting the second synchronization signal block, over the third frequency range using the second transmission beam.

Aspect 74: An apparatus for wireless communication, comprising a processor; memory coupled to the processor;

the processor and memory may be configured to cause the apparatus to perform a method of any of aspects 70 through 73.

Aspect 75: An apparatus for wireless communication, comprising at least one means for performing a method of any of aspects 70 through 73.

Aspect 76: A non-transitory computer-readable medium storing code for wireless communication, the code comprising instructions executable by a processor to perform a method of any of aspects 70 through 73.

Aspect 77: A method for wireless communication at a UE, comprising: determining that a wireless node in communication with the UE has a plurality of transmission beams associated with a plurality of frequency ranges for communication with the UE such that at least some of the transmission beams of the plurality of transmission beams are associated with different frequency ranges of the plurality of frequency ranges; receiving an indication of a reference signal resource set for estimating the one or more transmission beams; and determining, based at least in part on the indication, that the reference signal resource set comprises a plurality of reference signal resource groups each including one or more reference signal resources, each of the plurality of reference signal resource groups being associated with a respective frequency range and at least one transmission beam.

Aspect 78: The method of aspect 77, wherein the plurality of reference signal resource groups overlap in the time domain, the method further comprising: receiving a first reference signal transmitted using a first transmission beam, the first reference signal occupying a first reference signal resource included in a first reference signal resource group; and receiving, concurrently with receiving the first reference signal, a second reference signal transmitted using a second transmission beam and occupying a second reference signal resource included in a second reference signal resource group.

Aspect 79: The method of aspect 77, wherein the plurality of reference signal resource groups are staggered in the time domain.

Aspect 80: The method of aspect 77 or 79, wherein the plurality of reference signal resource groups are separated in the time domain by a threshold period of time, the method further comprising: receiving a first reference signal transmitted using a first transmission beam, the first reference signal occupying a first reference signal resource included in a first reference signal resource group; and receiving, after the threshold period of time, a second reference signal transmitted using a second transmission beam, the second reference signal occupying a second reference signal resource included in a second reference signal resource group.

Aspect 81: The method of aspect 77, wherein at least two reference signal resource groups overlap in the time domain and the other reference signal resource groups are staggered in the time domain, the at least two reference signal resource groups comprising a first reference signal resource group and a second reference signal resource group.

Aspect 82: The method of aspect 81, wherein the first reference signal resource group is associated with a first transmission beam having a first coverage area and the second reference signal resource group is associated with a second transmission beam having a second coverage area, the first coverage area separated from the second coverage area by a third coverage area of a third transmission beam.

Aspect 83: The method of aspect 77, wherein each of the one or more transmission beams is assigned a respective frequency range for data transmissions, the method further comprising: associating each reference signal resource within a given frequency range with a transmission beam that is assigned a different frequency range for data transmissions.

Aspect 84: The method of aspect 83, further comprising: receiving, over a first frequency range, data transmitted using a first transmission beam that is assigned the first frequency range for data transmissions; and receiving, over the first frequency range, a reference signal transmitted using a second transmission beam that is assigned a second frequency range for data transmissions.

Aspect 85: The method of aspect 83, further comprising: receiving, over a first frequency range, data transmitted using a first transmission beam that is assigned the first frequency range for data transmissions; and receiving an indication of a duration of time that data transmissions over the first frequency range will be interrupted.

Aspect 86: The method of any of aspects 77, 81, or 82, further comprising: determining a spatial relationship between a first coverage area of a first transmission beam and a second coverage area of a second transmission beam, the first coverage area encompassing the UE; and receiving a reference signal transmitted using the second transmission beam based at least on the spatial relationship.

Aspect 87: The method of aspect 86, further comprising: receiving an indication of the spatial relationship from the wireless node, the indication comprising a vector indicating transmission beams that have coverage areas adjacent to the first coverage area.

Aspect 88: The method of aspect 86, further comprising: determining that reference signal resources associated with the first and second transmission beams are separated in the time domain, wherein the spatial relationship is based at least in part on determining that reference signal resources associated with the first and second transmission beams are separated in the time domain.

Aspect 89: The method of any of aspects 77 to 88, wherein the indication of the reference signal resource set is signaled in a system information block or a radio resource control message.

Aspect 90: The method of any of aspects 77 to 89, wherein the reference signal resource set is associated with a first mode of estimating transmission beams, the method further comprising: receiving an indication of a second reference signal resource set associated with a second mode of estimating transmission beams; and receiving an indication of the first mode or the second mode.

Aspect 91: The method of any of aspects 77 to 90, wherein the wireless node comprises a satellite operating in a non-terrestrial network.

Aspect 92: An apparatus for wireless communication, comprising a processor; memory coupled to the processor; the processor and memory may be configured to cause the apparatus to perform a method of any of aspects 77 through 91.

Aspect 93: An apparatus for wireless communication, comprising at least one means for performing a method of any of aspects 77 through 91.

Aspect 94: A non-transitory computer-readable medium storing code for wireless communication, the code comprising instructions executable by a processor to perform a method of any of aspects 77 through 91.

Aspect 95: A method for wireless communication at a UE, comprising: determining that a wireless node in communication with the UE has one or more transmission beams for communicating with the UE over one or more frequency ranges; receiving an indication of a plurality of reference signal resource sets for estimating a plurality of transmission beams, the plurality of transmission beams including the one or more transmission beams; and determining, for each frequency range, a respective reference signal resource set for estimating a subset of the plurality of transmission beams associated with a different frequency range, the reference signal resource set comprising a plurality of reference signal resources each within the frequency range and each associated with at least one transmission beam of the subset of transmission beams.

Aspect 96: The method of aspect 95, wherein each reference signal resource in a given reference signal resource set is associated with a respective transmission beam and respective reference signal.

Aspect 97: The method of aspect 95 wherein each reference signal resource in a given reference signal resource set is associated with multiple transmission beams and multiple reference signals.

Aspect 98: The method of any of aspects 95 to 97, further comprising: determining that a first transmission beam is assigned a first frequency range for data transmissions; determining that a second transmission beam is assigned a second frequency range for data transmission; and receiving a reference signal transmitted over the first frequency range using the second transmission beam, the reference signal occupying one or more reference signal resources in the reference signal resource set for the first frequency range.

Aspect 99: The method of any of aspects 95 to 97, further comprising: receiving, over a first frequency range, data transmitted using a first transmission beam that is assigned the first frequency range for data transmissions; and receiving an indication of a duration of time that data transmissions over the first frequency range will be interrupted.

Aspect 100: The method of any of aspects 95 to 97, wherein the plurality of reference signal resource sets is associated with a first mode of estimating transmission beams, the method further comprising: receiving an indication of a second reference signal resource set associated with a second mode of estimating transmission beams; and receiving an indication of the first mode or the second mode.

Aspect 101: An apparatus for wireless communication, comprising a processor; memory coupled to the processor; the processor and memory may be configured to cause the apparatus to perform a method of any of aspects 95 through 100.

Aspect 102: An apparatus for wireless communication, comprising at least one means for performing a method of any of aspects 95 through 100.

Aspect 103: A non-transitory computer-readable medium storing code for wireless communication, the code comprising instructions executable by a processor to perform a method of any of aspects 95 through 100.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a satellite, comprising:
    transmitting a synchronization signal block over a second frequency range using a first transmission beam that is assigned a first frequency range for data transmissions, the first transmission beam included in a plurality of transmission beams, wherein the plurality of transmission beams is associated with a plurality of frequency ranges for data transmissions, and wherein one or more transmission beams of the plurality of transmission beams are associated with different frequency ranges of the plurality of frequency ranges; and
    transmitting a reference signal, concurrent with transmitting the synchronization signal block, over the second frequency range using the first transmission beam.

2. The method of claim 1, further comprising:
    transmitting data to a device over the first frequency range using the first transmission beam.

3. The method of claim 2, further comprising:
    determining that data transmissions to the device over the first frequency range will be interrupted based at least in part on concurrently transmitting the synchronization signal block and the reference signal over the second frequency range using the first transmission beam; and
    transmitting an indication of the interruption to the device prior to concurrently transmitting the synchronization signal block and the reference signal.

4. The method of claim 1, wherein the plurality of transmission beams comprises a second transmission beam that is assigned the second frequency range for data transmissions,
    the method further comprising:
        transmitting a second synchronization signal block over a third frequency range using the second transmission beam; and
        transmitting a second reference signal, concurrent with transmitting the second synchronization signal block, over the third frequency range using the second transmission beam.

5. A method for wireless communication at a user equipment (UE), comprising:
    receiving, from a satellite, an indication of a reference signal resource set for estimating one or more transmission beams of a plurality of transmission beams, wherein the plurality of transmission beams is associated with a plurality of frequency ranges, and wherein the one or more transmission beams of the plurality of transmission beams are associated with different frequency ranges of the plurality of frequency ranges; and
    receiving, from the satellite, at least one reference signal based at least in part on the indication of the reference signal resource set, wherein the reference signal resource set comprises a plurality of reference signal resource groups, and wherein each reference signal resource group of the plurality of reference signal resource groups includes one or more reference signal resources and is associated with a respective frequency range of the plurality of frequency ranges and at least one transmission beam.

6. The method of claim 5, wherein the plurality of reference signal resource groups overlap in a time domain, and
    wherein receiving the at least one reference signal comprises:
        receiving a first reference signal over a first frequency range associated with a first transmission beam, the first reference signal occupying a first reference signal resource included in a first reference signal resource group; and
        receiving, concurrently with receiving the first reference signal, a second reference signal over a second frequency range associated with a second transmission beam, the second reference signal occupying a second reference signal resource included in a second reference signal resource group.

7. The method of claim 5, wherein individual reference signal resource groups of plurality of reference signal resource groups are staggered in a time domain.

8. The method of claim 7, wherein the individual reference signal resource groups of plurality of reference signal resource groups are separated in the time domain by a threshold period of time, and wherein receiving the at least one reference signal comprises:
    receiving a first reference signal over a first frequency range associated with a first transmission beam, the first reference signal occupying a first reference signal resource included in a first reference signal resource group; and receiving, after the threshold period of time, a second reference signal over a second frequency range associated with a second transmission beam, the second reference signal occupying a second reference signal resource included in a second reference signal resource group.

9. The method of claim 5, wherein at least two reference signal resource groups of the plurality of reference signal resource groups overlap in a time domain and one or more other reference signal resource groups of the plurality of reference signal resource groups are staggered in the time domain, the at least two reference signal resource groups comprising a first reference signal resource group and a second reference signal resource group.

10. The method of claim 9, wherein the first reference signal resource group is associated with a first transmission beam having a first coverage area and the second reference signal resource group is associated with a second transmission beam having a second coverage area, the first coverage area separated from the second coverage area by a third coverage area of a third transmission beam.

11. The method of claim 5, wherein each of the one or more transmission beams is assigned a respective frequency range for data transmissions,
the method further comprising:
associating each reference signal resource within a given frequency range with a transmission beam that is assigned a different frequency range for data transmissions.

12. The method of claim 11, further comprising:
receiving, over a first frequency range, data associated with a first transmission beam that is assigned the first frequency range for data transmissions; and
receiving, over the first frequency range, a reference signal associated with a second transmission beam that is assigned a second frequency range for data transmissions.

13. The method of claim 11, further comprising:
receiving, over a first frequency range, data associated with a first transmission beam that is assigned the first frequency range for data transmissions; and
receiving an indication of a duration of time that data transmissions over the first frequency range will be interrupted.

14. The method of claim 5, further comprising:
determining a spatial relationship between a first coverage area of a first transmission beam and a second coverage area of a second transmission beam, the first coverage area encompassing the UE; and
receiving the at least one reference signal based at least in part on the spatial relationship, the at least one reference signal associated with the second transmission beam.

15. The method of claim 14, further comprising:
receiving an indication of the spatial relationship from the satellite, the indication of the spatial relationship comprising a vector indicating transmission beams that have coverage areas adjacent to the first coverage area.

16. The method of claim 14, further comprising:
determining that reference signal resources associated with the first transmission beam and the second transmission beam are separated in a time domain, wherein the spatial relationship is based at least in part on determining that the reference signal resources associated with the first transmission beam and the second transmission beam are separated in the time domain.

17. The method of claim 5, wherein the indication of the reference signal resource set is signaled in a system information block or a radio resource control message.

18. The method of claim 5, wherein the reference signal resource set is associated with a first mode of estimating transmission beams,
the method further comprising:
receiving an indication of a second reference signal resource set associated with a second mode of estimating transmission beams; and
receiving an indication of the first mode or the second mode.

19. The method of claim 5, wherein the satellite operates in a non-terrestrial network.

20. A method for wireless communication at a user equipment (UE), comprising:
receiving, from a satellite, an indication of a plurality of reference signal resource sets for estimating a plurality of transmission beams, wherein the plurality of transmission beams is associated with one or more frequency ranges; and
receiving, from the satellite, at least one reference signal based at least in part on the indication of the plurality of reference signal resource sets indicating, for each frequency range of the one or more frequency ranges, a respective reference signal resource set for estimating a subset of the plurality of transmission beams associated with a different frequency range, wherein each respective reference signal resource set comprises a plurality of reference signal resources, and wherein each reference signal resource of the plurality of reference signal resources is within the frequency range and is associated with at least one transmission beam of the subset.

21. The method of claim 20, wherein each reference signal resource of the plurality of reference signal resources is associated with a respective reference signal.

22. The method of claim 20, wherein each reference signal resource of the plurality of reference signal resources is associated with multiple transmission beams and multiple reference signals.

23. The method of claim 20, further comprising:
determining that a first transmission beam is assigned a first frequency range for data transmissions; and
determining that a second transmission beam is assigned a second frequency range for data transmission, wherein the at least one reference signal is associated with the second transmission beam, is received over the first frequency range, and occupies one or more reference signal resources in the reference signal resource set for the first frequency range.

24. The method of claim 20, further comprising:
receiving, over a first frequency range, data associated with a first transmission beam that is assigned the first frequency range for data transmissions; and
receiving an indication of a duration of time that data transmissions over the first frequency range will be interrupted.

25. The method of claim 20, wherein the plurality of reference signal resource sets is associated with a first mode of estimating transmission beams,
the method further comprising:
receiving an indication of a second reference signal resource set associated with a second mode of estimating transmission beams; and
receiving an indication of the first mode or the second mode.

26. An apparatus for wireless communication at a user equipment (UE), comprising:
one or more memories; and
one or more processors coupled with the one or more memories and configured to cause the UE to:
receive, from a satellite, an indication of a reference signal resource set for estimation of one or more transmission beams of a plurality of transmission beams, wherein the plurality of transmission beams is associated with a plurality of frequency ranges; and
receive, from the satellite, at least one reference signal based at least in part on the indication of the reference signal resource set, wherein the reference signal resource set comprises a plurality of reference signal resource groups, and wherein each reference signal resource group of the plurality of reference signal resource groups includes one or more reference signal resources, and is associated with a respective frequency range of the plurality of frequency ranges and at least one transmission beam.

27. The apparatus of claim 26, wherein the plurality of reference signal resource groups overlap in a time domain, and
wherein, to receive the at least one reference signal, the one or more processors are configured to cause the UE to:
receive a first reference signal that is associated with a first transmission beam and that occupies a first reference signal resource included in a first reference signal resource group; and
receive, concurrently with receipt of the first reference signal, a second reference signal that is associated with a second transmission beam and that occupies a second reference signal resource included in a second reference signal resource group.

28. The apparatus of claim 26, wherein individual reference signal resource groups of the plurality of reference signal resource groups are staggered in a time domain.

29. The apparatus of claim 28, wherein the individual reference signal resource groups of the plurality of reference signal resource groups are separated in the time domain by a threshold period of time, and
wherein, to receive the at least one reference signal, the one or more processors are configured to cause the UE to:
receive a first reference signal that is associated with a first transmission beam and that occupies a first reference signal resource included in a first reference signal resource group; and
receive, after the threshold period of time, a second reference signal that is associated with a second transmission beam and that occupies a second reference signal resource included in a second reference signal resource group.

30. The apparatus of claim 26, further comprising an antenna,
wherein at least two reference signal resource groups of the plurality of reference signal resource groups overlap in a time domain and one or more other reference signal resource groups of the plurality of reference signal resource groups are staggered in the time domain, the at least two reference signal resource groups comprising a first reference signal resource group and a second reference signal resource group.

31. The apparatus of claim 30, wherein the first reference signal resource group is associated with a first transmission beam having a first coverage area and the second reference signal resource group is associated with a second transmission beam having a second coverage area, the first coverage area separated from the second coverage area by a third coverage area of a third transmission beam.

32. The apparatus of claim 26, wherein each of the one or more transmission beams is assigned a respective frequency range for data transmissions, and
wherein the one or more processors are further configured to cause the satellite to:
associate each reference signal resource within a given frequency range with a transmission beam that is assigned a different frequency range for data transmissions.

33. The apparatus of claim 32, wherein the one or more processors are further configured to cause the satellite to:
receive, over a first frequency range, data associated with a first transmission beam that is assigned the first frequency range for data transmissions; and
receive, over the first frequency range, a reference signal associated with a second transmission beam that is assigned a second frequency range for data transmissions.

34. The apparatus of claim 32, wherein the one or more processors are further configured to cause the satellite to:
receive, over a first frequency range, data associated with a first transmission beam that is assigned the first frequency range for data transmissions; and
receive an indication of a duration of time that data transmissions over the first frequency range will be interrupted.

35. The apparatus of claim 26, wherein the one or more processors are further configured to cause the satellite to:
determine a spatial relationship between a first coverage area of a first transmission beam and a second coverage area of a second transmission beam, the first coverage area that encompasses the UE; and
receive the at least one reference signal based at least in part on the spatial relationship, the at least one reference signal associated with the second transmission beam.

36. The apparatus of claim 35, wherein the one or more processors are further configured to cause the satellite to:
receive an indication of the spatial relationship from the satellite, the indication of the spatial relationship comprising a vector that indicates transmission beams that have coverage areas adjacent to the first coverage area.

37. The apparatus of claim 35, wherein the one or more processors are further configured to cause the satellite to:
determine that reference signal resources associated with the first transmission beam and the second transmission beam are separated in a time domain, wherein the spatial relationship is based at least in part on the reference signal resources associated with the first transmission beam and the second transmission beam being separated in the time domain.

38. The apparatus of claim 26, wherein the indication of the reference signal resource set is signaled in a system information block or a radio resource control message.

39. The apparatus of claim 26, wherein the reference signal resource set is associated with a first mode of estimation of transmission beams, and
wherein the one or more processors are further configured to cause the satellite to:
receive an indication of a second reference signal resource set associated with a second mode of estimation of transmission beams; and receive an indication of the first mode or the second mode.

40. The apparatus of claim 26, wherein the satellite operates in a non-terrestrial network.

41. An apparatus for wireless communication at a satellite, comprising:
one or more memories; and
one or more processors coupled with the one or more memories and configured to cause the satellite to:
transmit a synchronization signal block over a second frequency range using a first transmission beam that is assigned a first frequency range for data transmissions, the first transmission beam included in a plurality of transmission beams, wherein the plurality of transmission beams is associated with a plurality of frequency ranges, and wherein one or more transmission beams of the plurality of transmission beams are associated with different frequency ranges of the plurality of frequency ranges; and
transmit a reference signal, concurrent with transmission of the synchronization signal block, over the second frequency range using the first transmission beam.

42. The apparatus of claim 41, wherein the one or more processors are further configured to cause the satellite to:
determine that data transmissions to a device over the first frequency range will be interrupted based at least in part on concurrent transmission of the synchronization signal block and the reference signal over the second frequency range using the first transmission beam; and
transmit an indication of the interruption to the device prior to the concurrent transmission of the synchronization signal block and the reference signal.

43. The apparatus of claim 41, wherein the plurality of transmission beams comprises a second transmission beam that is assigned the second frequency range for data transmissions, and
wherein the one or more processors are further configured to cause the satellite to:
transmit a second synchronization signal block over a third frequency range via the second transmission beam; and
transmit a second reference signal, concurrent with transmission of the second synchronization signal block, over the third frequency range via the second transmission beam.

44. The apparatus of claim 41, wherein the one or more processors are further configured to cause the satellite to:
transmit data to a device over the first frequency range using the first transmission beam.

45. A non-transitory computer-readable medium storing code for wireless communication at a satellite, the code comprising instructions executable by one or more processors to cause the satellite to:
transmit a synchronization signal block over a second frequency range using a first transmission beam that is assigned a first frequency range for data transmissions, the first transmission beam included in a plurality of transmission beams, wherein the plurality of transmission beams is associated with a plurality of frequency ranges for data transmissions, and wherein one or more transmission beams of the plurality of transmission beams are associated with different frequency ranges of the plurality of frequency ranges; and
transmit a reference signal, concurrent with transmission of the synchronization signal block, over the second frequency range using the first transmission beam.

46. The non-transitory computer-readable medium of claim 45, wherein the instructions are further executable by the one or more processors to cause the satellite to:
determine that data transmissions to a device over the first frequency range will be interrupted based at least in part on concurrent transmission of the synchronization signal block and the reference signal over the second frequency range using the first transmission beam; and
transmit an indication of the interruption to the device prior to the concurrent transmission of the synchronization signal block and the reference signal.

47. The non-transitory computer-readable medium of claim 45, wherein the plurality of transmission beams comprises a second transmission beam that is assigned the second frequency range for data transmissions, and
wherein the instructions are further executable by the one or more processors to cause the satellite to:
transmit a second synchronization signal block over a third frequency range via the second transmission beam; and
transmit a second reference signal, concurrent with transmission of the second synchronization signal block, over the third frequency range via the second transmission beam.

48. A non-transitory, computer-readable medium storing code for wireless communication at a user equipment (UE), the code comprising instructions executable by one or more processors to cause the UE to:
receive, from a satellite, an indication of a reference signal resource set for estimation of one or more transmission beams of a plurality of transmission beams, wherein the plurality of transmission beams is associated with a plurality of frequency ranges, and wherein the one or more transmission beams of the plurality of transmission beams are associated with different frequency ranges of the plurality of frequency ranges; and
receive, from the satellite, at least one reference signal based at least in part on the indication of the reference signal resource set, wherein the reference signal resource set comprises a plurality of reference signal resource groups, and wherein each reference signal resource group of the plurality of reference signal resource groups includes one or more reference signal resources and is associated with a respective frequency range of the plurality of frequency ranges and at least one transmission beam.

49. The non-transitory computer-readable medium of claim 48, wherein the plurality of reference signal resource groups are overlapped in a time domain, and
wherein, to receive the at least one reference signal, the instructions are executable by the one or more processors to cause the UE to:
receive a first reference signal that is associated with a first transmission beam and that occupies a first reference signal resource included in a first reference signal resource group; and
receive, concurrently with receipt of the first reference signal, a second reference signal that is associated with a second transmission beam and that occupies a second reference signal resource included in a second reference signal resource group.

50. The non-transitory computer-readable medium of claim 48, wherein individual reference signal resource groups of the plurality of reference signal resource groups are staggered in a time domain and are separated in the time domain by a threshold period of time, and wherein, to receive the at least one reference signal, the instructions are executable by the one or more processors to cause the UE to:
receive a first reference signal that is associated with a first transmission beam and that occupies a first reference signal resource included in a first reference signal resource group; and
receive, after the threshold period of time, a second reference signal that is associated with a second transmission beam and that occupies a second reference signal resource included in a second reference signal resource group.

51. The non-transitory computer-readable medium of claim 48, wherein at least two reference signal resource groups of the plurality of reference signal resource groups are overlapped in a time domain and one or more other reference signal resource groups of the plurality of reference signal resource groups are staggered in the time domain, wherein the at least two reference signal resource groups comprise a first reference signal resource group and a second reference signal resource group.

52. An apparatus for wireless communication at a user equipment (UE), comprising:
one or more memories; and
one or more processors coupled with the one or more memories and configured to cause the UE to:
receive, from a satellite, an indication of a plurality of reference signal resource sets for estimation of a plurality of transmission beams, wherein the plurality of transmission beams is associated with one or more frequency ranges; and
receive, from the satellite, at least one reference signal based at least in part on the indication of the plurality of reference signal resource sets that indicates, for each frequency range of the one or more frequency ranges, a respective reference signal resource set for estimation of a subset of the plurality of transmission beams associated with a different frequency range, wherein each respective reference signal resource set comprises a plurality of reference signal resources, and wherein each reference signal resource of the plurality of reference signal resources is within the frequency range and is associated with at least one transmission beam of the subset.

53. The apparatus of claim 52, wherein the one or more processors are further configured to cause the UE to:
determine that a first transmission beam is assigned a first frequency range for data transmissions; and
determine that a second transmission beam is assigned a second frequency range for data transmission, wherein the at least one reference signal is associated with the second transmission beam, is received over the first frequency range, and occupies one or more reference signal resources in the reference signal resource set for the first frequency range.

54. The apparatus of claim 52, wherein the one or more processors are further configured to cause the UE to:
receive, over a first frequency range, data associated with a first transmission beam that is assigned the first frequency range for data transmissions; and
receive an indication of a duration of time that data transmissions over the first frequency range will be interrupted.

55. The apparatus of claim 52, wherein each reference signal resource set of the plurality of reference signal resource sets is associated with a first mode of transmission beam estimation, and
wherein the one or more processors are further configured to cause the UE to:
receive an indication of a second reference signal resource set associated with a second mode of transmission beam estimation; and
receive an indication of the first mode or the second mode.

56. The apparatus of claim 52, wherein each reference signal resource of the plurality of reference signal resources is associated with respective reference signal.

57. The apparatus of claim 52, wherein each reference signal resource of the plurality of reference signal resources is associated with multiple transmission beams and multiple reference signals.

58. A non-transitory computer-readable medium storing code for wireless communication at a user equipment (UE), the code comprising instructions executable by one or more processors to cause the UE to:
receive, from a satellite, an indication of a plurality of reference signal resource sets for estimation of a plurality of transmission beams, wherein the plurality of transmission beams associated with one or more frequency ranges; and
receive, from the satellite, at least one reference signal based at least in part on the indication of the plurality of reference signal resource sets that indicates, for each frequency range of the one or more frequency ranges, a respective reference signal resource set for estimation of a subset of the plurality of transmission beams associated with a different frequency range, wherein each respective reference signal resource set comprises a plurality of reference signal resources, and wherein each reference signal resource of the plurality of reference signal resources is within the frequency range and is associated with at least one transmission beam of the subset.

59. The non-transitory computer-readable medium of claim 58, wherein the instructions are executable by the one or more processors to cause the UE to:
determine that a first transmission beam is assigned a first frequency range for data transmissions; and
determine that a second transmission beam is assigned a second frequency range for data transmission, wherein the at least one reference signal is associated with the second transmission beam, is received over the first frequency range, and occupies one or more reference signal resources in the reference signal resource set for the first frequency range.

60. The non-transitory computer-readable medium of claim 58, wherein the instructions are executable by the one or more processors to cause the UE to:
receive, over a first frequency range, data associated with a first transmission beam that is assigned the first frequency range for data transmissions; and
receive an indication of a duration of time that data transmissions over the first frequency range will be interrupted.

* * * * *